United States Patent
Wright et al.

(10) Patent No.: US 12,407,497 B2
(45) Date of Patent: *Sep. 2, 2025

(54) SECURE MULTI-PARTY REACH AND FREQUENCY ESTIMATION

(71) Applicant: Google LLC, Mountain View, CA (US)

(72) Inventors: Craig Wright, Louisville, CO (US); Benjamin R. Kreuter, Jersey City, NJ (US); James Robert Koehler, Boulder, CO (US); Evgeny Skvortsov, Kirkland, WA (US); Arthur Asuncion, Mountain View, CA (US); Laura Grace Book, Mountain View, CA (US); Sheng Ma, Belmont, CA (US); Jiayu Peng, Sunnyvale, CA (US); Xichen Huang, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,738

(22) Filed: Jan. 5, 2024

(65) Prior Publication Data

US 2024/0204988 A1     Jun. 20, 2024

Related U.S. Application Data

(63) Continuation of application No. 17/276,643, filed as application No. PCT/US2020/043894 on Jul. 28, 2020, now Pat. No. 11,909,864.
(Continued)

(51) Int. Cl.
*H04L 9/08*     (2006.01)
*G06F 16/22*     (2019.01)
(Continued)

(52) U.S. Cl.
CPC ........ *H04L 9/0825* (2013.01); *G06F 16/2237* (2019.01); *G06F 16/2379* (2019.01);
(Continued)

(58) Field of Classification Search
None
See application file for complete search history.

(56) References Cited

U.S. PATENT DOCUMENTS 8,815,905 B2   8/2014   Wolf et al.
9,049,011 B1   6/2015   Agrawal
(Continued)

FOREIGN PATENT DOCUMENTS

CN    102693378    9/2012
CN    103095453    5/2013
(Continued)

OTHER PUBLICATIONS

Luo, Lailong & Guo, Deke & Ma, Richard & Rottenstreich, Ori & Luo, Xueshan. (2018). Optimizing Bloom Filter: Challenges, Solutions, and Comparisons. IEEE Communications Surveys & Tutorials. pp. 10.1109/COMST.2018.2889329. (Year: 2018).*
(Continued)

*Primary Examiner* — Rupal Dharia
*Assistant Examiner* — Shadi H Kobrosli
(74) *Attorney, Agent, or Firm* — DORITY & MANNING P.A.

(57) ABSTRACT

Systems and methods for generating min-increment counting bloom filters to determine count and frequency of device identifiers and attributes in a networking environment are disclosed. The system can maintain a set of data records including device identifiers and attributes associated with device in a network. The system can generate a vector comprising coordinates corresponding to counter registers. The system can identify hash functions to update a counting
(Continued)

bloom filter. The system can hash the data records to extract index values pointing to a set of counter registers. The system can increment the positions in the min-increment counting bloom filter corresponding to the minimum values of the counter registers. The system can obtain an aggregated public key comprising a public key. The system can encrypt the counter registers using the aggregated shared key to generate an encrypted vector. The system can transmit the encrypted vector to a networked worker computing device.

18 Claims, 33 Drawing Sheets

Related U.S. Application Data

(60) Provisional application No. 63/002,138, filed on Mar. 30, 2020, provisional application No. 62/987,645, filed on Mar. 10, 2020, provisional application No. 62/981,960, filed on Feb. 26, 2020, provisional application No. 62/977,141, filed on Feb. 14, 2020.

(51) Int. Cl.
| | | |
|---|---|---|
| *G06F 16/23* | (2019.01) | |
| *G06F 21/62* | (2013.01) | |
| *G06N 7/01* | (2023.01) | |
| *H04L 9/00* | (2022.01) | |
| *H04L 9/06* | (2006.01) | |

(52) U.S. Cl.
CPC .......... *G06F 21/6254* (2013.01); *G06N 7/01* (2023.01); *H04L 9/008* (2013.01); *H04L 9/0643* (2013.01); *H04L 9/085* (2013.01); *H04L 9/0869* (2013.01); *H04L 2209/08* (2013.01); *H04L 2209/46* (2013.01)

(56) References Cited

U.S. PATENT DOCUMENTS

| | | | |
|---|---|---|---|
| 9,306,738 | B2 | 4/2016 | Loftus et al. |
| 9,652,512 | B2 | 5/2017 | Litherland et al. |
| 10,970,629 | B1* | 4/2021 | Dirac ................ G06N 7/01 |
| 11,138,170 | B2 | 10/2021 | Crossley et al. |
| 11,232,216 | B1 | 1/2022 | Ghetti et al. |
| 11,347,808 | B1* | 5/2022 | Plenderleith ........ G06F 16/2455 |
| 2005/0002532 | A1 | 1/2005 | Zhou et al. |
| 2007/0140479 | A1 | 6/2007 | Wang et al. |
| 2013/0010950 | A1* | 1/2013 | Kerschbaum ......... H04L 9/3218 380/30 |
| 2013/0150072 | A1 | 6/2013 | Kapoor et al. |
| 2013/0226972 | A1* | 8/2013 | Kosuru ................ G06F 16/283 707/802 |
| 2014/0149433 | A1* | 5/2014 | Lakshminarayan .. G06F 16/335 707/750 |
| 2015/0089574 | A1 | 3/2015 | Mattsson et al. |
| 2015/0220625 | A1 | 8/2015 | Cartmell et al. |
| 2016/0127128 | A1 | 5/2016 | Chen et al. |
| 2016/0378465 | A1 | 12/2016 | Venkatesh et al. |
| 2017/0155628 | A1 | 6/2017 | Rohloff et al. |
| 2017/0272246 | A1 | 9/2017 | Rane et al. |
| 2017/0310643 | A1 | 10/2017 | Hardy et al. |
| 2018/0285596 | A1 | 10/2018 | Jones et al. |
| 2018/0357434 | A1* | 12/2018 | Roy .................... G06F 21/6209 |
| 2019/0121742 | A1* | 4/2019 | Bhimani ............. G06F 12/0638 |
| 2019/0237176 | A1 | 8/2019 | O'Brien et al. |
| 2020/0022814 | A1 | 1/2020 | Frederick et al. |
| 2020/0064446 | A1 | 2/2020 | Chan et al. |
| 2020/0250193 | A1 | 8/2020 | Pham et al. |
| 2022/0075878 | A1 | 3/2022 | Begg et al. |

FOREIGN PATENT DOCUMENTS

| | | |
|---|---|---|
| CN | 106534313 | 3/2017 |
| CN | 107968708 | 4/2018 |
| CN | 110622165 | 12/2019 |
| CN | 111680041 | 9/2020 |
| CN | 113157778 | 7/2021 |
| EP | 2547003 | 1/2013 |
| EP | 3220570 | 9/2017 |
| EP | 3419211 | 12/2018 |
| EP | 3525388 | 8/2019 |
| JP | 2002/237810 | 8/2002 |
| JP | 2014/157264 | 8/2014 |
| JP | 2015/204111 | 11/2015 |
| JP | 2015/228611 | 12/2015 |
| JP | 2017/507387 | 3/2017 |
| WO | WO 2005/071640 | 8/2005 |
| WO | WO 2018/124104 | 7/2018 |
| WO | WO 2019/030409 | 2/2019 |

OTHER PUBLICATIONS

Vatsalan, Dinusha, and Peter Christen. "Multi-party privacy-preserving record linkage using bloom filters." arXiv preprint arXiv: 1612.08835 (Year: 2016).*
Chinese Search Report Corresponding to Application No. 2020800054594 on Nov. 10, 2023.
International Preliminary Report on Patentability for Application No. PCT/US2020/043894, mailed Aug. 25, 2022, 8 pages.
International Preliminary Report on Patentability for PCT/US2020/041020, mailed Aug. 25, 2022, 11 pages.
International Preliminary Report on Patentability for PCT/US2020/041025, mailed Aug. 25, 2022, 11 pages.
Japanese Translation of Saho et al., "Proposal of Search Scheme Applying Bloom Filter in Searchable Encryption", Research Report Computer Security (CSEC), Japan, May 14, 2015, vol. CSEC-69, No. 8, pp. 1-7.
Machine Translated Chinese Search Report Corresponding to Application No. 2020800054522 on Jul. 12, 2022.
Machine Translated Chinese Search Report Corresponding to Application No. 202080005460.7 on Jul. 7, 2020.
Wang et al., "Personalized Privacy-Preserving Data Aggregation for Histogram Estimation", 2015 Institute of Electrical and Electronics Engineers Global Communications Conference, San Diego, California, United States, Dec. 6-10, 2015, 6 pages.
Yao et al., "Efficient Histogram Estimation for Smart Grid Data Processing with the Loglog-Bloom-Filter", Institute of Electrical and Electronics Engineers Transactions on Smart Grid, vol. 6, Issue 1, Jan. 2015, 10 pages.

* cited by examiner

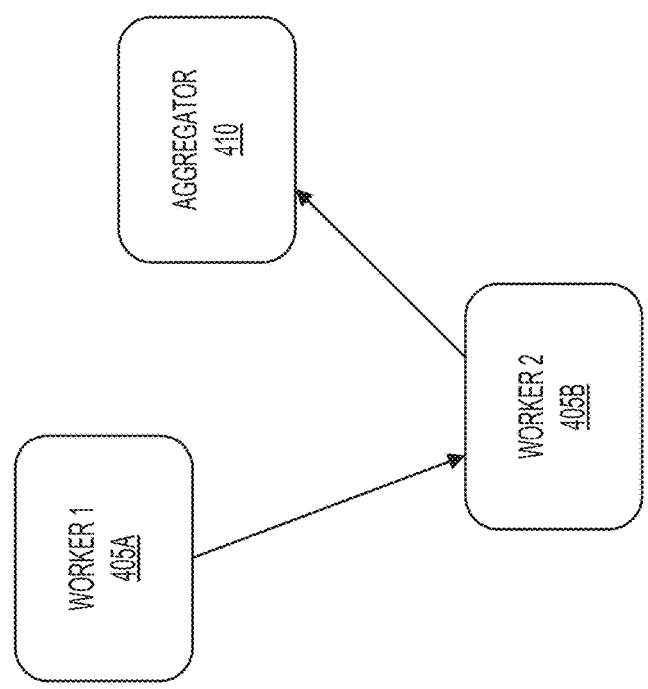

SECURE MULTI-PARTY REACH AND FREQUENCY ESTIMATION

CROSS-REFERENCE TO RELATED APPLICATIONS

This application claims the benefit of and priority to U.S. Non-Provisional patent application Ser. No. 17/276,643, filed on Mar. 16, 2021, which is a National Stage Entry of International Patent Application No. PCT/US2020/043894, filed on Jul. 28, 2020 which claims benefit of and priority to:
U.S. Provisional Patent Application No. 62/977,141, filed Feb. 14, 2020, titled "SECURE MULTI-PARTY REACH AND FREQUENCY ESTIMATION";
U.S. Provisional Patent Application No. 62/981,960, filed Feb. 26, 2020, titled "CASCADING LEGIONS CARDINALITY ESTIMATOR";
U.S. Provisional Patent Application No. 62/987,645, filed Mar. 10, 2020, titled "EFFICIENT METHOD FOR DIFFERENTIALLY PRIVATE CARDINALITY ESTIMATION"; and
U.S. Provisional Patent Application No. 63/002,138, filed Mar. 30, 2020, titled "PRIVACY PRESERVING SECURE CARDINALITY AND FREQUENCY ESTIMATION"
the contents of each of which are incorporated herein by reference in their entirety.

BACKGROUND

In many instances, computing and data analysis systems may determine the intersection, or union, of large sets of data as part of analysis or processing of the data. Computing the union, intersection, or frequency of large sets of data distributed across multiple sources typically involves sharing information about the large sets of data between the multiple sources. Information from each source can include private or protected information, and sharing such information may negatively impact privacy and security.

SUMMARY

The systems and methods discussed herein can provide increased security and privacy of data and data counting systems through the use of encrypted probabilistic data structures and a homomorphic encryption scheme. In many implementations, probabilistic data structures such as min-increment counting bloom filters, cascading legions matrices, continuous legions data structures, and others may be generated to determine count and frequency of device identifiers and attributes in a networking environment. A set of data records including device identifiers and attributes associated with devices in a network may be maintained, and a probabilistic data structure may be generated comprising coordinates, positions, or values that can correspond to counter registers. Hash functions can be used to update the data structures that can be identified, and data records may be hashed to extract index values, position values, or other such pointers or identifiers to one or more positions in the probabilistic data structure. Positions in the data structure may be incremented, updated, flipped, permuted, or changed. An aggregated public key comprising a public key may be obtained, and the data structure can be encrypted using the aggregated shared key to generate an encrypted vector, with the encrypted vector transmitted to a networked worker computing device.

These systems and methods can transmit the probabilistic data structure to the worker computing devices, which can be orders of magnitude smaller than the data records used to generate the data structure, and would otherwise be sent to one or more worker computing devices. This can decrease the amount of data transmitted over the network, and the amount of data processed by each worker computing device, which is a significant improvement over other multiset membership comparison and computation systems. Further, by using an estimated histogram, aspects of this technical solution can provide accurate estimations of client identifier attribute data frequencies without transmitting protected or private information via the network. This not only protects identifier servers from exposing the number or attributes of their associated devices, but also protects client devices from exposing their protected or private information, which is a significant improvement to the security and privacy of networking systems.

At least one aspect of the present technical solution is directed to a method of generating an encrypted probabilistic data structure representative of a set of identifiers having attributes that satisfy target criteria for secure and computationally efficient transmission. The method can be executed, carried out, or otherwise performed by a data processing system comprising one or more processors and a memory. The method can include maintaining, in a database, a set of device identifiers. Each of the set of device identifiers can include a device attribute. The method can include generating a probabilistic data structure using the set of device identifiers and a hash function. The method can include encrypting the probabilistic data structure to create an encrypted probabilistic data structure, such that the encrypted probabilistic data structure can be combined with a second encrypted probabilistic data structure. The method can include transmitting the encrypted probabilistic data structure to a worker computing device.

In some implementations, the method can include receiving a first device identifier comprising a first device attribute. In some implementations, the method can include storing the first device identifier comprising the first device attribute as a member of the set of device identifiers. In some implementations, the method can include identifying a uniformly distributed hash function as the hash function, wherein the uniformly distributed hash function outputs uniformly distributed values. In some implementations, the hash function can be of a plurality of hash functions, and the method can include generating a vector data structure comprising a plurality of coordinates corresponding to a respective plurality of counter register. The vector data structure can be the probabilistic data structure. In some implementations, the method can include updating, for each of the set of device identifiers comprising the device attribute, a counter register of the respective plurality of counter registers of the vector data structure using the plurality of hash functions.

In some implementations, the method can include hashing a device identifier of the set of device identifiers using each of the plurality of hash functions to generate a plurality of hashed data record values. In some implementations, the method can include extracting, by the data processing system, a plurality of register identifiers from the plurality of hashed data record values. Each of the plurality of register identifiers can correspond to a respective counter register of the plurality of counter registers. In some implementations, the method can include accessing each of the plurality of counter registers that correspond to the plurality of register identifiers to identify a set of counter registers that satisfy a minimum value threshold. In some implementations, the method can include incrementing each of the set of counter registers that satisfy the minimum value threshold.

In some implementations, the method can include storing, in the database, each of the plurality of hashed data record values in association with the device identifier. In some implementations, the method can include performing a modulus operation on each of the plurality of hashed data record values using a number of the plurality of the plurality of counter registers. In some implementations, the probabilistic data structure is a matrix data structure comprising a first vector and a second vector, and the method can include selecting, a selected vector using the hash function and a device identifier of the set of device identifiers. The selected vector can be one of the first vector or the second vector. In some implementations, the method can include updating a coordinate of the selected vector of the matrix data structure using the hash function and the device identifier of the set of device identifiers.

In some implementations, the method can include hashing a device identifier of the set of device identifiers to generate a hashed device identifier. In some implementations, the method can include determining a number of least significant bits of the hashed device identifier that satisfy a predetermined bit value. In some implementations, the method can include selecting the first vector as the selected vector or the second vector as the selected vector, based on the number of least significant bits of the hashed device identifier that satisfy the predetermined bit value. In some implementations, the method can include performing a modulus operation on the hashed device identifier to calculate a counter register index value. In some implementations, the method can include selecting the coordinate using the counter register index value. In some implementations, the method can include incrementing the coordinate selected using the counter register index value.

At least one other aspect of the present disclosure is directed to a system for generating an encrypted probabilistic data structure representative of a set of identifiers having attributes that satisfy target criteria for secure and computationally efficient transmission. The system can include a data processing system comprising one or more processors and a memory. The system can maintain, in a database, a set of device identifiers, each of the set of device identifiers comprising a device attribute. The system can generate a probabilistic data structure using the set of device identifiers and a hash function. The system can encrypt the probabilistic data structure to create an encrypted probabilistic data structure, such that the encrypted probabilistic data structure can be combined with a second encrypted probabilistic data structure. The system can transmit the encrypted probabilistic data structure to a worker computing device.

In some implementations, the system can receive a first device identifier comprising a first device attribute. In some implementations, the system can store the first device identifier comprising the first device attribute as a member of the set of device identifiers. In some implementations, the system can identify a uniformly distributed hash function as the hash function, wherein the uniformly distributed hash function outputs uniformly distributed values. In some implementations, the hash function is of a plurality of hash functions, and the system can generate a vector data structure comprising a plurality of coordinates corresponding to a respective plurality of counter registers. The vector data structure can be the probabilistic data structure. In some implementations, the system can update, for each of the set of device identifiers comprising the device attribute, a counter register of the respective plurality of counter registers of the vector data structure using the plurality of hash functions.

In some implementations, the system can hash a device identifier of the set of device identifiers using each of the plurality of hash functions to generate a plurality of hashed data record values. In some implementations, the system can extract a plurality of register identifiers from the plurality of hashed data record values. Each of the plurality of register identifiers can correspond to a respective counter register of the plurality of counter registers. In some implementations, the system can access each of the plurality of counter registers that correspond to the plurality of register identifiers to identify a set of counter registers that satisfy a minimum value threshold. In some implementations, the system can increment each of the set of counter registers that satisfy the minimum value threshold.

In some implementations, the system can store, in the database, each of the plurality of hashed data record values in association with the device identifier. In some implementations, the system can perform a modulus operation on each of the plurality of hashed data record values using a number of the plurality of the plurality of counter registers. In some implementations, the probabilistic data structure is a matrix data structure comprising a first vector and a second vector, and the system can select a selected vector using the hash function and a device identifier of the set of device identifiers, wherein the selected vector is one of the first vector or the second vector. In some implementations, the system can update a coordinate of the selected vector of the matrix data structure using the hash function and the device identifier of the set of device identifiers.

In some implementations, the system can hash a device identifier of the set of device identifiers to generate a hashed device identifier. In some implementations, the system can determine a number of least significant bits of the hashed device identifier that satisfy a predetermined bit value. In some implementations, the system can select the first vector as the selected vector or the second vector as the selected vector, based on the number of least significant bits of the hashed device identifier that satisfy the predetermined bit value. In some implementations, the system can perform a modulus operation on the hashed device identifier to calculate a counter register index value. In some implementations, the system can select the coordinate using the counter register index value. In some implementations, the system can increment the coordinate selected using the counter register index value.

At least one other aspect of the present technical solution is directed to a method of efficiently transforming encrypted probabilistic data structures representing sets of identifiers for secure and computationally efficient network transmission. The method can include maintaining, by a worker computing device comprising one or more processors and a memory, in the memory, a private decryption key corresponding in part to an aggregated public key. The method can include receiving, by the worker computing device from a publisher computing device, an encrypted probabilistic data structure. The method can include decrypting, by the worker computing device, the encrypted probabilistic data structure using the private decryption key to generate a partially decrypted probabilistic data structure. The method can include encrypting, by the worker computing device, the partially decrypted probabilistic data structure using a deterministic encryption scheme to generate a deterministically encrypted probabilistic data structure. The method can include permuting, by the worker computing device, at least two elements of the deterministically encrypted probabilistic data structure to create a shuffled deterministically encrypted data structure. The method can include transmitting, by the worker computing device, the shuffled deterministically encrypted probabilistic data structure to a second worker computing device.

In some implementations, the method can further include generating, by the worker computing device, a key pair comprising the private decryption key and a first public encryption key. In some implementations, the method can further include receiving, by the worker computing device from the second worker computing device, a second public encryption key. In some implementations, the method can further include aggregating, by the worker computing device, the first public encryption key and the second public encryption key to generate the aggregated public key. In some implementations, the method can further include storing, by the worker computing device, the private decryption key and the aggregated public key in the memory of the worker computing device.

In some implementations, the method can further include transmitting, by the worker computing device to a publisher computing device, the aggregated public key. In some implementations, the method can further include receiving, by the worker computing device from a first publisher computing device, a first encrypted probabilistic data structure. In some implementations, the method can further include receiving, by the worker computing device from a second publisher computing device, a second encrypted data structure. In some implementations, the method can further include combining, by the worker computing device, the first encrypted probabilistic data structure and the second encrypted probabilistic data structure to create the encrypted probabilistic data structure.

In some implementations, the shuffled deterministically encrypted data structure comprises a first encrypted counter register and a second encrypted counter register, and the method can further include transmitting, by the worker computing device to the second worker computing device, the first encrypted counter register of the shuffled deterministically encrypted data structure to the second worker computing device in a first message. In some implementations, the method can further include transmitting, by the worker computing device to the second worker computing device, the second encrypted counter register of the shuffled deterministically encrypted data structure to the second worker computing device in a second message.

In some implementations, the method can further include generating, by the worker computing device, a random variable to determine an amount of noise to add to the partially decrypted probabilistic data structure. In some implementations, the method can further include creating, by the worker computing device, a noise array based on a baseline noise value and a maximum frequency value, the noise array comprising a plurality of noise values. In some implementations, the method can further include permuting, by the worker computing device, the noise array to generate a permuted noise array. In some implementations, the method can further include encrypting, by the worker computing device, the permuted noise array using the aggregated public key to generate an encrypted noise array. In some implementations, the method can further include transmitting, by the worker computing device, the encrypted noise array to an aggregator computing device.

In some implementations, the method can further include receiving, by the worker computing device from the second worker computing device, the baseline noise value and the maximum frequency value. In some implementations, the method can further include encrypting, by the worker computing device, a first noise value of the permuted noise array using the aggregated public key to generate a first encrypted noise value. In some implementations, the method can further include encrypting, by the worker computing device, a second noise value of the permuted noise array using the aggregated public key to generate a second encrypted noise value. In some implementations, the method can further include aggregating, by the worker computing device, the first noise value and the second noise value to generate the encrypted noise array.

In some implementations, the method can further include generating, by the worker computing device, a deterministic encryption key and a deterministic decryption key. In some implementations, the method can further include storing, by the worker computing device, the deterministic encryption key and the deterministic decryption key in the memory of the worker computing device. In some implementations, the method can further include encrypting, by the worker computing device, the partially decrypted probabilistic data structure using the deterministic encryption key to generate the deterministically encrypted probabilistic data structure. In some implementations, the method can further include receiving, by the worker computing device from a third worker computing device, a second shuffled deterministically encrypted probabilistic data structure. In some implementations, the method can further include decrypting, by the worker computing device, the second shuffled deterministically encrypted probabilistic data structure using the deterministic decryption key to generate a second shuffled partially decrypted probabilistic data structure. In some implementations, the method can further include transmitting, by the worker computing device, the second shuffled partially decrypted probabilistic data structure to the second worker computing device.

At least one other aspect of the present technical solution is directed to a system for efficiently transforming encrypted probabilistic data structures representing sets of identifiers for secure and computationally efficient network transmission. The system can include a worker computing device comprising one or more processors and a memory. The system can maintain, in the memory, a private decryption key corresponding in part to an aggregated public key. The system can receive, from a publisher computing device, an encrypted probabilistic data structure. The system can decrypt the encrypted probabilistic data structure using the private decryption key to generate a partially decrypted probabilistic data structure. The system can encrypt the partially decrypted probabilistic data structure using a deterministic encryption scheme to generate a deterministically encrypted probabilistic data structure. The system can permute at least two elements of the deterministically encrypted probabilistic data structure to create a shuffled deterministically encrypted data structure. The system can transmit the shuffled deterministically encrypted probabilistic data structure to a second worker computing device.

In some implementations, the system can generate a key pair comprising the private decryption key and a first public encryption key. In some implementations, the system can receive, from the second worker computing device, a second public encryption key. In some implementations, the system can aggregate the first public encryption key and the second public encryption key to generate the aggregated public key. In some implementations, the system can store the private decryption key and the aggregated public key in the memory of the worker computing device. In some implementations, the system can transmit, to a publisher computing device, the aggregated public key.

In some implementations, the system can receive, from a first publisher computing device, a first encrypted probabilistic data structure. In some implementations, the system can receive, from a second publisher computing device, a second encrypted data structure. In some implementations, the system can combine the first encrypted probabilistic data structure and the second encrypted probabilistic data structure to create the encrypted probabilistic data structure. In some implementations, the shuffled deterministically encrypted data structure comprises a first encrypted counter register and a second encrypted counter register, and the system can transmit, to the second worker computing device, the first encrypted counter register of the shuffled deterministically encrypted data structure to the second worker computing device in a first message. In some implementations, the system can transmit, to the second worker computing device, the second encrypted counter register of the shuffled deterministically encrypted data structure to the second worker computing device in a second message.

In some implementations, the system can generate a random variable to determine an amount of noise to add to the partially decrypted probabilistic data structure. In some implementations, the system can create a noise array based on a baseline noise value and a maximum frequency value, the noise array comprising a plurality of noise values. In some implementations, the system can permute the noise array to generate a permuted noise array. In some implementations, the system can encrypt the permuted noise array using the aggregated public key to generate an encrypted noise array. In some implementations, the system can transmit the encrypted noise array to an aggregator computing device.

In some implementations, the system can receive, from the second worker computing device, the baseline noise value and the maximum frequency value. In some implementations, the system can encrypt a first noise value of the permuted noise array using the aggregated public key to generate a first encrypted noise value. In some implementations, the system can encrypt a second noise value of the permuted noise array using the aggregated public key to generate a second encrypted noise value. In some implementations, the system can aggregate the first noise value and the second noise value to generate the encrypted noise array.

In some implementations, the system can generate a deterministic encryption key and a deterministic decryption key. In some implementations, the system can store the deterministic encryption key and the deterministic decryption key in the memory of the worker computing device. In some implementations, the system can encrypt the partially decrypted probabilistic data structure using the deterministic encryption key to generate the deterministically encrypted probabilistic data structure. In some implementations, the system can receive, from a third worker computing device, a second shuffled deterministically encrypted probabilistic data structure. In some implementations, the system can decrypt the second shuffled deterministically encrypted probabilistic data structure using the deterministic decryption key to generate a second shuffled partially decrypted probabilistic data structure. In some implementations, the system can transmit the second shuffled partially decrypted probabilistic data structure to the second worker computing device.

At least one other aspect of the present technical solution is directed to a method of secure and computationally efficient estimation of a number of members in a multiset having attributes that satisfy target criteria. The method can be performed, for example, by an aggregator computing device comprising one or more processors and a memory. The method can include receiving, by the aggregator computing device, a shuffled encrypted probabilistic data structure from a worker computing device. The method can include constructing, by the aggregator computing device, a histogram using the shuffled encrypted probabilistic data structure. The method can include estimating, by the aggregator computing device, a frequency value representing a number of device identifiers associated with an attribute that satisfies a target threshold. The method can include transmitting, by the aggregator computing device to a publisher computing device, the frequency value representing the number of device identifiers associated with the attribute that satisfies the target threshold.

In some implementations, the method can include transmitting, by the aggregator computing device, the shuffled encrypted probabilistic data structure to a second worker computing device. In some implementations, the method can include receiving, by the aggregator computing device, a shuffled partially decrypted probabilistic data structure from the worker computing device. In some implementations, the method can include decrypting, by the aggregator computing device, the shuffled partially decrypted probabilistic data structure using a deterministic decryption key to generate a shuffled probabilistic data structure. In some implementations, the method can include constructing, by the aggregator computing device, the histogram using the shuffled probabilistic data structure.

In some implementations, the method can include receiving, by the aggregator computing device, a plurality of encrypted probabilistic data structures from a respective plurality of publisher computing devices. In some implementations, the method can include combining, by the aggregator computing device, the plurality of encrypted probabilistic data structures into a combined encrypted probabilistic data structure. In some implementations, the method can include transmitting, by the aggregator computing device, the combined encrypted probabilistic data structure to the worker computing device.

In some implementations, the method can include multiplying, by the aggregator computing device, a first encrypted probabilistic data structure of the plurality of encrypted probabilistic data structures with a second encrypted probabilistic data structure of the plurality of encrypted probabilistic data structures to combine the plurality of encrypted probabilistic data structures using homomorphic addition. In some implementations, the method can include receiving, by the aggregator computing device, a first encrypted noise array from the worker computing device. In some implementations, the method can include receiving, by the aggregator computing device, a second encrypted noise array from a second worker computing device. In some implementations, the method can include aggregating, by the aggregator computing device, the first encrypted noise array and the second encrypted noise array to generate an aggregated noise array. In some implementations, the method can include appending, by the aggregator computing device, the aggregated noise array to the combined encrypted probabilistic data structure.

In some implementations, the method can include determining, by the aggregator computing device, an average noise value. In some implementations, the method can include subtracting, by the aggregator computing device, the average noise value from at least one value of the histogram to remove noise from the histogram. In some implementations, the shuffled encrypted probabilistic data structure is a set of noised matrices, each of the set of noised matrices corresponding to a respective one of a set of publisher computing devices, and the method can include estimating, by the aggregator computing device, an estimated cardinality value for each noised matrix of the set of noised matrices. In some implementations, the method can include ranking, by the aggregator computing device, the set of noised matrices based on the estimated cardinality value for each noised matrix of the set of noised matrices. In some implementations, the method can include selecting, by the aggregator computing device, a first subset of the set of noised matrices and a second subset of the set of noised matrices based on the ranking. In some implementations, the method can include constructing, by the aggregator computing device, the histogram based on the first subset of the set of noised matrices and the second subset of the set of noised matrices.

In some implementations, the method can include identifying, by the aggregator computing device, a row of the noised matrix that includes a number of zeros that is less than or equal to half the number of positions in the row of the noised matrix, wherein the row of the noised matrix corresponds to a row index value. In some implementations, the method can include calculating, by the aggregator computing device, the estimated cardinality value of the noised matrix using the row index value. In some implementations, the method can include determining, by the aggregator computing device, that the estimated cardinality value of a first noised matrix of the set of noised matrices is greater than the estimated cardinality value of a second noised matrix of the set of noised matrices. In some implementations, the method can include assigning, by the aggregator computing device, a first rank value to the first noised matrix that is greater than a second rank value. In some implementations, the method can include assigning, by the aggregator computing device, the second rank value to the second noised matrix.

In some implementations, the method can include generating, by the aggregator computing device, based on a first Monte-Carlo sampling of the first subset of noised matrices, a first de-noised union vector. In some implementations, the method can include generating, by the aggregator computing device, based on a second Monte-Carlo sampling of the second subset of noised matrices, a second de-noised union vector. In some implementations, the method can include combining, by the aggregator computing device, the first de-noised union vector and the second de-noised vector into a combined union data structure. In some implementations, the method can include constructing, by the aggregator computing device, the histogram using the combined union data structure.

At least one other aspect of the present technical solution is directed to a system for secure and computationally efficient estimation of a number of members in a multiset having attributes that satisfy target criteria. The system can include an aggregator computing device comprising one or more processors and a memory. The system can receive a shuffled encrypted probabilistic data structure from a worker computing device. The system can construct a histogram using the shuffled encrypted probabilistic data structure. The system can estimate a frequency value representing a number of device identifiers associated with an attribute that satisfies a target threshold. The system can transmit, to a publisher computing device, the frequency value representing the number of device identifiers associated with the attribute that satisfies the target threshold.

In some implementations, the system can transmit the shuffled encrypted probabilistic data structure to a second worker computing device. In some implementations, the system can receive a shuffled partially decrypted probabilistic data structure from the worker computing device. In some implementations, the system can decrypt the shuffled partially decrypted probabilistic data structure using a deterministic decryption key to generate a shuffled probabilistic data structure. In some implementations, the system can construct the histogram using the shuffled probabilistic data structure.

In some implementations, the system can receive a plurality of encrypted probabilistic data structures from a respective plurality of publisher computing devices. In some implementations, the system can combine the plurality of encrypted probabilistic data structures into a combined encrypted probabilistic data structure. In some implementations, the system can transmit the combined encrypted probabilistic data structure to the worker computing device. In some implementations, the system can multiply a first encrypted probabilistic data structure of the plurality of encrypted probabilistic data structures with a second encrypted probabilistic data structure of the plurality of encrypted probabilistic data structures to combine the plurality of encrypted probabilistic data structures using homomorphic addition.

In some implementations, the system can receive a first encrypted noise array from the worker computing device. In some implementations, the system can receive a second encrypted noise array from a second worker computing device. In some implementations, the system can aggregate the first encrypted noise array and the second encrypted noise array to generate an aggregated noise array. In some implementations, the system can append the aggregated noise array to the combined encrypted probabilistic data structure. In some implementations, the system can determine an average noise value. In some implementations, the system can subtract the average noise value from at least one value of the histogram to remove noise from the histogram.

In some implementations, the shuffled encrypted probabilistic data structure is a set of noised matrices, each of the set of noised matrices corresponding to a respective one of a set of publisher computing devices, and the system can estimate an estimated cardinality value for each noised matrix of the set of noised matrices. In some implementations, the system can rank the set of noised matrices based on the estimated cardinality value for each noised matrix of the set of noised matrices. In some implementations, the system can select a first subset of the set of noised matrices and a second subset of the set of noised matrices based on the ranking. In some implementations, the system can construct the histogram based on the first subset of the set of noised matrices and the second subset of the set of noised matrices.

In some implementations, the system can identify a row of the noised matrix that includes a number of zeros that is less than or equal to half the number of positions in the row of the noised matrix, wherein the row of the noised matrix corresponds to a row index value. In some implementations, the system can calculate the estimated cardinality value of the noised matrix using the row index value. In some implementations, the system can determine that the estimated cardinality value of a first noised matrix of the set of noised matrices is greater than the estimated cardinality value of a second noised matrix of the set of noised matrices. In some implementations, the system can assign a first rank value to the first noised matrix that is greater than a second rank value. In some implementations, the system can assign the second rank value to the second noised matrix.

In some implementations, the system can generate based on a first Monte-Carlo sampling of the first subset of noised matrices, a first de-noised union vector. In some implementations, the system can generate, based on a second Monte-Carlo sampling of the second subset of noised matrices, a second de-noised union vector. In some implementations, the system can combine the first de-noised union vector and the second de-noised vector into a combined union data structure. In some implementations, the system can construct the histogram using the combined union data structure.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. These and other aspects and features of the present technical solution will become apparent to those ordinarily skilled in the art upon review of the following description in conjunction with the accompanying figures, wherein:

FIG. 4C depicts a block diagram of an example system for partial decryption and shuffling of a combined vector processed by each worker;

DETAILED DESCRIPTION

Figure 1:
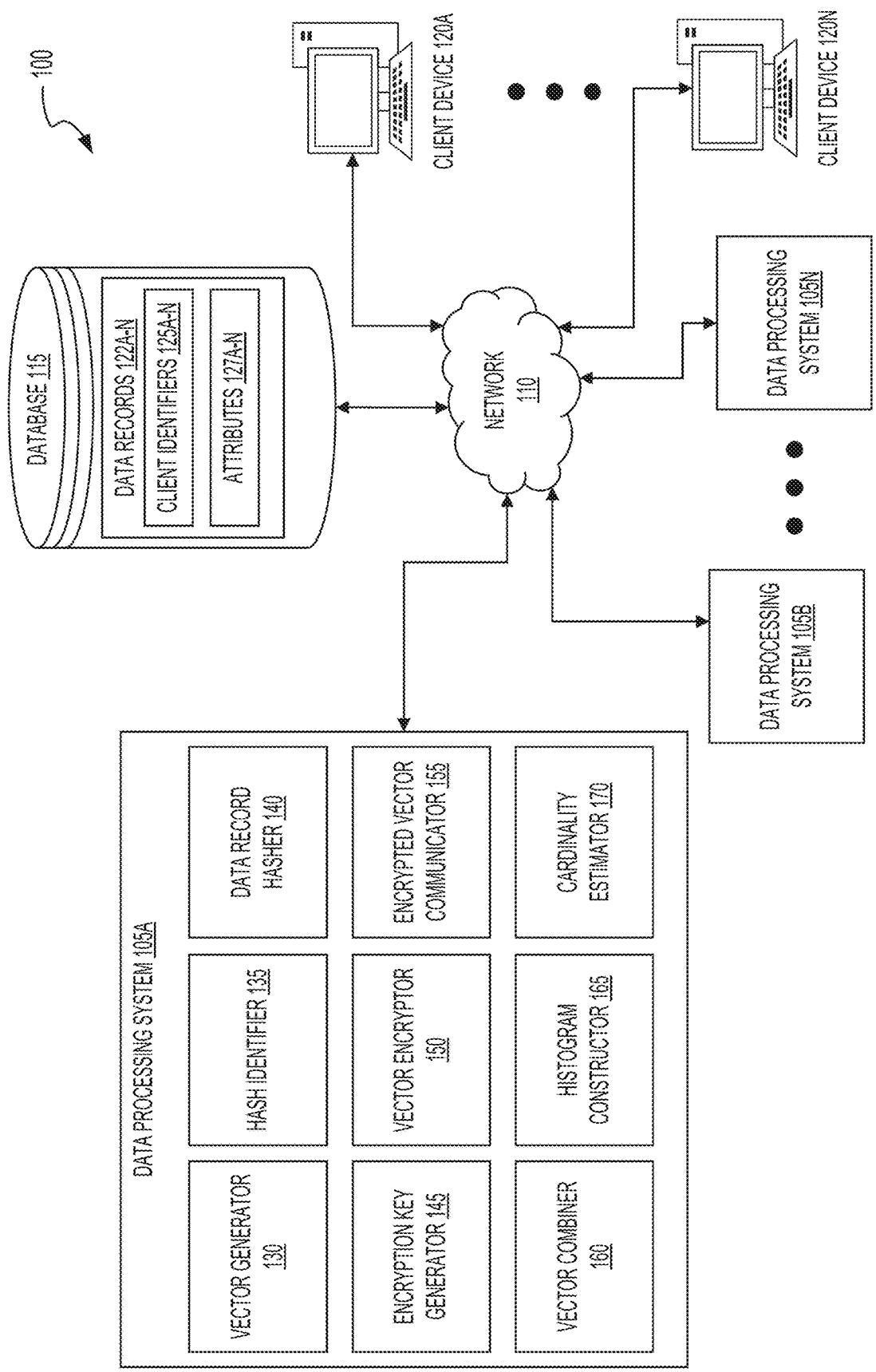
FIG. 1 depicts a block diagram illustrating an example implementation of a system for generating a counting bloom filter to determine count and frequency of device identifiers.

Below are detailed descriptions of various concepts related to, and implementations of, methods, apparatuses, and systems of estimating the frequency of large multisets based on encrypted probabilistic data structures. The various concepts introduced above and discussed in greater detail below may be implemented in any of numerous ways, as the described concepts are not limited to any particular manner of implementation. Examples of specific implementations and applications are provided primarily for illustrative purposes.

For the purposes of reading the description of the various implementations and techniques described herein, the following brief descriptions of the sections of the Specification may be helpful.

Section A describes techniques implementing counting bloom filters to estimate the frequency and cardinality of multisets in a differentially private manner. One or more of such techniques, or aspects thereof, can be implemented with one or more implementations described herein.

Section B describes techniques implementing cascading legions data structures to estimate the frequency and cardinality of multisets. One or more of such techniques, or aspects thereof, can implemented with one or more implementations described herein.

Section C describes alternate techniques to implement differentially private cascading legions data structures to estimate the frequency and cardinality of multisets in a differentially private manner. One or more of such techniques, or aspects thereof, can implemented with one or more implementations described herein.

Section D describes techniques that combine properties of HyperLogLog sketches and counting bloom filters to estimate the frequency and cardinality of multisets using continuous liquid legions. One or more of such techniques, or aspects thereof, can implemented with one or more implementations described herein.

Section E describes techniques implementing exponential generalized bloom filters to estimate the frequency and cardinality of multisets. One or more of such techniques, or aspects thereof, can implemented with one or more implementations described herein.

The term "alternative," as used herein, need not refer to an exclusive alternative option—multiple implementations, techniques, systems, methods, or processes described as "alternatives" to each other may be used in combination, as appropriate.

The term "sketch," as used herein, shall refer to one or more data structures containing one or more data elements, data records, variables, counter registers, floating point values, strings, index values, memory pointer values, or any combination thereof as described herein. The term "sketch" and "data structure" may sometimes be used interchangeably.

A. System Overview and Counting Bloom Filter Frequency and Cardinality Estimation Identifier servers can be associated with sets of client devices, for example by maintaining a client identifier that is associated with the respective client device. Each client identifier can include attribute information that describes the association between each identifier server and client device. Attribute information can include information about the relationship between the client device and the identifier server (e.g., web-browsing history, interaction data, association time, network analysis data, etc.), and can include protected or otherwise private information received from the respective client device. Different identifier servers may maintain different attribute data and different client identifiers that correspond to the same respective client devices. Typically, to determine whether there is duplicate attribute data between each identifier server, the identifier servers may share the attribute data, which can include protected or private information, to a centralized server to de-duplicate any client attribute information.

However, the transmission of all client attribute data poses issues to scalability. As the number of client identifier servers increases, the amount of client device attribute data transmitted via the network typically increases as well. Because the attribute data can be detailed and relatively large for each client device, transmitting such information at scale can exhaust network bandwidth and computational resources. Further, it would be beneficial for a system to not only compute a total number of user identifiers, but also compute the number of client devices that satisfy a particular attribute data criteria, such as the frequency of a particular attribute, without transmitting protected or private attribute information over the network.

To address the foregoing issues, aspects of systems and methods of this technical solution can utilize counting bloom filters to determine a common number of client devices between large numbers of identifier servers. Each identifier server can generate a counting bloom filter that represents their associated set of client device identifiers and attribute data. A counting bloom filter can be a vector of counter registers (sometimes referred to as "buckets"), where each bucket is associated with a bucket identifier corresponding to its position, or index value, in the counting bloom filter. Each identifier server can apply one or more hash functions to the client device identifiers and attribute data to generate one or more hashed identifiers. The system can extract a pointer from the hashed identifiers to one or more buckets of the counting bloom filter, and increment those buckets. The system can use a min-incrementing technique, where only the smallest buckets of the bloom filter are incremented. By using a min-counting technique, the system can not only estimate the total number of client devices associated with each identifier server, but can also estimate the number of client devices that are associated attribute data indicating a minimum attribute value. The counting bloom filter can further be any string of numbers, integers, or values that can track numbers of items in sets of data, for example a bloom filter, or other generalized data structure. Estimating information about frequency of client device attributes can be useful to determine macroscopic data trends between client devices and identifier servers, for example to make decisions about network bandwidth routing and computing resource allocation.

To maintain differential privacy of the counting bloom filters of each identifier server, the system can construct bucket histograms of the counting bloom filters, thereby abstracting the buckets. To create the bucket histograms, each identifier server can encrypt its counting bloom filter bucket-wise using a private key known only to the respective identifier server, and send the encrypted bloom filter to a known worker computing devices (e.g., the worker computing devices 405, the aggregator computing device 410, etc.). The worker computing devices can combine all of the identifier server encrypted counting bloom filters into a single combined encrypted data structure. The combined bloom filter is still encrypted with the private keys of each identifier server. The combined bloom filter is then passed sequentially to each worker computing device, which can decrypt the combined filter using a shared key, and then encrypt (e.g., deterministically, non-deterministically, etc.) each bucket. The work can then apply noise by adding and/or removing a number of additional buckets, such that when the bucket histogram is created it will be differentially private. The worker can rearrange (e.g., permute, etc.) the bloom filter and send it to the next worker. This continues until the final bloom filter is received by the first worker again. The workers can then encrypt each value from 0 to the max desired frequency with each of the worker's deterministic keys. The first worker can construct the bucket histogram, and any value that cannot be decrypted is assumed to be equal to the max frequency and is added to that bucket. The final histogram is used to estimate the total number of unique client devices across all the identifier servers, along with the corresponding frequency of desired attribute data.

Accordingly, aspects of this technical solution can provide increased security of client device identifier and data counting systems. By using encrypted counting bloom filters and a homomorphic encryption scheme, aspects of this technical solution can decrease the amount of data transmitted over the network, which is a significant improvement over other attribute data counting and comparison systems. Further, by using an estimated histogram, this technical solution can provide accurate estimations of client identifier attribute data frequencies without transmitting and protected or private information via the network. This not only protects identifier servers from exposing the number or attributes of their associated devices, but also protects client devices from exposing their protected or private information, which is a significant improvement to the security of networking systems.

In some implementations, the device identifiers and attribute data can be used to calculate a K+ value, in a privacy preserving manner across identifier servers. The values for K+, which can reflect the frequency with which a particular attribute appears K or more times across identifiers servers, can be computed using counting bloom filters, as described herein. Once the measurement method has been discussed, a secure multi-party communication (MPC) protocol for aggregating bloom filters across multiple parties in a differentially private manner is presented.

The systems and methods of this technical solution can describe an industry wide effort to measure cross-media reach and attribution across multiple identifier servers (e.g., publishers, providers, etc.) in a secure and privacy preserving manner. Hundreds or even thousands of identifier servers can participate in this system. The algorithms detailed herein below for computing the K+ values, the intersections, unions, and attribute frequencies addresses both the scale of the problem and its stringent privacy requirements through the use of counting bloom filters for frequency estimation and a secure MPC protocol for combining bloom filters across publishers. Finally, it is important that such systems and methods of aspects of this present solution can be performed, executed, or otherwise operated by different entities without concern that any set of entities would breach the private or protected information of the other parties involved.

The reach of a particular set of attributes can be defined as the number of client devices that have been exposed to or otherwise reflect the respective attribute. Frequency can be defined as the number of times that a client device has been associated with a particular attribute. K+ values (e.g., K+ reach, etc.) can describe a measurement that reflects the number of client devices with a frequency that is greater than a given value K for a particular attribute. In other words, it is the number of client devices that are associated with a particular attribute K or more times.

HyperLogLog (HLL) can be used as a cardinality estimator. A cardinality estimator can estimate the number of elements in some multiset M that is in practice very large. HLLs can be characterized by low error rates, low variance, and low memory usage. Moreover, the union of two HLLs can be trivial to compute, meaning that HLLs can be implemented in distributed counting applications. An extension of HLL, called FreqLogLog (FLL), can allow the number of elements in M along with their frequencies to be estimated.

Bloom filters can provide a compact representation of a set. Bloom filters can implement both an insert and contains method, however due to the compact representation there is a small probability of the contains method returning a false positive. This means that an element may be said to be in the set when it may not be in the set. On the other hand, false negatives are precluded, that is if the contains method returns false it may be always correct.

An empty bloom filter can be a bit array of size m with all of its bits set to zero. An element, x, can be inserted by passing it through k hash functions modulus m, and then setting the corresponding bits in the Bloom filter to 1 (see example below). The contains method can work in a similar fashion, and may return true if all k hashes of x modulus m are set to 1 and false otherwise. An example of an empty bloom filter is illustrated below in Table 1.

TABLE 1

| ID    | 0 | 1 | 2 | 3 | 4 | 5 | 6 | 7 | 8 | 9 | 10 |
|-------|---|---|---|---|---|---|---|---|---|---|----|
| Value | 0 | 0 | 0 | 0 | 0 | 0 | 0 | 0 | 0 | 0 | 0  |

The bit string indicated by the 'Value' row represents an empty bloom filter, where each position in the bloom filter (e.g., indicated by the numerical columns in the 'ID' row) is set to a value of binary zero. Here, the value of m is 11, and the identifiers of the m positions span from zero to ten.

Due to their comparatively high memory requirements, (e.g., with respect to HLLs), Bloom filters may not be typically used for cardinality estimation, however the cardinality of a Bloom filter can be determined by evaluating the following formula:

$$\frac{m}{k} \ln 1\frac{X}{m}$$

In the above equation, k can be the number of hashes used in a bloom filter, m can be the number of bits in the bloom filter, x can be the number of filled buckets in the bloom filter, and n can be the number of the estimate of the cardinality of the bloom filter.

The variance of the estimator is approximated by the following equation.

$$\frac{Xm}{mX}$$

The variance can be based on a Taylor expansion.

The estimate of the bias can be provided by the following equation.

$$\frac{X}{2mX}$$

Counting bloom filters (CBF) are an extension of standard bloom filters that can provide a delete operation. Counting bloom filters work similarly to standard bloom filters. In counting bloom filters, the bit array is replaced by an array of counts. For completeness it is worth noting that the use of the delete operation can introduce the possibility of false negatives. The example illustrated in FIGS. 2A-2C indicate the insertion of three elements into a CBF where one of the elements (x) is inserted twice.

Figure 3A:
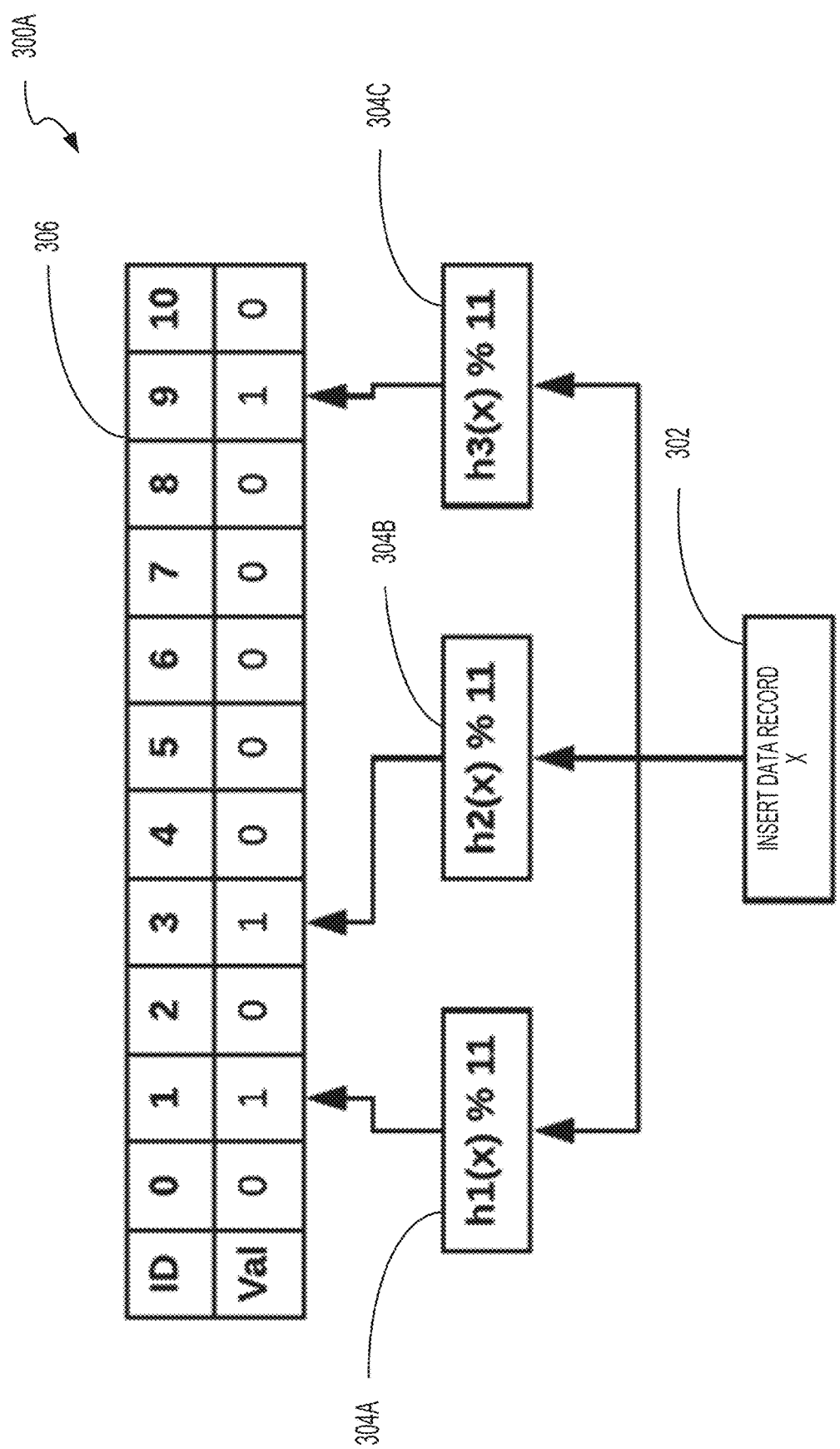
FIG. 3A depicts an example system flow diagram illustration the insertion of a first data record into a min-increment counting bloom filter.
Figure 3B:
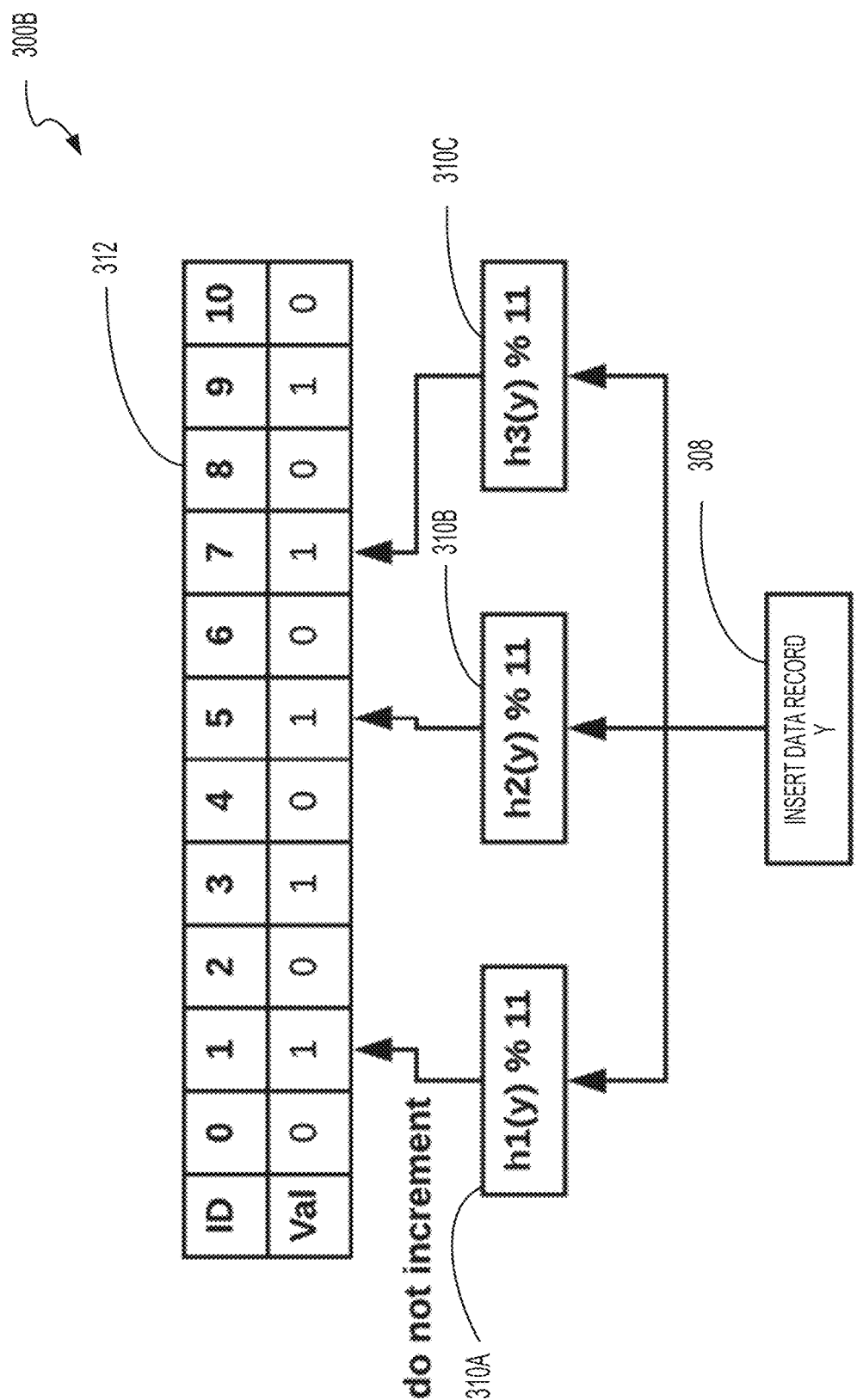
FIG. 3B depicts an example system flow diagram illustration the insertion of a second data record into a min-increment counting bloom filter.
Figure 3C:
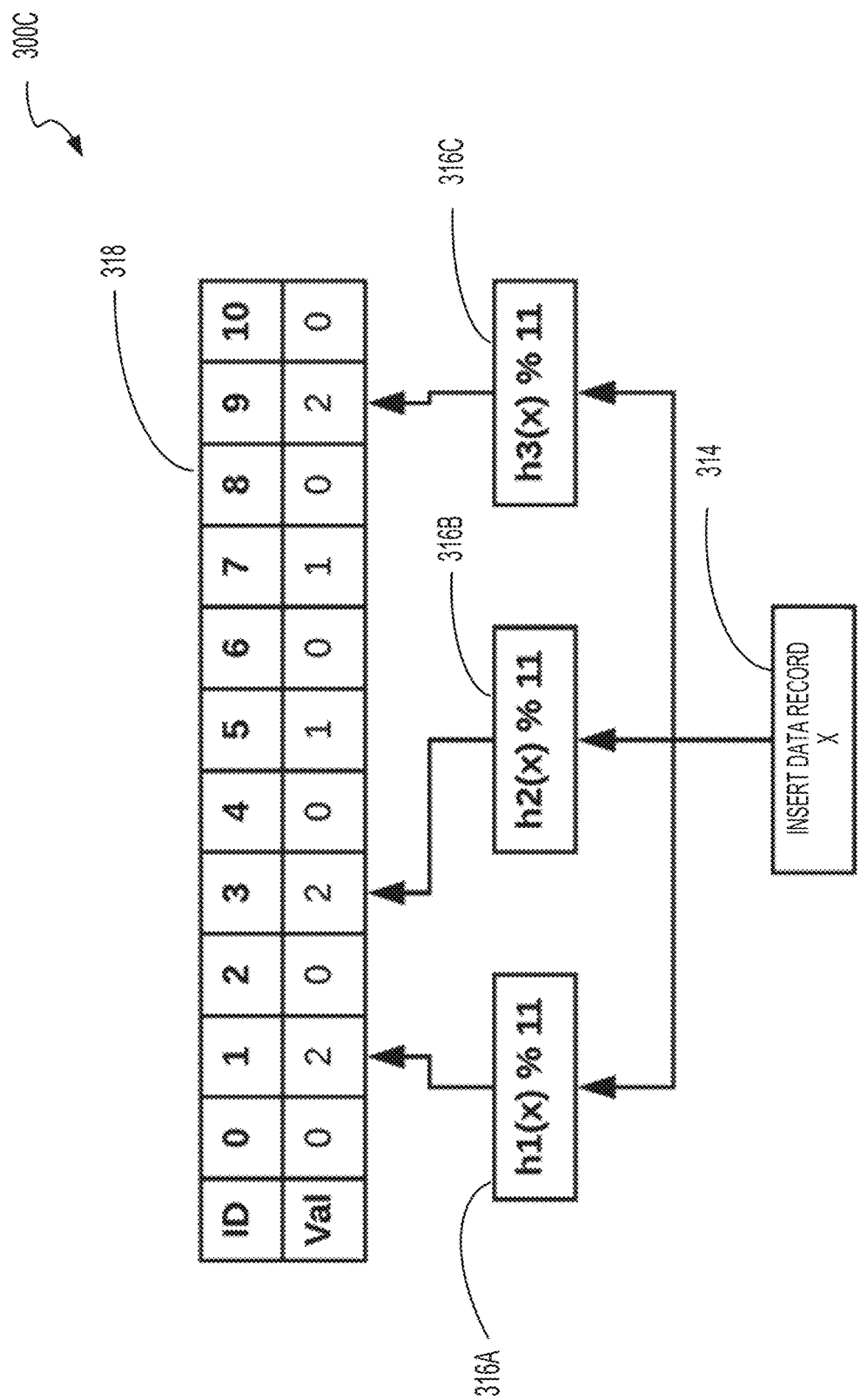
FIG. 3C depicts an example system flow diagram illustration the insertion of a third data record into a min-increment counting bloom filter.

Min-increment describes a technique that can minimize CBF counter values over the course of many insert operations. When inserting some element into the CBF using min-increment, the buckets that shall be incremented are those with the minimum value. The minimum bucket value can represent the maximum number of times the element being inserted could have been previously inserted into the counting bloom filter. This technique can be used to record traffic flows in computer networks, however instead of incrementing the CBF's buckets by 1, the traffic flow monitoring application can increment the values of the buckets by the number of bytes in in a packet. This can avoid overestimation of traffic. An example of a min-increment counting bloom filter is illustrated in FIGS. 3A-C.

Estimating K+ values with a counting bloom filter can consist of iteratively applying the Bloom filter cardinality estimation formula shown above. For basic (1+) values, this technical solution can apply the formula directly, whereas for K+ values, this technical solution can count as filled those buckets with values greater than or equal to K and then apply the same formula. For example, 3+ values can be determined by counting as zeroes all buckets with values 0, 1, or 2. An important observation is that this method can use a histogram of CBF bucket values where the histogram bin ranges are [0, 1), [1, 2), [2, 3), and so on. The multi-identifier server case can be addressed by observing that the union of CBFs can be achieved by summing them bucket-wise, assuming of course, that the CBFs had the same configuration (i.e. identical m, k, and hash functions), and were populated from the same identifier space.

Secure Computation of the CBF Histogram

The inputs to this protocol can come from a large number of identifier servers (e.g., publishers, providers, etc.) (hundreds or low thousands), making simple MPC approaches too inefficient. Instead, the "worker/client" MPC pattern will be followed, in which a small number of workers (e.g. 3) can participate in the interactive MPC protocol, using data from a large number of publishers. The security provided will be that unless all worker parties are corrupt, the identifier server's data can remain private. In this scheme, different entities can operate different workers.

The protocol can be open to arbitrarily many parties acting as workers. In many implementations, the number of workers is fixed and the set of workers is known by the rest of the workers before execution of the protocol beings. Note that, initialization of the protocol may require communication that is quadratic in the number of workers.

A brief overview of the protocol is provided below.

Each worker (W) can generate an additively homomorphic (e.g., ElGamal) key pair (SK, PK). The public keys of all workers are combined to create an uber-public key (UPK) that can be distributed to each identifier server.

Each publisher (P) can create a CBF and encrypt it bucket-wise with the UPK and send it to a single well known (e.g., trusted, random, etc.) worker.

Then, the first worker can combine the publisher CBFs into a final combined CBF by summing them bucket-wise. Note that the final CBF is still encrypted with the private keys of each worker.

Next, the bloom filter can be passed to each worker.

The worker can decrypt the CBF with its SK, and deterministically encrypt each bucket.

The worker can apply noise by adding or removing a number of additional buckets such that when the bucket histogram is created it will be differentially private.

The worker can then permute the bloom filter.

The worker can then send the permuted bloom filter to the next worker.

This process is repeated until the first worker gets a permuted bloom filter back (e.g., a ring configuration, etc.) that is encrypted under a fully deterministic encryption scheme.

Next, the workers can encrypt each value from 0 to the max desired frequency with each of the workers' deterministic keys.

The first worker can construct the bucket histogram. Any value that cannot be decrypted is assumed to be equal to max frequency and can be added to that bucket.

Finally, the histogram is used to estimate reach and frequency up to the max frequency and these estimates are the final output of the protocol.

ElGamal Encryption

ElGamal encryption is a simple public-key encryption scheme that can be adapted to support threshold decryption. It can be viewed as an offline variant of the Diffie-Hellman key exchange protocol, and can be implemented using elliptic curve cryptography. The basic scheme, for an elliptic curve group with generator G, is as follows.

KeyGen: Choose a random integer X modulo q (the order of the elliptic curve group). This is the private key used for decryption; the public key is G^X.

Encrypt(pk, m): Choose a random integer R modulo q. The ciphertext is (G^R, m pk^R) which is (G^R, m G^(X R)).

Decrypt(sk, m): Compute G^(X R) using the secret key, and then m=m pk^R/G^(X R).

The threshold version of this scheme can provide that the secret key X be distributed as shares using a secret sharing scheme (e.g., Shamir's secret key sharing scheme, etc.). Each party can compute a "public key share" using its share of the secret key, and the "true" public key can then be computed by combining the secret key shares in the exponent (note that combining shares is a linear operation, which can be done in the exponent using the group operation). In the case where the threshold is N-of-N, this can be done by simply multiplying all the "public key shares" together. Decryption shares can be computed by performing the decryption operation using the secret key shares, and combining the result in the same manner as the public key was computed.

A simple example of the threshold variant is as follows: two workers generate keys G^X and G^Y. If these public keys are multiplied we get G^(X+Y), which can be used as a public key for encryption; the corresponding secret key is X+Y. Notice, however, that for decryption the original secret keys can be applied one-by-one (in any order), so no single party needs to know the joint private key.

ElGamal encryption can include an additional useful property: it can support a multiplication homomorphism. Given two ciphertexts (G^R1, M1 G^X R1), (G^^, M2 G^X R2), we can compute (G^(R1+R2), M1 M2 G^X(R1+R2)), which can decrypt to the product of the two messages. Note that this is an additive homomorphism on the discrete logarithms of the messages; in other words, we could have used this to compute (G^(R1+R2), G^(M1+M2) G^X(R1+R2)), which works for small message spaces (small enough to compute discrete logarithms efficiently).

In our case, performing sums in the exponent can be sufficient. The counting bloom filter estimation can use a count of the elements less than the threshold K, which is small enough that a lookup table will suffice for decoding. There is also a small security benefit here: the aggregator can learn counts for values above the threshold, without learning what those values are. To do so, the workers can use deterministic encryption (e.g., the Pohlig-Hellman cipher, etc.), which can involve each worker choosing a secret exponent that is applied to all the partially decrypted buckets; this can also be performed via the homomorphism (this is equivalent to changing the generator G to some random group element).

Approach Using Bloom Filters, (n−1) Collusion HBC

In this approach, the workers may use additive homomorphic encryption, with a threshold private key, to compute sums of their counting bloom filters, followed by a secure shuffle and deterministic encryption before revealing the result to the aggregator. The sum can be computed directly by one party using the additive homomorphism (e.g. by having the publishers send encryptions of their bloom filters to a designated worker, etc.).

To permute efficiently, this technical solution can use the threshold property of the encryption scheme. To avoid trusting any single party to perform the permutation, the solution can have each party randomly permute the filter (recall that the composition of two permutations is a permutation). The first party, which received the encrypted bloom filters and computed the initial sum, can perform the first permutation. That party can then re-randomize the encrypted bloom filter, then apply its decryption key share to partially decrypt the result, and finally apply its key share of the deterministic scheme. The shuffled/rerandomized ciphertexts can then be sent to the next party, and in the end to the aggregator for the final decryption.

Step 1: Setup ElGamal Keys

As a first step, the workers set up threshold ElGamal keys as described above and then make the combined key available to each of the publishers.

Step 2: Inputs

This protocol can compute a sum. The identifier servers can encrypt their counting bloom filter bucket-wise with the composite public key provided by the workers and send the ciphertext to the "first" party, which can be chosen arbitrarily. That party can then compute a sum using the homomorphic addition operation on the ciphertexts, and can append the decoding lookup table by encrypting the values that the aggregator will be allowed to learn under the deterministic encryption. It is possible for this party to be the aggregator itself, but in that case the aggregator should not partially decrypt the ciphertext before sending it to the next party for permutation—the aggregator's decryption should be the last step to ensure that the aggregator learns the result (the permuted, deterministically encrypted bloom filter).

Step 3: Shuffling

Next, the first party can partially decrypt the ciphertexts, apply its deterministic encryption key, shuffle the encrypted filter (but not the lookup table), and forward everything to the second party. The second party can then partially decrypt, apply the deterministic encryption under its key, and shuffle (e.g., permute, change the order of, or otherwise swap positions in the probabilistic data structure, etc.), and forward everything to the third party, and so forth, until the only remaining decryption involves the aggregator's key.

By setting a threshold of N for the secret sharing scheme, this technical solution can provide that no colluding subset of the workers can violate the privacy of any other party. The permutation can also remain secret against arbitrary collusion among the workers, as only one of the workers needs to keep its permutation secret. Another option is to compute the sum of values larger than K using an MPC protocol, but doing so may be much more computationally intensive.

Distributed Differentially Private Noise Generation

Addition of noise happens in a distributed fashion, such that the total noise added to each histogram bin can follow a two-tailed geometric distribution as described herein. Specifically, for each histogram bin, [0, max frequency], each worker can generate a random variable (e.g., a Polya (special case of negative binomial) random variable, etc.) that can determine how much noise that worker can add to each bin. Thus, because a sum of appropriately constructed random variables can equal a two-tailed geometric random variable, each bin can receive the desired amount of noise. There are a few modifications to the protocol described above in order to achieve this.

The following may occur before the shuffle (e.g. permutation by each worker) begins.

Workers can agree on a noise baseline, which can be an integer that with high probability can be greater than any negative noise value generated by an individual worker. Call this value B.

Each worker can generate a max_frequency+1 random variables (e.g., Polya random variables, etc.) $[X_0, X_1, \ldots X_i, \ldots, X_{mf}]$ and create an array of size $B-X_i$. Call this the noise array.

Then, for each i, the noise array can be filled with $B-X_i$ copies of i.

Then, each worker can shuffle their noise arrays and encrypt each value with an ElGamal public key.

Then, each worker can send their noise arrays to the worker that will begin the shuffle.

Then, the first worker can append all of the noise arrays to the CBF before summing together all of the CBFs as described in the protocol above.

Finally, after the histogram is constructed the aggregator can subtract B*the number of workers from each histogram bucket, essentially removing the noise baseline from each bin, and leaving behind only the two-sided geometric noise.

At least one protection for the above protocol would be for identifier servers to maintain their own thresholds whereby they would not contribute a set to the computation unless it already contained N client identifiers or attributes. Adding DP noise to the bloom filter during the shuffle step would also help alleviate concerns.

A fundamental issue with using a CBF for cardinality/frequency estimation is that the number of buckets required to maintain a fixed error rate scales linearly in the size of the set whose size is being estimated. Moreover, the secure protocol requires that each publisher encrypt each bucket of every CBF that is generated.

The scale of the problem, can assume that about 50 billion identifiers can be processed per day in order to compute reach values across various attributes. If we assume that the Bloom filter adds a 3× overhead to this then each identifier server can perform 150 billion bucket encryptions, which using the numbers from the above doc implies that ~42 CPU hours are needed. Assuming 64-byte cipher texts, this can provide about 9.6 TB of data transfer per day. This is considerable, especially when we reflect that it is a constant that would apply to publishers of all sizes. Fortunately, there are some ways to mitigate this overhead.

First, it can be possible to do away with the identifier server side encryption and thereby the communication overhead that comes from the accompanying ciphertext expansion. Here, for each bucket, an identifier server can generate k random numbers that sum to the value of the bucket such that the CBF is represented by k arrays that when summed element wise are equal to the CBF. Then, the identifier server can send the arrays, henceforth called CBF shares, to distinct MPC workers who can sum CBF shares across publishers before applying the El Gamal encryption layer as described above. Once encrypted, each worker can send the encrypted CBF shares to a single worker who can combine them, the result of which is the fully combined x-pub CBF. From here, the decrypt/shuffle steps of the protocol as described herein above can commence. In this option, the size of the bucket shares could possibly be 1-byte, 2-bytes, or 4-bytes resulting in 450 GB, 900 GB, or 1800 GB of data transfer per day, where for the 1-byte case we have (3 shares*1 byte*50 billion). This can provide a substantial improvement to MPC systems, secure identifier counting systems, frequency counting systems, and identifier communication systems.

At least one other improvement is for an identifier server to trust one of the workers and send its CBF in the clear to that worker. Then, the CBFs for a single worker can be combined in the clear and that worker can take on the burden of encrypting what is a partial x-pub CBF. These partial x-pub CBFs can then be sent to a single worker who can combine them homomorphically. And, as described herein, the decrypt/shuffle step can begin. In this case, assuming one-byte per bucket, we have 150 GB of data transfer per day. This can provide a substantial improvement to MPC systems, secure identifier counting systems, frequency counting systems, and identifier communication systems.

Interestingly, the implementations described herein can be combined with the two alternatives described above, and each identifier server (e.g., publisher) can independently choose how to interact with the system. Notice that by the associative property of addition, each worker can readily combine CBF shares and cleartext CBFs. Then, such a combination can be encrypted and combined with other encrypted CBFs on a per worker basis before all workers send their encrypted partial x-pub CBFs to a single worker who can homomorphically combine the encrypted partial x-pub CBFs to get a complete x-pub CBF, and again can start the shuffle step of the original protocol. This can provide a substantial improvement to MPC systems, secure identifier counting systems, frequency counting systems, and identifier communication systems.

The following describes a cryptographically secure protocol for computing a differentially private CBF histogram.
Differentially Private CBF Buckets Taking the entire CBF as the output of a query, the first task is to determine its sensitivity. This can first be done for the case of a single attribute and then extended to all of the attributes associated with a single client device. Ignoring collisions, at most k (the number of hashes) buckets are incremented per insertion. This could be smaller for the min-increment case, but assuming the worst case will not hurt privacy, and characterizing the min-increment case does not seem tractable.

At least one way to consider the query sensitivity with respect to a single impression is to consider the output of each hash function as a distinct query with an L1 sensitivity of 1, in which case, the sensitivity of the entire CBF query is k. The other extreme is to declare the entire CBF query to have a sensitivity of 1. The following will proceed with this characterization and even with this relaxed assumption it will be shown that DP at the bucket level is not feasible.

Recall that sensitivity can be defined as the maximum distance between two neighboring databases. Then, if we assume that the sensitivity of the CBF with respect to a single impression is 1, extending this to a client identifier means that the sensitivity can be equal to the total number of attributes associated with the client identifier with the most associations with the particular attribute. Put another way, this can be the maximum frequency, which can be bounded by the minimum value of the k largest buckets, where the argument for this is akin to the argument for the validity of min-increment.

Then, to make a CBF differentially private, it is enough to estimate the maximum frequency as described and apply two-sided geometric noise to each bucket, truncating the noise such that any bucket that would become negative is assigned to have zero value. The following table shows the parameter to the geometric distribution for various values of epsilon and sensitivity.

| ep-    | sensitivity | | | | | | |
|--------|--------|--------|--------|--------|--------|--------|--------|
| silon  | 1      | 2      | 4      | 7      | 8      | 16     | 32     |
| 0.1    | 0.0952 | 0.0488 | 0.0247 | 0.0142 | 0.0124 | 0.0062 | 0.0031 |
| 0.25   | 0.2212 | 0.1175 | 0.0606 | 0.0351 | 0.0308 | 0.0155 | 0.0078 |
| 0.5    | 0.3935 | 0.2212 | 0.1175 | 0.0689 | 0.606  | 0.0308 | 0.0155 |
| 1      | 0.6321 | 0.3935 | 0.2212 | 0.1331 | 0.1175 | 0.0606 | 0.0308 |
| 2      | 0.8647 | 0.6321 | 0.3935 | 0.2485 | 0.2212 | 0.1175 | 0.0606 |
| 3      | 0.9502 | 0.7769 | 0.5276 | 0.3486 | 0.3127 | 0.1710 | 0.0895 |

One observation is that the tail of the distribution can be quite long for even modest values of epsilon and sensitivity. For example, assuming that a typical value for max frequency is 8, which could be substantially underestimated, then the amount of noise required for even an epsilon of I starts to look untenable. However, recall that a histogram of bucket counts can be used for the estimation, and so there is some possibility that in aggregate the noise can be removed. Specifically, the noisy histogram can be multiplied by a correction matrix that yields a de-noised histogram based on the expectation of the two-sided geometric distribution.

Let X be the noisy histogram, which can be the histogram of CBF buckets after applying two-sided geometric noise to each bucket. Let Y be the histogram constructed from the original CBF. Then:

$$E[X] = A * Y$$

Where:

$$A = [a_0, a_1, a_2, \ldots, a_i, \ldots, a_n]^T$$

And each $a_i$ can be a row vector with n+1 elements, where:

$$a_0 = [P(Z<=0), \ldots, P(Z<=n)]$$

$$a_i = [P(Z=i-j)] \text{—for } j \text{ in } [0,n]$$

$$a_n = [P(Z>=n), \ldots, P(Z>=0)]$$

and Z can be a two-sided geometric random variable. Basically, $a_i*Y$ can be the expectation that elements of Y are assigned to a particular bin in X. Note that A can be column stochastic.

Then $Y = A^{-1} \cdot X$ where Y can be a de-noised histogram that can then be used to estimate cardinalities.

In at least one other implementation, the K+ values estimation function can proceed as follows.

For each entry in the counting bloom filter, if the entry is greater than K, include it in the output sum, otherwise ignore. To compute this in MPC, the system may perform, for each element in the set, a comparison, sum, and single-bit product:

$$b \mathrel{+{-}} x[i] >= K // b \text{ is a 0 or 1 value}$$

$$sum \mathrel{+{-}} sum + x[i] * b$$

Computing the comparison function can use a bit-wise decomposition of the filter elements, which can raise the computational cost of the overall protocol by requiring more communication. The comparison itself will require a "generic" MPC construction that computes arithmetic circuits, which can be achieved using a SPDZ protocol variant without significantly increasing the number of rounds.

To perform a comparison using an arithmetic circuit, the system can evaluate a "ripple-borrow" subtractor, which is the "textbook" subtraction algorithm. The intuition is that, if X−Y can be computed without requiring a borrow past the high-order bit of X, then X>=Y. One way to do this is to simulate a boolean circuit for the function, creating an "arithmetic circuit." For example, to compare two-bit numbers:

$$[a0,a1] < [b0,b1]$$

We can use this Boolean formula:

$$(({!}a1) \&\& (({!}a0) \&\& b0)) \| (({!}a1) \&\& b1) \| (({!}a0) \&\& b0) \&\& b1)$$

Now assume these are 0/1 values (in the field; hence the need for bitwise decomposition). We can simulate the same formula using these rules:

$${!}x \mathrel{-{+}} (1-x)$$

$$x \&\& y \mathrel{-{+}} x*y$$

$$x \| y \mathrel{-{+}} x + y - x*y$$

So our comparator can be:

$$c1 = ((1-a1) * ((1-a0) * b0))$$

$$c2 = ((1-a1) * b1)$$

$$c3 = ((1-a0) * b0 * b1)$$

$$out \mathrel{+{-}} c1 + c2 + c3 - c1*c2 - c1*c3 - c2*c3 + c1*c2*c3$$

This can be scaled up to arbitrarily many bits. Since the final output is a 0/1 value, we can use it to selectively include values in the sum as described above.

Privacy in this case can follow from the security of the MPC protocol itself, as no partial information will be revealed about the combined bloom filter. Note that there is no need to perform any permutations on the filter in this case, because the filter is never revealed in the clear. At the end of the protocol the workers will have shares of the sum, which can then be sent to the accumulator or whatever other workers are entitled to the output.

In the case where K is a power of 2 we can improve the online protocol. Recall that the first step is to compute a sum over each party's respective Bloom filter; we then count the elements that do not exceed the value K. When K is a power of 2, this amounts to checking if we carried any bit beyond a certain position, and we can avoid the comparator entirely and only compute an addition circuit online.

Assuming one broadcast round per multiplication gate, if the Bloom filter elements are 4 bits, then 9 broadcast rounds will be needed (8 for the addition circuit, and one for an OR over the carry-out from the additions: the final sum is a linear combination that does not require any multiplications). For security against arbitrary collusion, using the SPDZ protocol in the honest-but-curious setting, the main computational cost will be computing Beaver triples.

Referring now to FIG. 1, depicted is a system 100 for generating a counting bloom filter to determine count and frequency of client device identifiers in a networking environment. The system 100 can generate a histogram of estimated frequency of data from vectors using distributed homomorphic encryption. The system 100 can include at least one data processing system 105A-N (sometimes generally referred to as data processing system 105), at least one network 110, at least one database 115, and at least one client device 120A-N (sometimes generally referred to as client device 120). The data processing system 105 can include at least one vector generator 130, at least one hash identifier 135, at least one data record hasher 140, at least one encryption key generator 145, at least one vector encryptor 150, at least one encrypted vector communicator 155, at least one vector combiner 160 at least one histogram constructor 165, and at least one cardinality estimator 170. The database 115 can include at least one data records 122A-N (sometimes generally referred to as data records 120). Each of the data records 122 can include at least one client identifiers 125A-N (sometimes generally referred to as client identifiers 125), and at least one attributes 127A-N (sometimes generally referred to as attributes 127).

Figure 8:
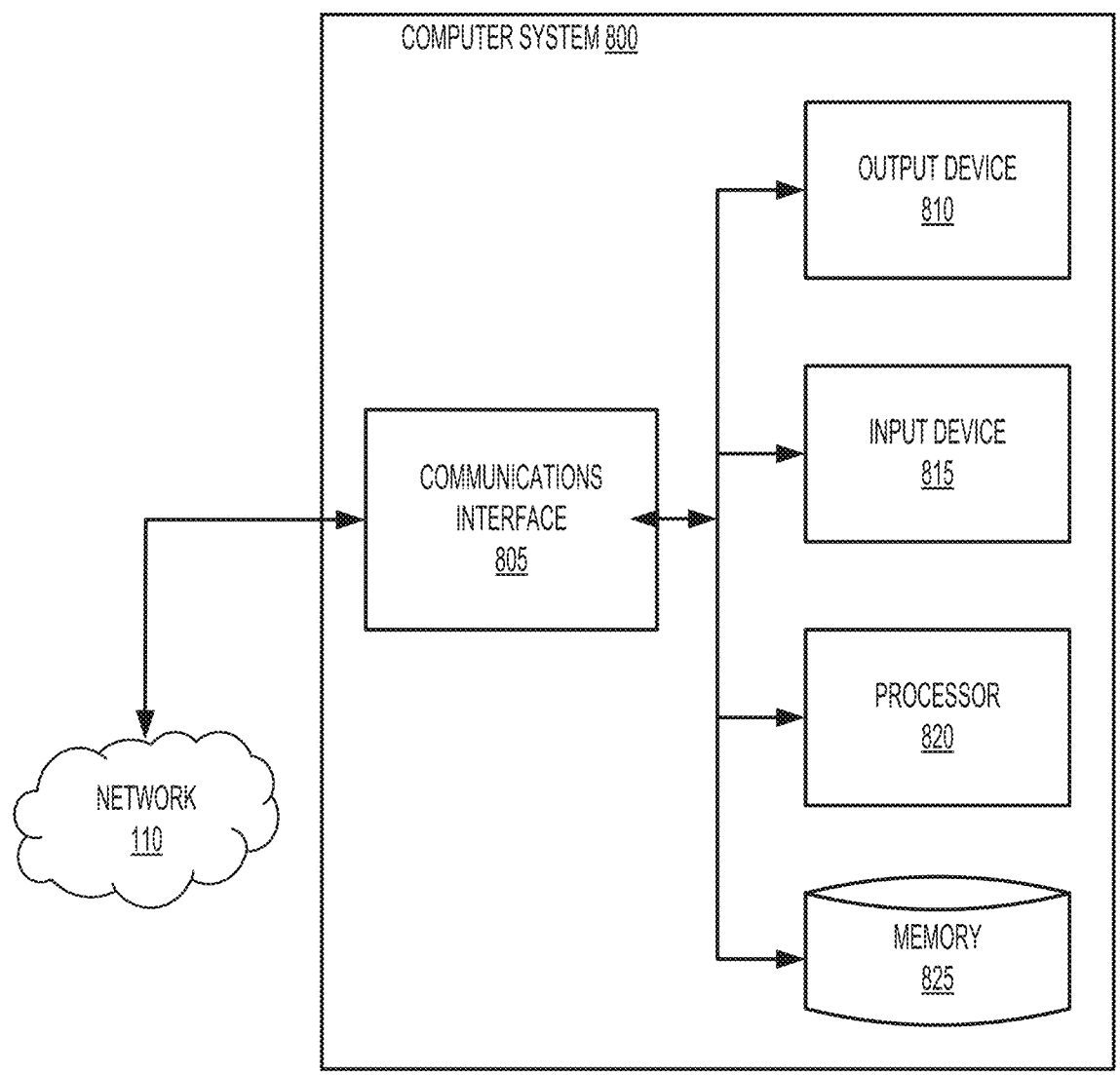
FIG. 8 shows the general architecture of an illustrative computer system that may be employed to implement any of the computers discussed herein.

Each of the components (e.g. the data processing system 105, the network 110, the database 115, the client devices 120, the vector generator 130, the hash identifier 135, the data record hasher 140, the encryption key generator 145, the vector encryptor 150, the encrypted vector communicator 155, the vector combiner 160, the histogram constructor 165, the cardinality estimator 170, the data records 122, the client identifiers 125, and the attributes 127, etc.) of the system 100 can be implemented using the hardware components or a combination of software with the hardware components of a computing system 800 detailed herein in conjunction with FIG. 8. For example, the data processing system 105 can include servers or other computing devices. The client devices 120 can include servers or other computing devices. Each of the components of the data processing system 105 can perform the functionalities detailed herein.

The network 110 can include computer networks such as the Internet, local, wide, metro or other area networks, intranets, satellite networks, other computer networks such as voice or data mobile phone communication networks, and combinations thereof. The data processing system 105 of the system 100 can communicate via the network 110, for instance with at least one content provider 115 and at least one database 120. The network 110 may be any form of computer network that relays information between the content provider 115, data processing system 105, and one or more content sources, such as web servers, amongst others. In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches, etc.) that are configured to receive and/or transmit data within the network 110. The network 110 may further include any number of hardwired and/or wireless connections. The content provider 115 may communicate wirelessly (e.g., via WiFi, cellular, radio, etc.) with a transceiver that is hardwired (e.g., via a fiber optic cable, a CAT5 cable, etc.) to other computing devices in the network 110. The content provider 115 may also communicate wirelessly with the computing devices of the network 110 via a proxy device (e.g., a router, network switch, or gateway).

The data processing system 105 can include at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC. FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions, including, for example, the functionalities or methods described herein The database 115 can be a database configured to store and/or maintain any of the information described herein. The database 115 can maintain one or more data structures which can contain or index each of the values, pluralities, or thresholds described herein. The database 115 can be accessed using one or more memory addresses or index values. The database 115 can be accessed by the components of the data processing system 105, or the client devices 120 via the network 110. In some implementations, the database 115 can be internal to the data processing system 105. In some implementations, the system 100 can include many databases, each database 115 corresponding to at least one data processing system 105A-N. For example, each of the data processing systems 105A-N can include or be in communication with its own database. In some implementations, the database 115 can exist external to the data processing system 105, and may be accessed via the network 110. The database 115 can be distributed across many different computer systems or storage elements, and may be accessed via the network 110 or a suitable computer bus interface. The data processing system 105 can store, in the database 115, the results of any or all computations, determinations, selections, identifications, generations, constructions, or calculations in one or more data structures indexed with appropriate values, each of which may be accessed by the data processing system 105 or the client devices 120 to perform any of the functionalities or functions described herein.

The client device 120 can be a computing device configured to communicate via the network 110 to display data such as an indication provided by the data processing system 105 (e.g., an indication displaying the cardinality of the sets of client identifiers 125, the attributes 127, frequency values, or any other values described herein, etc.). The client devices 120 can be desktop computers, laptop computers, tablet computers, smartphones, personal digital assistants, mobile devices, consumer computing devices, servers, clients, digital video recorders, a set-top box for a television, a video game console, or any other computing device configured to communicate via the network 110, among others. The client device 120 can transmit or receive one or more client identifiers 125 or one or more attributes 127 to the data processing system. The client devices 120 can communicate with at least one database 115 to store client identifiers 125 or attributes 127 in association with the respective client device 120.

The client device 120 can include a processor and a memory, i.e., a processing circuit. The memory stores machine instructions that, when executed by processor, cause processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk. CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language.

The client device 120 can include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the client device 120 (e.g., a built-in display, microphone, etc.) or external to the housing of the client device 120 (e.g., a monitor connected to the client device 120, a speaker connected to the client device 120, etc.). In some implementations, the client device 120 may include an electronic display, which visually displays interfaces using interface data provided by an operating system executing on the client device 120, retrieved from the database 115, or provided by the data processing system 105.

The data processing system 105 can maintain, in the data base 115, at least one data record 122. The data record can include, for example, at least one client identifier 125 and at least one attribute 127. The client identifier 125 can correspond to a respective one of the client devices 120. The attribute can be associated with the client identifier 125 in the data record 122, and include information about the attributes of the respective client device 120. The attributes can include, for example, client device location data, client device metadata, client device parameters, settings, and other information, user profile data, interactions performed by the client device, application browsing history, web page browsing history, activity information, device characteristics, whether the client device has viewed or interacted with a content item, network utilization information, power utilization information, and device operating system version, settings, and other information, among others. The data processing system can receive a device identifier and attribute data from each of the client devices, and generate and maintain a respective data record in the database 115 that corresponds to the respective client device. Although it is pictured in FIG. 1 that all client devices 120 are in communicate with each of the data processing systems 105A-N, it should be understood that each of the data processing systems may only receive client device identifiers and information from a particular set of the client devices 120.

Likewise, the data processing systems 105A-N may maintain their respective data records in their own database 115 that cannot be accessed by the other data processing systems 105A-N. According to some implementations, different groups of the client devices 120 may be serviced by different identifier servers (e.g., the data processing systems 105), and each data processing system may maintain its own set of data records that correspond to a respective one of its set of client devices 120.

The vector generator 130 can generate a vector comprising a plurality of coordinates. To generate a vector, the vector generator 130 can allocate one or more regions of memory in the data processing system 105 to accommodate at least one counter register. The allocated counter register can correspond to at least one coordinate of the vector. By generating and allocating memory for one or more counter registers, the vector generator 130 can generate the vector comprising the counter registers. The vector generator 130 can initialize each of the counter registers of the vector to an initialization value, for example zero, or one. The vector generator 130 can generate the vector, which can correspond to a min-increment counting bloom filter, to have any number of counter registers (sometimes referred to as "buckets"). For example, the vector generator 130 can receive an indication to generate a min-increment counting bloom filter with n buckets, or may access an internal configuration setting, provided by an external computing device, that specifies the size of the min-increment counting bloom filter by number of buckets or counter registers.

The hash identifier 135 can identify one or more hash functions from a list of hash functions that are usable to update a counting bloom filter data structure. For example, each of the hashes identified in the list of hashes can provide a normal distribution or expectation of randomness based on input value. That is, for example, similar inputs to the hash function do not necessarily have similar outputs to the hash function. The hash functions can be chosen as optimal hash functions for counting bloom filters. For example, the hash identifier 135 can choose independent and uniformly distributed hash functions. Such hash functions can include, for example, murmur hashes, Fowler-Noll-Vo series hashes, or Jenkins hashes, among others. The hash identifier 135 can select or identify a number of hash functions, and apply each hash function to each data record to generate a hashed set of data records.

The data record hasher 140 can hash each of the data records maintained by the respective data processing system 105 to create a respective set of hashed data records. Applying the hash data records can include using the data record as an argument to the hash functions identified by the hash identifier 135. The data record hasher 140 can hash each of the data records using each of the hashes identified by the hash identifier 135, thereby resulting in a number of hashed values that correspond to a respective one of the data records. As such, the data record hasher 140 can iterate over each of the data records in a loop, and apply each of the hash functions to each data record as they are selected. After applying the hash functions, the data record hasher 140 can store each of the hashed data records in association with the respective data record in the memory of the respective data processing system 105.

The data record hasher 140 can further extract a register identifier from each of the hashed data records that correspond to each of the data records maintained by the respective data processing system 105. Each of the hashed data records of the hashed data record set can correspond to a counter register of the vector generated by the vector generator 130. To identify the corresponding counter registers, the data record hasher 140 can extract a register identifier from each of the hashed data records. The data record hasher 140 can extract the register identifiers, for example, by performing a modulus operation on each hashed data identifier with the number of counter registers in the min-increment counting bloom filter. For example, if one of the hashed data records was equal to 500, and there are 15 positions in the min-increment counting bloom filter, the data processing system can compute 500% 15=5 to determine that the hashed data record corresponds to the fifth counter register in the min-increment counting bloom filter. In some implementations, if the number of counter registers in the min-increment bloom filter is a power of two, the data record hasher 140 can select a number of bits equal to log 2(b), where b is equal to the number of counter registers in the min-increment counting bloom filter.

The vector generator 130 can access each of the counter registers of the counting bloom filter generated by the vector generator 130 that correspond to the register identifiers identified by the data record hasher 140 to determine a minimum register value. In a min-increment bloom filter implementation, the vector generator 130 can further access the counter register buckets associated with each of the register identifiers extracted by the data record hasher 140 to retrieve a set of bucket values. To determine which of the bucket values to increment, the vector generator 130 can determine a subset of the counter register buckets that are equal to the minimum value amongst the counter register buckets. The minimum value can be determined by comparing each of the counter register buckets, and identifying the smallest (e.g., the value that is closest to zero, etc.) bucket value. For example, if there are five buckets, with the respective values of 3, 91, 30, 88, and 10, the minimum bucket value would be three. Note that although only one bucket is illustrated as being equal to the minimum value, there can be any number of buckets that are equal to the minimum value. To illustrate this concept, consider a second example, where the five buckets are respectfully equal to 5, 10, 30, 5, and 28. In this example, there are two buckets that are equal to 5. The minimum value of all of the buckets is also 5. The vector generator 130 can then select the buckets that are equal to the minimum value for inclusion in a subset of counter register buckets. This means that in the first example, where the buckets are respectfully equal to 3, 91, 30, 88, and 10, the vector generator 130 can select the bucket that is equal to 3, the minimum value, as the counter register in the subset. In the second example, where the five buckets are respectfully equal to 5, 10, 30, 5, and 28, the vector generator 130 can select both buckets that are equal to 5, the minimum value of the counter register buckets. Selection of the counter registers can include storing the register identifier that identifies the corresponding bucket in a data structure in the memory of the respective data processing system 105. Note that in order to accurately determine a minimum value of the bloom filter, the vector generator 130 can iterate through each of the data records, and access the register identifiers that are extracted from the hashed values of the respective identifier.

The vector generator 130 can increment each of the counter registers that satisfy the minimum value threshold of the counter registers as described herein above. Incrementing the register identifier can include adding one to the counter register corresponding to the respective register identifier. In some implementations, the amount added to the counter register can be a value that is other than one. For example, the vector generator 130 can add other values to each counter register that may correspond to any values determined, generated, or calculated herein. In some implementations, the data processing system can subtract from the counter register for various reasons discussed herein. In some implementations, as an alternative to subtraction, the vector generator 130 can add an amount (e.g., one, or some other value, etc.) to each of the other counter register buckets that are not currently selected by the vector generator 130. By incrementing the counter register buckets or coordinates, the vector generator 130 can update the counting bloom filter as a whole based on the data records maintained by respective data processing system 105. In the context of the system, the process of updating a standard counting bloom filter is described briefly below in conjunction with FIGS. 2A-C, and the process of updating a min-increment counting bloom filter (as described here in conjunction with FIG. 1) is described below in conjunction with FIGS. 3A-C.

Figure 2A:
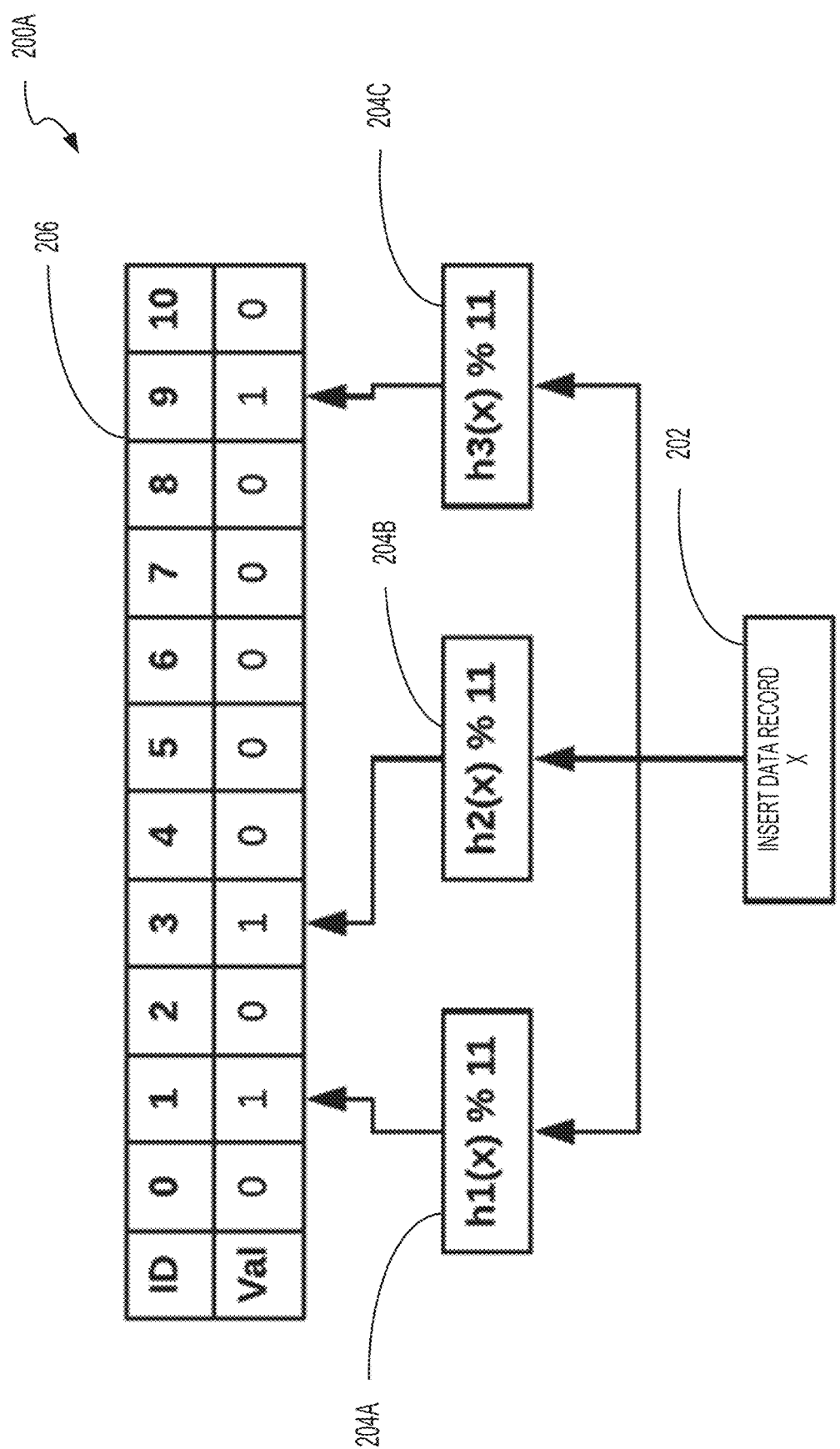
FIG. 2A depicts an example system flow diagram illustrating the insertion of a first data record into a counting bloom filter.

Referring now to FIG. 2A, depicted is an example illustration of a flow diagram 200A illustrating the insertion of a data record X into a standard counting bloom filter by at least one data processing system (e.g., at least one of the data processing systems 105, etc.). At block 202, the data processing system can indicate a data record to insert into the counting bloom filter. The indicated data record can be selected, for example, from a database (e.g., the database 115). The data processing system can select a number of hash functions, here illustrated as h1, h2, and h3. Although only three hash functions are shown, it should be understood that the data processing system can utilize any number of hash functions to insert a data record into a standard counting bloom filter. At blocks 204A-C, the data processing system can replicate and hash the data record X at least once using each of the identified hash functions. The hash functions can be, for example, ElGamal hashes, as described herein, or any other type of hash, such as SHA-1, SHA-2, MD5, among others. By replicating and hashing the data record X three times, the data processing system has generated three hashed data records, indicated in FIG. 2A as h1(x), h2(x), and h3(x). Still referring to blocks 204A-C, the data processing system can extract an index value from each of the hashed data records. The extracted index value can correspond to at least one respective position in the counting bloom filter. In the example provided in FIG. 2A, each hash is computed with the modulus of 11, which is the number of register positions in the counting bloom filter. Although only 11 register positions are used the bloom filter, it should be understood that any number of counting registers can be used to implement a bloom filter.

In further detail of FIG. 2A, the modulus 11 of h1(x) is equal to 1, the modulus 11 of h2(x) is equal to 3 and the modulus 11 of h3(x) is equal to 9. Each of these values can be used by the data processing system as a pointer to the counter register associated with the respective position (e.g., ID value, etc.) in the counting bloom filter. For example, the modulus 11 of h1(x), equal to 1, can point to position '1' in the counting bloom filter, the modulus 11 of h2(x), equal to 3, can point to position '3' in the counting bloom filter, and so on. These are purely example values for the purposes of illustrating the operations related to a counting bloom filter, and it should not be interpreted as limiting the scope of any implementations describing a counting bloom filter. The data processing system can update (e.g., insert the data record) the counting bloom filter by incrementing each of the counter registers pointed to by the respective hash function, resulting in the updated counting bloom filter 206. Note that, although FIG. 2A depicts each counter register only incremented by one, it should be understood that the data processing system can increment any of the counter registers by any amount of value, for example by a number of bytes, bits, or relative to any other values, thresholds, or estimations described herein.

Figure 2B:
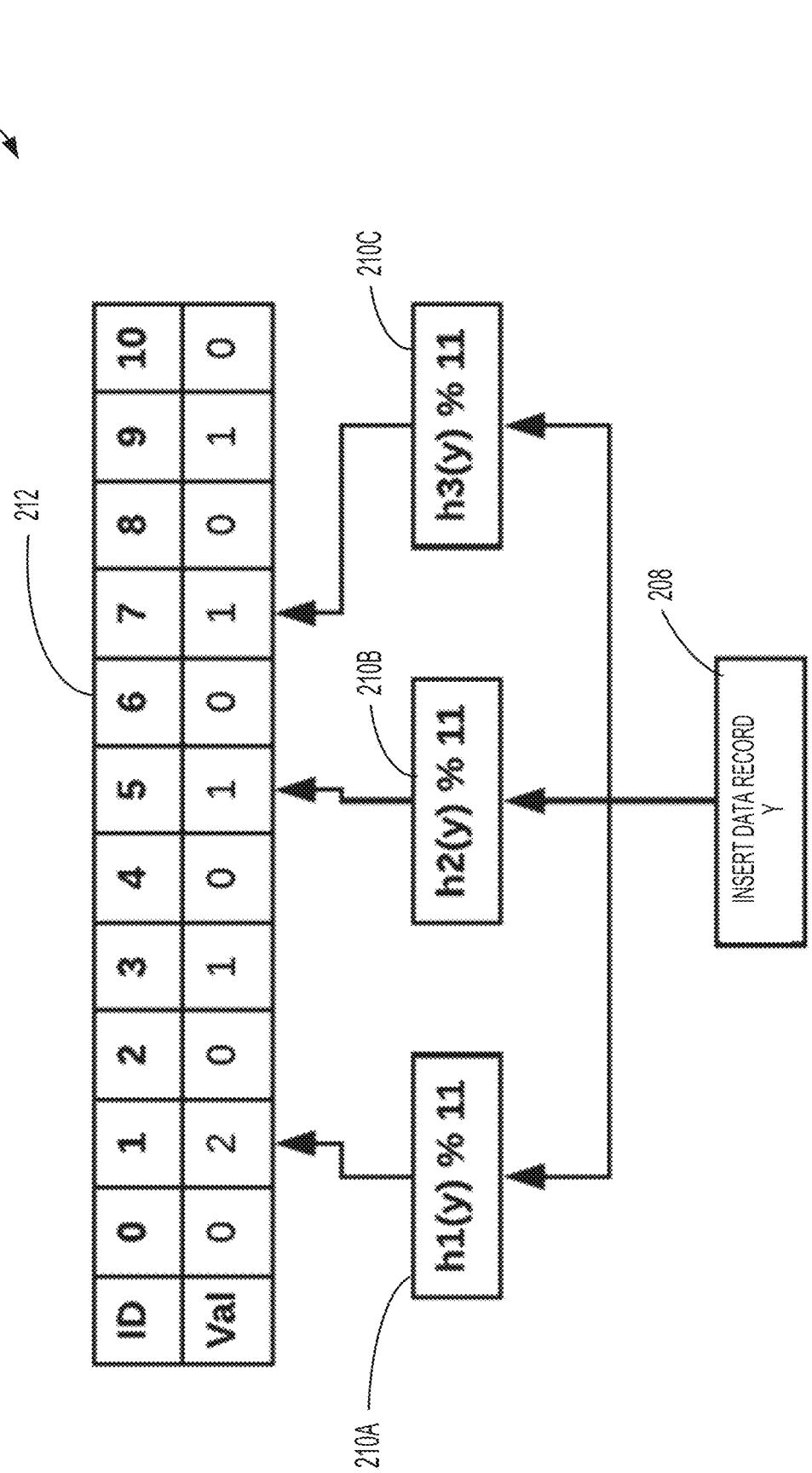
FIG. 2B depicts an example system flow diagram illustrating the insertion of a second data record into a standard counting bloom filter.

Referring now to FIG. 2B, depicted is an example illustration of a flow diagram 200B illustrating the insertion of a data record Y into the updated counting bloom filter 206 described herein above in conjunction with FIG. 2A by at least one data processing system (e.g., at least one of the data processing systems 105, etc.). At block 208, the data processing system can indicate a data record Y to insert into the counting bloom filter. The indicated data record can be selected, for example, from a database (e.g., the database 115). The data processing system can select a number of hash functions, here illustrated as h1, h2, and h3. Although only three hash functions are shown, it should be understood that the data processing system can utilize any number of hash functions to insert a data record into a standard counting bloom filter. At blocks 210A-C, the data processing system can replicate and hash the data record Y at least once using each of the identified hash functions. The hash functions can be, for example, ElGamal hashes, as described herein, or any other type of hash, such as SHA-1, SHA-2, MD5, among others. By replicating and hashing the data record Y three times (e.g., once for each hash), the data processing system has generated three hashed data records, indicated in FIG. 2B as h1(y), h2(y), and h3(y). Still referring to blocks 210A-C, the data processing system can extract an index value from each of the hashed data records. The extracted index value can correspond to at least one respective position in the counting bloom filter. In the example provided in FIG. 2A, each hash is computed with the modulus of 11, which is the number of register positions in the counting bloom filter. Although only 11 register positions are used the counting bloom filter, it should be understood that any number of counting registers can be used to implement a counting bloom filter.

In further detail of FIG. 2B, the modulus 11 of h1(y) is equal to 1, the modulus 11 of h2(y) is equal to 5 and the modulus 11 of h3(y) is equal to 7. Each of these values can be used by the data processing system as a pointer to the counter register associated with the respective position (e.g., ID value, etc.) in the counting bloom filter. For example, the modulus 11 of h1(y), equal to 1, can point to position '1' in the counting bloom filter, the modulus 11 of h2(y), equal to 5, can point to position '5' in the counting bloom filter, and so on. These are purely example values for the purposes of illustrating the operations related to a counting bloom filter, and it should not be interpreted as limiting the scope of any implementations describing a counting bloom filter. The data processing system can update (e.g., insert the data record) the counting bloom filter by incrementing each of the counter registers pointed to by the respective hash function, resulting in the updated counting bloom filter 212. Note that, although FIG. 2B depicts each counter register only incremented by one, it should be understood that the data processing system can increment any of the counter registers by any amount of value, for example by a number of bytes, bits, or relative to any other values, thresholds, or estimations described herein. As shown in FIG. 2B, the counter register corresponding to position '1' has a value that is already equal to 1, and therefore when incremented by one becomes equal to 2. Likewise, each of the counter registers corresponding to positions '5' and '7' are equal to zero, and therefore when incremented are each equal to 1. Accordingly, the updated counting bloom filter 212 has the values of 2 at position '1', 1 at position '3', 1 at position '5', 1 at position '7', and 1 at position '9'.

Figure 2C:
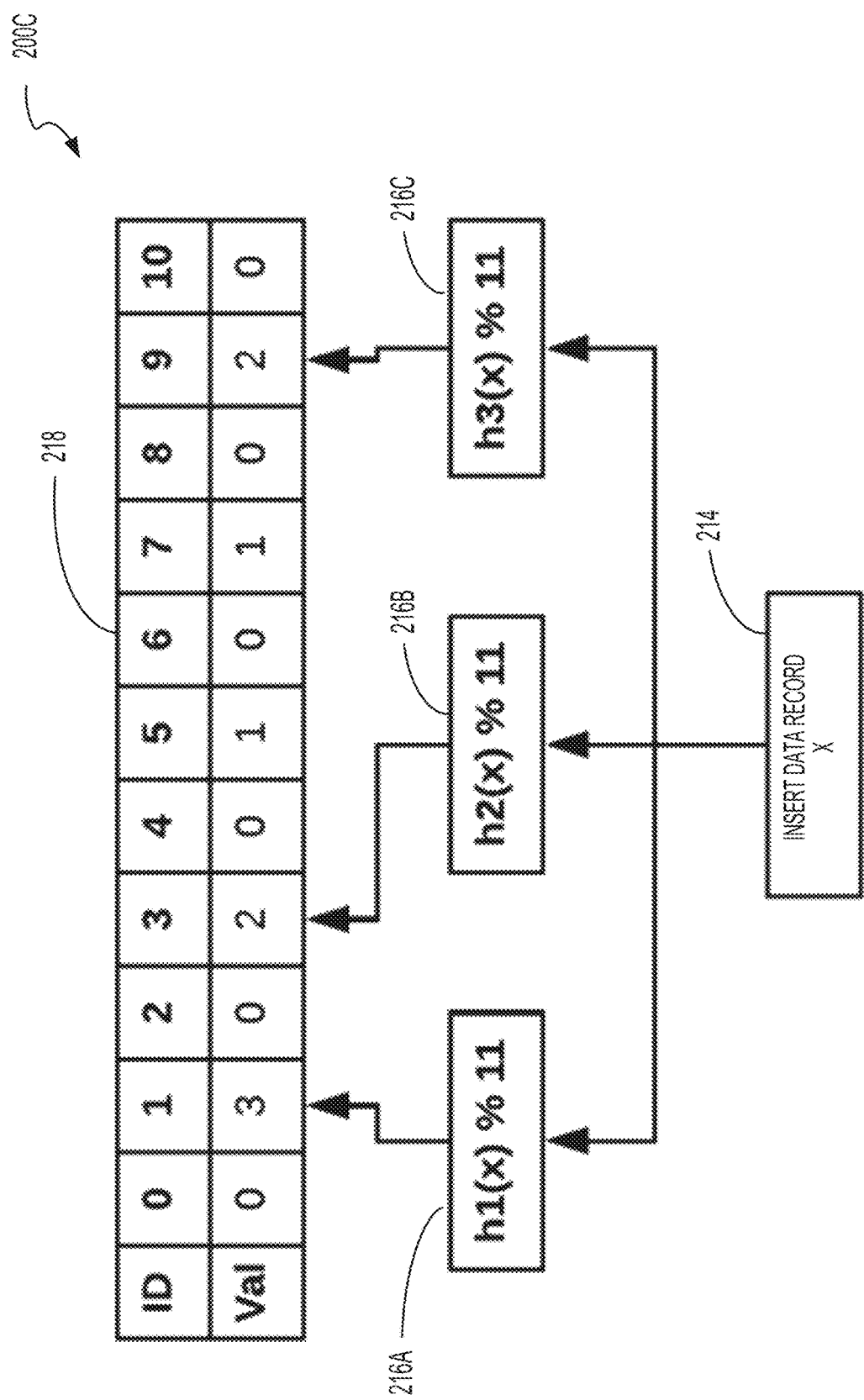
FIG. 2C depicts an example system flow diagram illustrating the insertion of a third data record into a counting bloom filter.

Referring now to FIG. 2C, depicted is an example illustration of a flow diagram 200C illustrating the insertion of a data record X into the updated counting bloom filter 212 described herein above in conjunction with FIG. 2C by at least one data processing system (e.g., at least one of the data processing systems 105, etc.). At block 214, the data processing system can indicate the data record X to insert into the counting bloom filter. Note that although the data record X was already inserted into the counting bloom filter as described above in conjunction with FIG. 2A, this does not necessarily preclude the insertion of the same data record more than one time into the counting bloom, due to the nature of the counting bloom filter. This is different than, for example, a standard bloom filter, where each position can correspond to a binary value instead of a counter register. The indicated data record can be selected, for example, from a database (e.g., the database 115). The data processing system can select a number of hash functions, here illustrated as h1, h2, and h3. Although only three hash functions are shown, it should be understood that the data processing system can utilize any number of hash functions to insert a data record into a standard counting bloom filter. At blocks 216A-C, the data processing system can replicate and hash the data record X at least once using each of the identified hash functions. The hash functions can be, for example, ElGamal hashes, as described herein, or any other type of hash, such as SHA-1, SHA-2, MD5, among others. By replicating and hashing the data record X three times (e.g., once for each hash), the data processing system has generated three hashed data records, indicated in FIG. 2C as h1(x), h2(x), and h3(x). Still referring to blocks 214A-C, the data processing system can extract an index value from each of the hashed data records. The extracted index value can correspond to at least one respective position in the counting bloom filter. In the example provided in FIG. 2C, each hash is computed with the modulus of 11, which is the number of register positions in the counting bloom filter. Although only 11 register positions are used the counting bloom filter, it should be understood that any number of counting registers can be used to implement a counting bloom filter.

In further detail of FIG. 2C, the modulus 11 of h1(x) is equal to 1, the modulus 11 of h2(x) is equal to 3 and the modulus 11 of h3(x) is equal to 9. Note that each of these values are the same as those determined in FIG. 2A. This is because the data processing system is hashing the same data record using the same hash functions, therefore the values of each hash result in the same value as previously calculated in FIG. 2A. The data processing system can use each of these index values as a pointer to the counter register associated with the respective position (e.g., ID value, etc.) in the counting bloom filter. For example, the modulus 11 of h1(x), equal to 1, can point to position '1' in the counting bloom filter, the modulus 11 of h2(x), equal to 3, can point to position '3' in the counting bloom filter, and so on. These are purely example values for the purposes of illustrating the operations related to a counting bloom filter, and it should not be interpreted as limiting the scope of any implementations describing a counting bloom filter. The data processing system can update (e.g., insert the data record) the counting bloom filter by incrementing each of the counter registers pointed to by the respective hash function, resulting in the updated counting bloom filter 218. Note that, although FIG. 2C depicts each counter register only incremented by one, it should be understood that the data processing system can increment any of the counter registers by any amount of value, for example by a number of bytes, bits, or relative to any other values, thresholds, or estimations described herein. As shown in FIG. 2C, the counter register corresponding to position '1' has a value that is already equal to 2, and therefore when incremented by one becomes equal to 3. Likewise, each of the counter registers corresponding to positions '3' and '9' are equal to one, and therefore when incremented are equal to 2. Accordingly, the updated counting bloom filter 218 has the values of 3 at position '1', 2 at position '3', 1 at position '5', 1 at position '7', and 2 at position '9'.

Referring now to FIG. 3A, depicted is an example illustration of a flow diagram 300A illustrating the insertion of a data record X into a min-increment counting bloom filter by at least one data processing system (e.g., at least one of the data processing systems 105, etc.). At block 302, the data processing system can indicate a data record to insert into the counting bloom filter, for example, the data record X. The indicated data record can be selected, for example, from a database (e.g., the database 115). The data processing system can select a number of hash functions, here illustrated as h1, h2, and h3. Although only three hash functions are shown, it should be understood that the data processing system can utilize any number of hash functions to insert a data record into a standard counting bloom filter. At blocks 304A-C, the data processing system can replicate and hash the selected data record (e.g., data record X) at least once using each of the identified hash functions. The hash functions can be, for example, ElGamal hashes, as described herein, or any other type of hash, such as SHA-1. SHA-2, MD5, among others. By replicating and hashing the data record X three times, the data processing system has generated three hashed data records, indicated in FIG. 3A as h1(x), h2(x), and h3(x). Still referring to blocks 304A-C, the data processing system can extract an index value from each of the hashed data records. The extracted index value can correspond to at least one respective position in the counting bloom filter. In the example provided in FIG. 3A, each hash is computed with the modulus of 11, which is the number of register positions in the counting bloom filter. Although only 11 register positions are used the bloom filter, it should be understood that any number of counting registers can be used to implement a bloom filter.

In further detail of FIG. 3A, the modulus 11 of h1(x) is equal to 1, the modulus 11 of h2(x) is equal to 3 and the modulus 11 of h3(x) is equal to 9. Each of these values can be used by the data processing system as a pointer to the counter register associated with the respective position (e.g., ID value, etc.) in the counting bloom filter. For example, the modulus 11 of h1(x), equal to 1, can point to position '1' in the counting bloom filter, the modulus 11 of h2(x), equal to 3, can point to position '3' in the counting bloom filter, and so on. These are purely example values for the purposes of illustrating the operations related to a counting bloom filter, and it should not be interpreted as limiting the scope of any implementations describing a counting bloom filter. To insert a data record into a min-increment counting bloom filter, the data processing system can increment the counter registers that correspond to a minimum value of the counter registers pointed to by the calculated index values. For example, the data processing system can access each of the counter registers pointed to by the calculated index values. As shown in FIG. 3A, these are the counter registers corresponding to positions '1', '3', and '9'. Because the min-increment counting bloom filter has not yet been updated, each of these positions are equal to zero.

The data processing system can compare each of these accessed data registers to determine a minimum value amongst the counter registers. For example, the minimum value can be the smallest counter register value of the accessed counter registers. Note that more than one counter register can be equal to the minimum value. The data processing system can select a subset of the accessed counter registers with a value that is equal to the determined minimum value of the counter registers. As indicated in FIG. 3A, each of the accessed counter registers are equal to zero, and therefore each of the accessed counter registers are equal to the minimum (here, zero). Therefore, each of the accessed counter registers are selected. The data processing system can update (e.g., insert the data record) the min-increment counting bloom filter by incrementing each of the selected subset of counter registers, resulting in the updated counting bloom filter 306. Note that, although FIG. 3A depicts each counter register only incremented by one, it should be understood that the data processing system can increment any of the selected subset of counter registers by any amount of any value, for example by a number of bytes, bits, or relative to any other values, thresholds, or estimations described herein.

Referring now to FIG. 3B, depicted is an example illustration of a flow diagram 300B illustrating the insertion of a data record Y into a min-increment counting bloom filter by at least one data processing system (e.g., at least one of the data processing systems 105, etc.). At block 308, the data processing system can indicate a data record to insert into the counting bloom filter, for example, the data record Y. The indicated data record can be selected, for example, from a database (e.g., the database 115). The data processing system can select a number of hash functions, here illustrated as h1, h2, and h3. Although only three hash functions are shown, it should be understood that the data processing system can utilize any number of hash functions to insert a data record into a standard counting bloom filter. At blocks 310A-C, the data processing system can replicate and hash the selected data record (e.g., data record Y) at least once using each of the identified hash functions. The hash functions can be, for example, ElGamal hashes, as described herein, or any other type of hash, such as SHA-1, SHA-2, MD5, among others. By replicating and hashing the data record Y three times, the data processing system has generated three hashed data records, indicated in FIG. 3B as h1(y), h2(y), and h3(y). Still referring to blocks 310A-C, the data processing system can extract an index value from each of the hashed data records. The extracted index value can correspond to at least one respective position in the counting bloom filter. In the example provided in FIG. 3B, each hash is computed with the modulus of 11, which is the number of register positions in the counting bloom filter. Although only 11 register positions are used the bloom filter, it should be understood that any number of counting registers can be used to implement a bloom filter.

In further detail of FIG. 3B, the modulus 11 of h1(y) is equal to 1, the modulus 11 of h2(y) is equal to 5 and the modulus 11 of h3(y) is equal to 7. Each of these values can be used by the data processing system as a pointer to the counter register associated with the respective position (e.g., ID value, etc.) in the min-increment counting bloom filter. For example, the modulus 11 of h1(y), equal to 1, can point to position '1' in the counting bloom filter, the modulus 11 of h2(y), equal to 5, can point to position '5' in the counting bloom filter, and so on. These are purely example values for the purposes of illustrating the operations related to a counting bloom filter, and it should not be interpreted as limiting the scope of any implementations describing a counting bloom filter. To insert a data record into a min-increment counting bloom filter, the data processing system can increment the counter registers that correspond to a minimum value of the counter registers pointed to by the calculated index values. For example, the data processing system can access each of the counter registers pointed to by the calculated index values to determine their value prior to the update operation. As shown in FIG. 3B, these are the counter registers corresponding to positions '1', '5', and '7'. Prior to updating, the value corresponding to position '1' is equal to 1, the value corresponding to position '5' is equal to zero, and the value corresponding to position '7' is also equal to zero.

The data processing system can compare each of these accessed data registers to determine a minimum value amongst the counter registers. For example, the minimum value can be the smallest counter register value of the accessed counter registers. Note that more than one counter register can be equal to the minimum value. In this case, the minimum value is indicated in positions '5' and '7', which prior to the update step are both equal to zero. The data processing system can select a subset of the accessed counter registers with a value that is equal to the determined minimum value of the counter registers, which in this case means selecting the counter registers corresponding to positions '5' and '7'. The data processing system can update (e.g., insert the data record) the min-increment counting bloom filter by incrementing each of the selected subset of counter registers, resulting in the updated counting bloom filter 312. Although h1(y) points to position '1', it is not incremented, because it is not equal to the minimum value of the pointed-to counter registers. Note that, although FIG. 3B depicts each counter register only incremented by one, it should be understood that the data processing system can increment any of the selected subset of counter registers by any amount of any value, for example by a number of bytes, bits, or relative to any other values, thresholds, or estimations described herein.

Referring now to FIG. 3C, depicted is an example illustration of a flow diagram 300C illustrating the insertion of a data record X into a min-increment counting bloom filter by at least one data processing system (e.g., at least one of the data processing systems 105, etc.). At block 314, the data processing system can indicate a data record to insert into the min-increment counting bloom filter, for example, the data record X. Note that although the data record X has already been inserted into the min-increment bloom filter as described above in conjunction with FIG. 3A, this does not necessarily preclude the data processing system from inserting the data record X more than one time. The indicated data record can be selected, for example, from a database (e.g., the database 115). The data processing system can select a number of hash functions, here illustrated as h1, h2, and h3. Although only three hash functions are shown, it should be understood that the data processing system can utilize any number of hash functions to insert a data record into a standard counting bloom filter. At blocks 316A-C, the data processing system can replicate and hash the selected data record (e.g., data record X) at least once using each of the identified hash functions. The hash functions can be, for example. ElGamal hashes, as described herein, or any other type of hash, such as SHA-1, SHA-2, MD5, among others. By replicating and hashing the data record X three times, the data processing system has generated three hashed data records, indicated in FIG. 3C as h1(x), h2(x), and h3(x). Still referring to blocks 316A-C, the data processing system can extract an index value from each of the hashed data records. The extracted index value can correspond to at least one respective position in the counting bloom filter. In the example provided in FIG. 3C, each hash is computed with the modulus of 11, which is the number of register positions in the counting bloom filter. Although only 11 register positions are used the bloom filter, it should be understood that any number of counting registers can be used to implement a bloom filter.

In further detail of FIG. 3B, the modulus 11 of h1(x) is equal to 1, the modulus 11 of h2(x) is equal to 3 and the modulus 11 of h3(x) is equal to 9. Each of these values can be used by the data processing system as a pointer to the counter register associated with the respective position (e.g., ID value, etc.) in the min-increment counting bloom filter. For example, the modulus 11 of h1(x), equal to 1, can point to position '1' in the counting bloom filter, the modulus 11 of h2(x), equal to 3, can point to position '3' in the counting bloom filter, and so on. These are purely example values for the purposes of illustrating the operations related to a counting bloom filter, and it should not be interpreted as limiting the scope of any implementations describing a counting bloom filter. To insert a data record into a min-increment counting bloom filter, the data processing system can increment the counter registers that correspond to a minimum value of the counter registers pointed to by the calculated index values. For example, the data processing system can access each of the counter registers pointed to by the calculated index values to determine their value prior to the update operation. As shown in FIG. 3C, these are the counter registers corresponding to positions '1', '3', and '9'. Prior to updating, the value corresponding to positions '1', '3', and '9' are each equal to 1.

The data processing system can compare each of these accessed data registers to determine a minimum value amongst the counter registers. For example, the minimum value can be the smallest counter register value of the accessed counter registers. Note that more than one counter register can be equal to the minimum value. In this case, the minimum value is shared by the positions '1', '3' and '9', which prior to the update step are each equal to 1. The data processing system can select a subset of the accessed counter registers with a value that is equal to the determined minimum value of the counter registers, which in this case means selecting the counter registers corresponding to positions '1', '3' and '9'. The data processing system can update (e.g., insert the data record) the min-increment counting bloom filter by incrementing each of the selected subset of counter registers, resulting in the updated counting bloom filter 318. In the updated min-increment bloom filter 318, each of the positions '1', '3', and '9' are incremented to have a value of 2, while the other positions remain unchanged. Note that, although FIG. 3C depicts each counter register is incremented by one, it should be understood that the data processing system can increment any of the selected subset of counter registers by any amount of any value, for example by a number of bytes, bits, or relative to any other values, thresholds, or estimations described herein.

Referring back now to FIG. 1, we will continue the description of the functions and modules of the data processing system with respect to the operations of the worker computing device. Although pictured as a part of the same data processing system 105, each of the components detailed herein below (e.g., the encryption key generator 145, the vector encryptor 150, the encrypted vector communicator 155, the vector combiner 160, the histogram constructor 165, and the cardinality estimator 165) and their accompanying descriptions in FIGS. 4A-C, may be performed by a worker computing device that contains and implements the same modules an functionalities. As such, it should be understood that while the data processing system 105 may contain such modules, other implementations may provide that these operations and components are executed, maintained, and implemented on one or more working computing devices. Further, it should be understood that only a subset of the following components may reside in a worker computing device, for example a worker computing device containing only the encryption key generator 145, the encrypted vector communicator 155, the vector combiner 160, the histogram constructor 165, and the cardinality estimator 170. Accordingly, such worker computing devices may be in communication with the data processing systems 105, for example via the network 110, and may only exchange encrypted vectors or encryption keys to maintain the overall differential privacy of the system.

The encryption key generator 145 can generate one or more private and public keys to encrypt at least one vector. The encryption key generator 145 can further identify, or otherwise receive data from, other worker computing devices that have also generated their own public and private key pairs. The encryption key generator 145 can communicate with the other worker computing devices to receive at least one other public key. The encryption key generator 145 can aggregate, concatenate, or otherwise combine each of the received public keys, along with the public key generated by the encryption key generator 145, to create an aggregated (e.g., combined) encryption key. The generated encryption key can be any kind of homomorphic encryption key or scheme, for example an ElGamal encryption key, among others. The encryption key generator 145 can communicate the generated and aggregated encryption key to the vector encryptor 150 to encrypt the min-increment counting bloom filter maintained by the of the respective data processing system 105. The encryption key generator 145 can further distribute each of the aggregated encryption keys to each of the data processing systems 105A-N(e.g., each of the identifier servers, etc.).

The vector encryptor 150 can encrypt each of the one or more counter registers of the min-increment counting bloom filter using aggregated encryption key received by the encryption key generator 145 to generate an encrypted vector. To ensure the differential privacy of the min-increment counting bloom filter, the vector encryptor 150 can employ one or more encryption techniques to encrypt the vector generated and maintained by the respective data processing system 105 (e.g. the respective identifier server). For example, the data processing system can use the aggregated public key received from the encryption key generator 1 using an encryption scheme (e.g., ElGamal encryption, an encryption scheme that supports threshold decryption, homomorphic encryption, etc.). In some implementations, the vector encryptor 150 can encrypt each of the counter registers corresponding to a coordinate of the vector individually using the aggregated encryption key. In such implementations, each of the encrypted counter registers can be aggregated to create an encrypted vector representing the min-increment counting bloom filter.

The encrypted vector communicator 155 can communicate the encrypted vector to at least one worker computing device. In some implementations, the encrypted vector communicator 155 can receive one or more requests for an encrypted vector, which can in turn trigger either the generation or communication of the encrypted vector as described herein. The request can be received, for example, by at least one worker computing device. Transmitting the encrypted vector can include providing the encrypted vector to a worker computing device via the network 110. The encrypted vector communicator 155 can select a worker computing device as a first of one or more worker computing device to process the encrypted vector. In some implementations, the encrypted vector communicator 155 can transmit the encrypted vector bucket-wise, that is where each bucket is transmitted separately to the worker computing device. In some implementations, the encrypted vector communicator 155 can transmit the encrypted vector in a bulk transaction, where a majority of, or the entirety of, the encrypted vector is transmitted in a single message.

The vector combiner 160 can receive one or more encrypted vectors from one or more identifier servers (e.g., data processing systems 105A-N). Each of the received encrypted vectors can include at least one encrypted counter register corresponding to a coordinate of the encrypted vector. In some implementations, the vector combiner 160 can receive the vectors periodically or in a burst transaction. Each vector can be associated with a respective identifier that reflects the identifier server from which the vector was received. Each of the encrypted vectors received from the identifier servers can be encrypted using the combined public key generated by the encryption key generator 145, and distributed to the respective identifier servers (e.g., the data processing systems 105A-N). The combined public key can allow the worker computing device to partially decrypt the encrypted vectors received from the identifier servers. These operations are illustrated in further detail below in conjunction with FIGS. 4A-C.

Figure 4A:
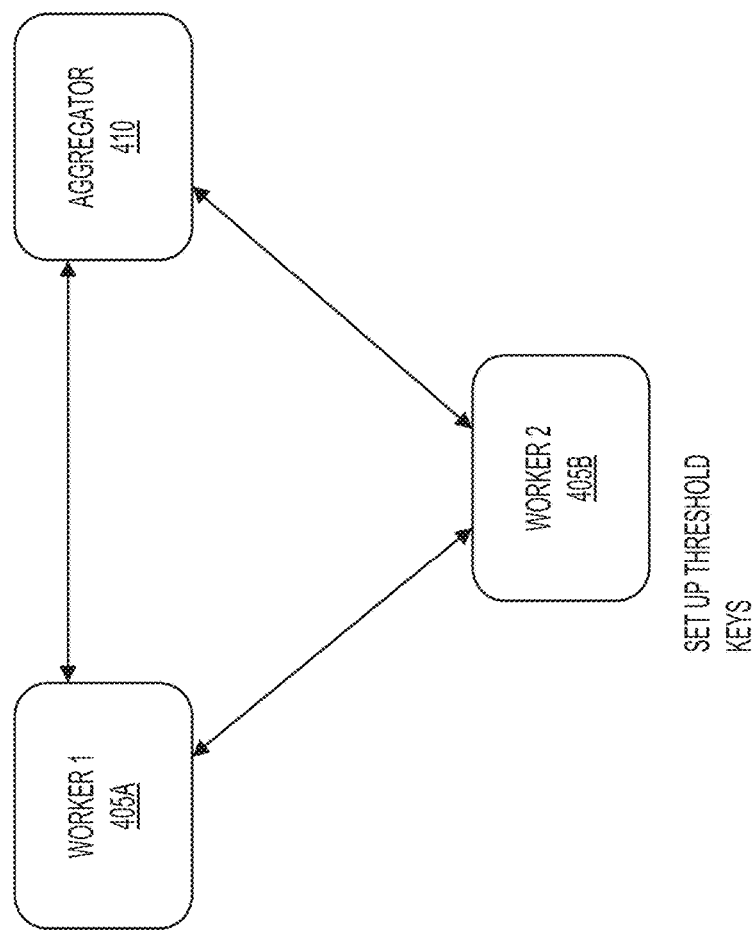
FIG. 4A depicts a block diagram of an example system for the generation and distribution of homomorphic encryption keys.

Referring now to FIG. 4A, depicted is a system flow diagram 400A for the generation and distribution of encryption keys by worker computing devices. The system flow diagram 400A can include one or more worker computing devices 405A-C (sometimes generally referred to as workers 405 or worker 405). Although only three worker computing devices, it should be understood that any number of worker computing devices can be used to implement the functionality described herein. The worker 405 can be at least one of the data processing systems 105, or can include a subset of the components of the data processing system 105, for example the encryption key generator 145, the encrypted vector communicator 155, the vector combiner 160, the histogram constructor 165, and the cardinality estimator 170.

Figure 4B:
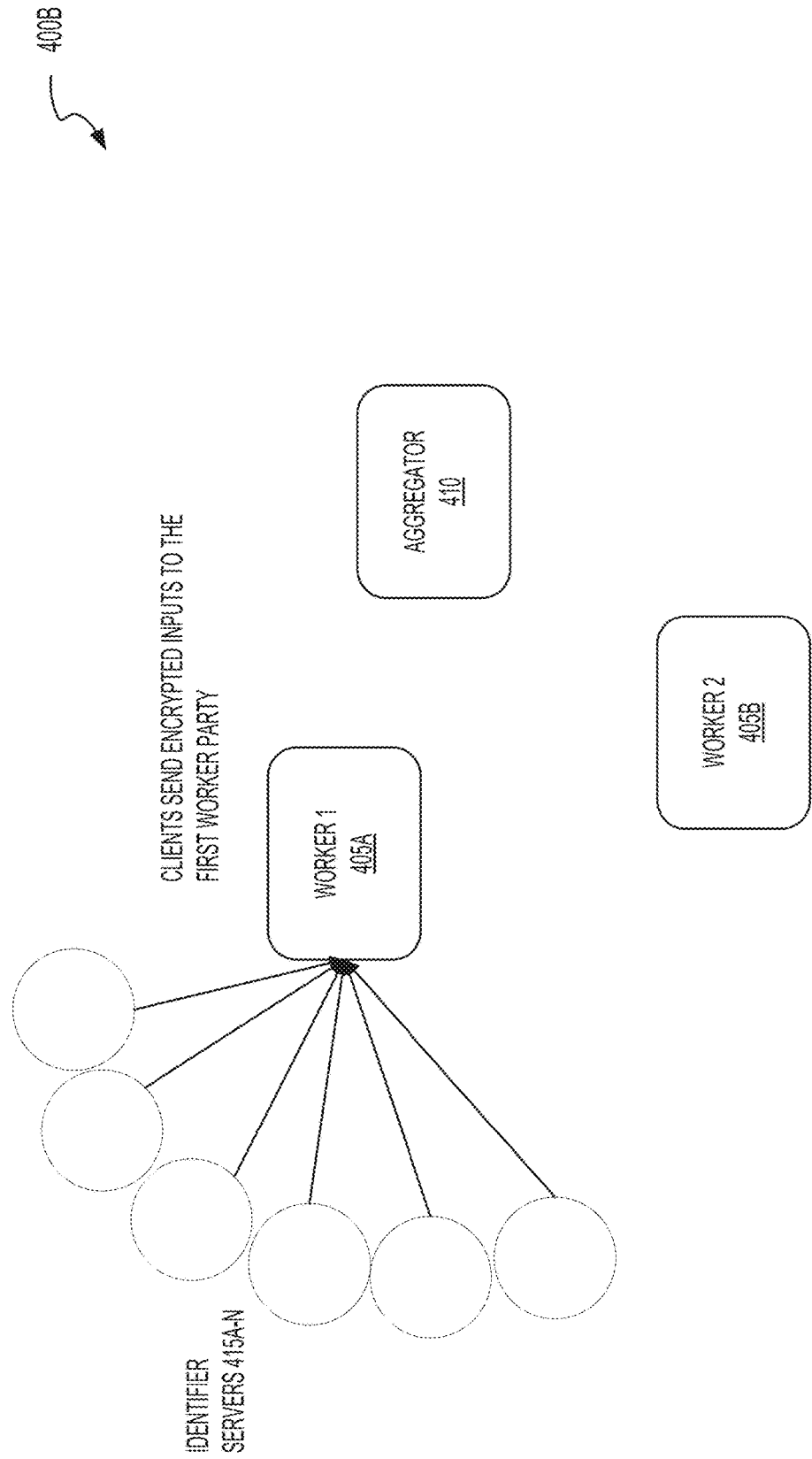
FIG. 4B depicts a block diagram of an example system for the generation and transmission of encrypted vectors to the first worker for processing.

As depicted in FIG. 4A, the workers 405 can generate a combined key. Generating the combined key can include generating at least one public key and at least one private key. In some implementations, a worker 405 can generate a key that can be implemented at least as a part of an ElGamal encryption technique. For example, the worker 405 can generate or select a random (e.g., pseudo-random, etc.) integer X modulo q (e.g., the order of the elliptic curve group). The worker 405 can use the integer X as the private key for decryption, an can use $g^X$ as a public key, where g is a generator. A generator can be, for example, a member of a cyclic group. The public key can be shared, for example, with one or more other workers 405. Each of the other workers 405 can generate and transmit their own public and private key pair to each of the other workers 405. To generate the combined key, each worker 405 can combine each of the public keys received from other workers 405 with its own public key Referring now to FIG. 4B, depicted is a system flow diagram 400B for the distribution of encrypted vectors by identifier servers. The system flow diagram 400B can include at least one identifier server 415A-N and at least one workers 405A-N. The workers 405 are further described herein above in conjunction with FIG. 4A. Each of the identifier servers 415A-N can be, for example, one or more of the data processing systems 105 described herein above in conjunction with FIG. 1. In the flow diagram 400B, the worker 405A has been chosen (e.g., arbitrarily, by request, by internal configuration setting, etc.) as the first worker 405. Each of the identifier servers can provide an associated encrypted vector that can comprise the encrypted register buckets as described herein above.

After transmitting the combined key for encryption by the identifier servers, the worker 405 (e.g., the first worker 405A) can receive at least one encrypted vector from each of the identifier servers 415A-N. In some implementations, the first worker 405A can receive the vectors periodically or in a burst transaction. Each vector can be associated with a respective identifier that reflects the identifier server 415A-N from which the vector was received. Each of the encrypted vectors received from the identifier servers 415A-N can be encrypted using the combined public key generated as described herein above in conjunction with FIG. 1 and FIG. 4A. The combined public key can allow each worker 405 to partially decrypt the encrypted vectors received from the identifier servers.

Referring now to FIG. 4C, depicted is a system flow diagram 400C for the sequential decryption of an aggregated vector with noise. The system flow diagram 400C can include at least one workers 405A-N. The workers 405 are further described herein above in conjunction with FIGS. 4A and 4B. In the flow diagram 400C, the first worker 405A can process the encrypted vectors received from the identifier servers 415A-N as described above in conjunction with FIG. 4B. To process the encrypted vectors, the first worker 405A can perform the steps of method 600 and method 700, as described herein below in conjunction with FIGS. 6 and 7, respectively. After processing the vectors received from the identifier servers 415A-N, the worker 415 can forward the processed encrypted vector, along with its appended decoding lookup table, to an aggregator computing device 410.

The aggregator 410 computing device can include one or more modules of the data processing systems 105A-N or one or more modules of the worker computing devices, as described herein above. For example, the aggregator 410 can include all of the components of the data processing system 105 (e.g., the vector generator 130, the hash identifier 135, the data record hasher 140, the encryption key generator 145, the vector encryptor 150, the encrypted vector communicator 155, the vector combiner 160, the histogram constructor 165, and the cardinality estimator 170, etc.). In some implementations, the aggregator 410 can include some of the components of the data processing system 105 (e.g., the encryption key generator 145, the encrypted vector communicator 155, the vector combiner 160, the histogram constructor 165, and the cardinality estimator 170). In some implementations, the aggregator 410 can include the encrypted vector communicator 155, the histogram constructor 165, and the cardinality estimator 170. The aggregator 410 can be at least one of the data processing systems 105A-N, at least one of the workers 405A-N, or a separate discrete computing device in communication with the workers 405A-N and the data processing systems 105A-N.

Referring back to FIG. 1, and describing the following components in conjunction with the operation of the aggregator 410 (which can be any of at least one data processing system 105A-N, or at least one worker 405, etc.), the encrypted vector communicator 155 can receive an encrypted permuted vector from a worker computing device (e.g., a worker 405, etc.). The encrypted permuted vector can be the aggregated vector as processed by each worker computing device (e.g., the workers 405) in conjunction with the method 500 and the method 600 described herein below. The encrypted vector communicator 155 can store the encrypted permuted vector in one or more data structures in computer memory. In some implementations, the encrypted vector communicator 155 can receive a decoding lookup table associated with the permuted encrypted vector. In some implementations, the permuted encrypted vector can be concatenated with, or otherwise appended with, the decoding lookup table.

The histogram constructor 165 can construct a bucket histogram based on the coordinate values of the encrypted permuted vector. Constructing the histogram can include decoding the encrypted permuted vector using the decoding lookup table appended or concatenated to the encrypted permuted vector. The decoding lookup table can be, for example, a corresponding decoding key created by at least one of the workers 405. The histogram constructor 165 can use the decoding lookup table to reveal the values of the aggregated vectors corresponding to the identifier servers. Once decrypted, the aggregated vector can include decrypted bucket values that correspond to a target frequency value. The target frequency value can be provided by an internal configuration setting, provided in a request received from any of the computing devices in the system 100, or from one of the workers 405 or the aggregator 410. The target frequency value can include any kind of numerical value that is greater than or equal to zero, and can cause the histogram constructor 165 to use the target frequency value to decode buckets of the encrypted vector that are only greater than or equal to the target frequency in value. For example, if the target frequency value is 3, the histogram constructor 165 can decode buckets of the encrypted vector that are equal to three or greater, and cannot decode the values of the buckets that are less than the target frequency value.

In some implementations, the workers 405 can incorporate the target frequency value when generating the decoding lookup table. In such implementations, the workers 405 can configure the decoding lookup table to only decode the buckets that have a value that is greater than or equal to the target frequency value. The workers 405 can obtain the target frequency value, for example, in a request, or message, from any of the computing devices of system 100, or from an internal configuration setting. In such implementations, the decoding lookup table can configured to decode the buckets that have a value that equal to or greater than the target frequency value. Each of the workers 405, when partially decrypting their share of the encrypted vector, can update the decoding lookup table with their share of their deterministic encryption key. The workers 405 can configured the decoding lookup table to decode their share of the buckets of the encrypted vector that are greater than or equal to the threshold, but be unable to decrypt the buckets that correspond to values that are less than the threshold. As such, when the histogram constructor 165 decodes the encrypted vector to create the histogram, each of the buckets that are greater than or equal to the target frequency threshold can be decoded using the decoding lookup table, and those buckets that are less than the target frequency threshold can remain encrypted. When constructing the bucket histogram, each of the buckets that remain encrypted can be set to the max_frequency value, as described herein. The histogram constructor 165 can receive the max_frequency value, for example, from a request or message from any of the computing devices of the system 100, or from an internal configuration setting. By decoding the encrypted vector, the histogram constructor 165 can generate a decoded vector that includes each of the decoded values of the encrypted vector.

After decoding the encrypted vector using the decoding lookup table, the histogram constructor 165 can generate or create a bucket histogram using the buckets, or counter registers, of the decoded vector. The bucket histogram can correspond to the frequencies of each of the bucket values of the decoded vector. For example, each bin in the bucket histogram can have ranges such as [0, 1); [1, 2); [2, 3); [3, 4); and so on. To generate the bucket histogram, the histogram constructor 165 can access each coordinate of the decoded vector to determine its value. After determining its value, the histogram constructor 165 can increment, or add to, the corresponding bin in the bucket histogram. For example, if the histogram constructor 165 accesses a decoded vector coordinate value that is equal to 51, the histogram constructor 165 can increment the bucket histogram bin that corresponds to the range [51, 52). Although it has been put forth in these examples that the histogram bin ranges are equal to single integer ranges, it should be understood that the bucket histogram bins can correspond to bins that reflect any type of numerical range. As such, in some implementations, the bucket histogram bins can correspond to ranges that are broader or narrower than a single integer value range.

The histogram constructor 165 can iterate through each of the values of the decoded vector, and update the histogram as described above. The histogram constructor 165 can store the histogram in one or more data structures in computer memory. After iterating through each coordinate bucket of the decoded vector, the histogram constructor 165 can remove the noise from the histogram. Recall that additional buckets were added by one or more workers 405 before partially decrypting and shuffling the vector. Before appending the noise bucket values to the encrypted vector, each of the workers 405 agreed on a baseline noise value B. As such, the results as presented in the histogram are biased, and the noise can be removed to achieve an accurate measurement. To remove the noise, the histogram constructor 165 can iterate through each of the bucket histogram bins, and subtract B*w, where w is the number of workers 405 that added noise to the bucket. The histogram constructor 165 can receive a number of workers 405 that added noise to the encrypted vector, along with the baseline noise value, from one or more of the workers 405. In some implementations, the histogram constructor 165 is executing on a worker 405 that already agreed on a baseline noise value B. As such, there may be need to request or receive the baseline noise value, as it may be resident in computer memory. By subtracting the noise from each bin of the histogram, the histogram constructor 165 can generate a filtered histogram. Although the baseline has been removed, it should be understood that two-tailed geometric noise may still be present in the filtered histogram. This can further improve the security of the system, as any noise further obfuscate the values in the histogram without significantly impacting the results of the estimations of cardinality or frequency.

The cardinality estimator 170 can estimate the cardinality (e.g., the number of unique members of the multiset, etc.) of the sets of device identifiers and device attributes based on the filtered histogram generated by the histogram generator 165. To estimate the total cardinality of the multiset, the cardinality estimator 170 can use the formula included below.

$$\frac{m}{} \ln 1 \frac{X}{m}$$

In the above equation, n is the cardinality of the multiset, k is the number of hash functions used to populate each min-increment counting bloom filter, m is the number of counter registers buckets in the decoded vector, and x is the number of filled buckets in the decoded vector. The cardinality estimator 170 can determine the number of filled buckets by counting each of the bins in the filtered histogram that are greater than or equal to one. The cardinality estimator 170 can receive each of the other values (e.g., the number of hash functions, the number of counter register buckets in each decoded vector, etc.) from one or more of the computing devices of system 100, or any of the workers 405 or the aggregator 410. To estimate the K+ frequency of the multiset, the cardinality estimator 170 can utilize the equation provided above with one or more alternations. To estimate K+ frequency, the cardinality estimator 170 can further filter the histogram, such that the cardinality estimator 170 treats the bins of the filtered histogram that correspond to ranges that are less than the target frequency value K as empty. For example, if the target frequency is 3, the cardinality estimator 170 can treat all ranges less than 3 (e.g., [0, 1), [1, 2), [2, 3), etc.) as being empty, and not include those buckets in the cardinality estimation. As such, the value of x in the above equation is treated as the number of buckets of the decoded vector that are greater than or equal to a frequency threshold value. The cardinality estimator 170 can receive the frequency threshold value, for example, from an internal configuration setting, or from one or more of the computing devices of the system 100, or from the workers 405 or the aggregator 410. After calculating the cardinality or the frequency of the multiset, the cardinality estimator 170 can provide (e.g., transmit, or otherwise communicate, etc.) the cardinality or frequency in one or more messages to a requesting computing device. The cardinality estimator 170 can receive requests for the cardinality from any computing device in the system 100, for example a data processing system 105A-N, the client devices 120, or another external computing device that may not be pictured in system 100, but may be communicatively coupled to the network 110 and configured to communicate requests to and receive cardinality data from the cardinality estimator 170.

Figure 5:
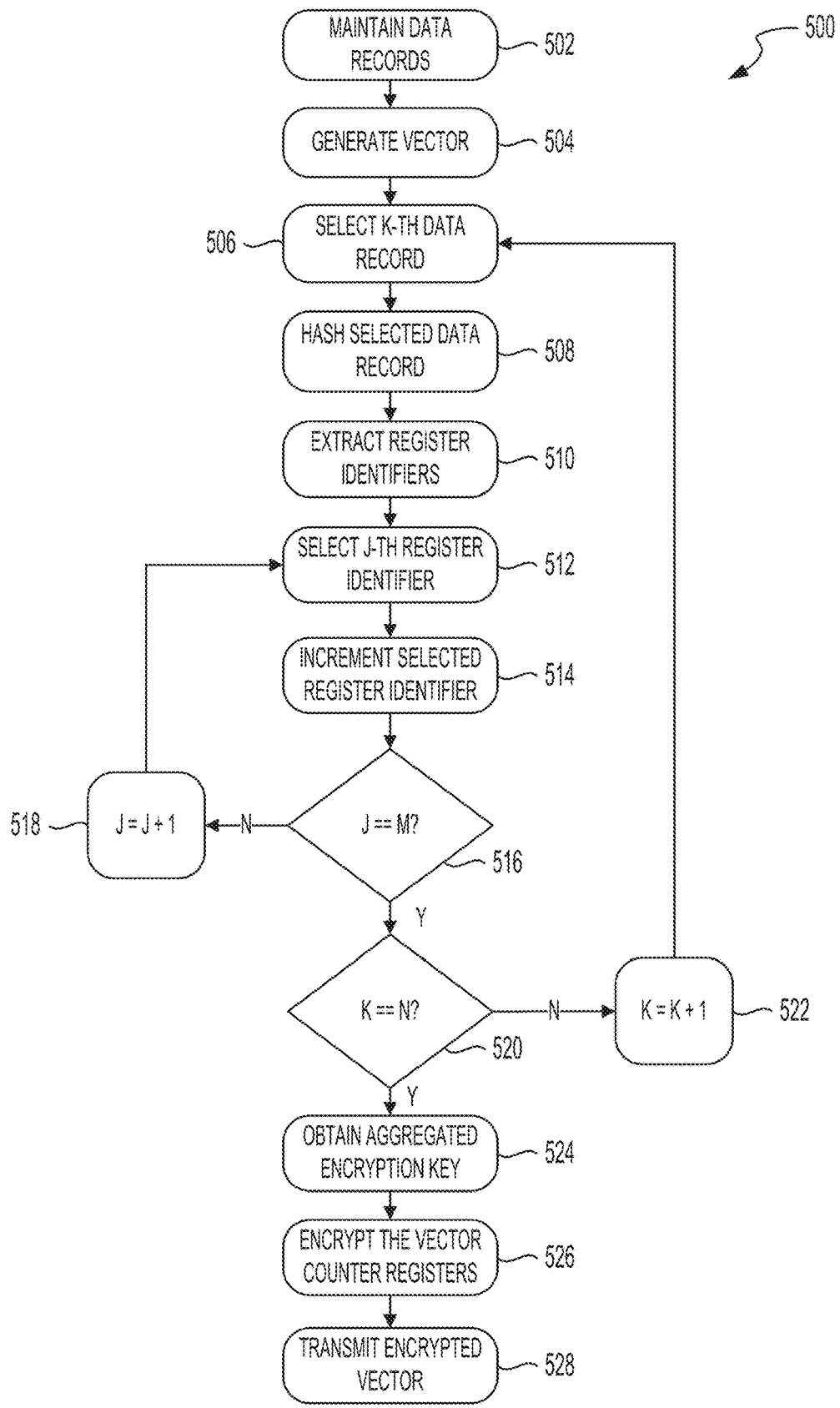
FIG. 5 depicts a flow chart illustrating an example method of generating an encrypted vector representing one or more data records.

Referring now to FIG. 5, depicted is a flow diagram of a method 500 for generating an encrypted vector based on device identifier values and attribute data. The method 500 can be performed, for example, by at least one data processing system (e.g., at least one data processing system 105, etc.), or any other computing device described herein. The data processing system can maintain data records (ACT 502). The data processing system can generate a vector (ACT 504). The data processing system can select the k-th data record (ACT 506). The data processing system can hash the selected data record (ACT 508). The data processing system can extract register identifiers (ACT 510). The data processing system can select the j-th register identifier (ACT 512). The data processing system can increment the selected register identifier (ACT 514). The data processing system can determine whether the counter register j is equal to the number of register identifiers m (ACT 516). The data processing system can increment the counter register j (ACT 518). The data processing system can determine whether the counter register k is equal to the number of data records n (ACT 520). The data processing system can increment the counter register k (ACT 522). The data processing system can obtain an aggregated encryption key (ACT 524). The data processing system can encrypt the vector counter registers (ACT 526). The data processing system can transmit the encrypted vector (ACT 528).

The data processing system can maintain data records (ACT 502). The data records (e.g., the data records 122A-N) can include, for example, one or more device identifiers (e.g., the client identifiers 122A-N) and one or more attributes (e.g., the attributes 127A-N). The data records can be one or more data structures stored in a database (e.g., the database 115) communicatively coupled to the data processing system. Maintaining the data records can include storing the one or more data records in computer memory. In some implementations, the data processing system can maintain the data records in response to receiving one or more messages (e.g., requests, indications, data packets, etc.) at least one client device (e.g., at least one client device 120). The data processing system can extract at least one identifier from the message, along with any attributes present in the message, and generate a data record to include the identifier and the attributes. The data processing system can then maintain (e.g., store, load, or otherwise record) the data record in computer memory, such as a database, one or more data structures, or a non-volatile computer-readable medium.

The data processing system can generate a vector (ACT 504). To generate a vector, the data processing system can allocate one or more regions of memory to accommodate at least one counter register. The allocated counter register can correspond to at least one coordinate of the vector. By generating and allocating memory for one or more counter registers, the data processing can generate the vector comprising the counter registers. The data processing system can initialize each of the counter registers of the vector to an initialization value, for example zero, or one. The data processing system can generate the vector, which can correspond to a min-increment counting bloom filter, to have any number of counter registers (sometimes referred to as "buckets"). For example, the data processing system can receive an indication to generate a min-increment counting bloom filter with n buckets, or may access an internal configuration setting, provided by an external computing device, that specifies the size of the min-increment counting bloom filter by number of buckets or counter registers.

The data processing system can select the k-th data record (ACT 506). To process and add each data record maintained in (ACT 502) to the generated min-increment counting bloom filter, the data processing system can iterate over each of the data records maintained by the data processing system. The data processing system can iteratively loop through each of the data records based on a counter register k. For example, each of the data records can be indexed in a data structure by an index value (e.g., index 0, index 1, index 2, etc.). To process a data record, the data processing system can select the data record which includes or is associated with the index value which is equal to, or approximately equal to, the counter register k. If it is the first iteration of the loop, the counter register k can be initialized to an initialization value (e.g., k=0, k=1, etc.) before selecting the k-th data record. Selecting the data record can include copying the data associated with the data record to a different region of computer memory in the data processing system, for example a working region of memory. Selecting the data record can include retrieving the data record from the database if the data record is located in the database, and copying the data associated with the sample into a different region of computer memory in the data processing system, for example a working region of memory.

The data processing system can hash the selected data record (ACT 508). The data processing system can identify, and execute, one or more hash functions to populate the min-increment counting bloom filter. For example, each of the hashes identified in the list of hashes can provide a normal distribution or expectation of randomness based on input value. That is, for example, similar inputs to the hash function do not necessarily have similar outputs to the hash function. The hash functions can be chosen as optimal hash functions for counting bloom filters. For example, the data processing system can choose independent and uniformly distributed hash functions. Such hash functions can include, for example, murmur hashes, Fowler-Noll-Vo series hashes, or Jenkins hashes, among others. The data processing can select or identify a number of hash functions, and apply each hash function to the selected data record to generate a hashed data record set.

The data processing system can extract register identifiers (ACT 510). Each of the hashed data records of the hashed data record set can correspond to a counter register of the vector generated in ACT 504. To identify the corresponding counter registers, the data processing system can extract a register identifier from each of the hashed data records. The data processing system can extract the register identifiers, for example, by performing a modulus operation on each hashed data identifier with the number of counter registers in the min-increment counting bloom filter. For example, if one of the hashed data records was equal to 50 W, and there are 15 positions in the min-increment counting bloom filter, the data processing system can compute 500% 15=5 to determine that the hashed data record corresponds to the fifth counter register in the min-increment counting bloom filter. In some implementations, if the number of counter registers in the min-increment bloom filter is a power of two, the data processing system can select a number of bits equal to log 2(b), where b is equal to the number of counter registers in the min-increment counting bloom filter.

In a min-increment bloom filter implementation, the data processing system can further access the counter register buckets associated with each of the register identifiers extracted in (ACT 510) to retrieve a set of bucket values. To determine which of the bucket values to increment, the data processing system can determine a subset of the counter register buckets that are equal to the minimum value among the counter register buckets. The minimum value can be determined by comparing each of the counter register buckets, and identifying the smallest (e.g., the value that is closest to zero) bucket value. For example, if there are five buckets, with the respective values of 3, 91, 30, 88, and 10, the minimum bucket value would be three. Note that although only one bucket is illustrated as being equal to the minimum value, there can be any number of buckets that are equal to the minimum value. To illustrate this concept, consider a second example, where the five buckets are respectfully equal to 5, 10, 30, 5, and 28. In this example, there are two buckets that are equal to 5. The minimum value of all of the buckets is also 5. The data processing system can then select the buckets that are equal to the minimum value for inclusion in the subset of counter register buckets. This means that in the first example, where the buckets are respectfully equal to 3, 91, 30, 88, and 10, the data processing system can select the bucket that is equal to 3, the minimum value, as the counter register in the subset. In the second example, where the five buckets are respectfully equal to 5, 10, 30, 5, and 28, the data processing system can select both buckets that are equal to 5, the minimum value of the counter register buckets. Selection of the counter registers can include storing the register identifier that identifies the corresponding bucket in a data structure in the memory of the data processing system. The data processing system can then go on to iterate over the list of the subset of register identifiers in (ACT 512) and onward.

The data processing system can select the j-th register identifier (ACT 512). To process and update each of the register identifiers extracted in (ACT 510), the data processing system can iterate over each of the register identifiers. The data processing system can iteratively loop through each of the register identifiers based on a counter register j. For example, each of the register identifiers can be indexed in a data structure by an index value (e.g., index 0, index 1, index 2, etc.). To process a register identifier, and its associated counter register bucket, the data processing system can select the register identifier which includes or is associated with the index value which is equal to, or approximately equal to, the counter register j. If it is the first iteration of the loop, the counter register j can be initialized to an initialization value (e.g., k=0, k=1, etc.) before selecting the j-th register identifier. Selecting the register identifier can include copying the data associated with the register identifier to a different region of computer memory in the data processing system, for example a working region of memory.

The data processing system can increment the selected register identifier (ACT 514). Incrementing the register identifier can include adding one to the counter register corresponding to the register identifier. In some implementations, the amount added to the counter register can be a value that is other than one. For example, the data processing system can add other values to each counter register that may correspond to any values determined, generated, or calculated herein. In some implementations, the data processing system can subtract from the counter register for various reasons discussed herein. In some implementations, as an alternative to subtraction, the data processing system can add an amount (e.g., one, or some other value, etc.) to each of the other counter register buckets that are not currently selected by the data processing system.

The data processing system can determine whether the counter register j is equal to the number of register identifiers m (ACT 516). To determine whether the data processing system has incremented or updated each of the counter register buckets corresponding to the extracted register identifiers, the data processing system can compare the counter register (e.g., j) used to select each register identifier to the total number of extracted register identifiers m. If the counter register j is not equal to (e.g., less than) the total number of extracted register identifiers m, the data processing system can execute (ACT 518). If the counter register j is equal to (e.g., equal to or greater than) the total number of extracted register identifiers m, the data processing system can execute (ACT 520).

The data processing system can increment the counter register j (ACT 518). In some implementations, the data processing system can add one to the register to indicate the next unprocessed register identifier in the set of extracted register identifiers (e.g., or the subset of extracted register identifiers, etc.). In some implementations, the data processing system can set the counter register j to a memory address value (e.g., location in computer memory) of the next unprocessed extracted register identifier. In some implementations, the memory address value of the next unprocessed extracted register identifier can be included in the data structure at the location of the current (e.g., selected) register identifier. After incrementing the value of the counter register j, the data processing system can execute (ACT 512).

The data processing system can determine whether the counter register k is equal to the number of data records n (ACT 520). To determine whether the data processing system has updated the min-increment (e.g., or standard) counting bloom filter using each data record, the data processing system can compare the counter register (e.g., k) used to select each data record to the total number of data records n. If the counter register k is not equal to (e.g., less than) the total number of data records n, the data processing system can execute (ACT 522). If the counter register k is equal to (e.g., equal to or greater than) the total number of data records n, the data processing system can execute (ACT 524).

The data processing system can increment the counter register k (ACT 522). In some implementations, the data processing system can add one to the register k to indicate the next unprocessed data record in the set of maintained data records (e.g., the data records maintained by the data processing system in ACT 502, etc.). In some implementations, the data processing system can set the counter register k to a memory address value (e.g., location in computer memory) of the next unprocessed data record. In some implementations, the memory address value of the next unprocessed data record can be included in the data structure at the location of the current (e.g., selected) data record. After incrementing the value of the counter register k, the data processing system can execute (ACT 524).

The data processing system can obtain an aggregated encryption key (ACT 524). For example, the data processing system can receive an aggregated public key that is generated by one or more worker computing devices. In some implementations, the data processing system can receive one or more public keys from other computing devices (e.g., other data processing systems, worker computing devices, etc.) and aggregate the public keys into an aggregated public encryption key. The aggregated key can, in some implementations, be used to partially or fully encrypt one or more vectors (e.g., the counting bloom filter vector comprising the updated counter register buckets, etc.). The aggregated key can, in some implementations, simply be a single public key that is distributed to the data processing system to encrypt the counting bloom filter maintained by the data processing system. In some implementations, the aggregated encryption key can comprise one or more ElGamal encryption keys, or any other type of homomorphic encryption scheme. In some implementations, the aggregated encryption key can be any kind of public encryption key that supports a threshold decryption scheme.

The data processing system can encrypt the vector counter registers (ACT 526). To ensure the differential privacy of the min-increment counting bloom filter, the data processing system can employ one or more encryption techniques to encrypt the vector generated and maintained by the data processing system. For example, the data processing system can use the aggregated public key obtained in (ACT 526) using an encryption scheme (e.g., ElGamal encryption, an encryption scheme that supports threshold decryption, homomorphic encryption, etc.). In some implementations the data processing system can encrypt each of the counter registers corresponding to a coordinate of the vector individually using the aggregated encryption key. In such implementations, each of the encrypted counter registers can be aggregated to create an encrypted vector representing the min-increment counting bloom filter.

The data processing system can transmit the encrypted vector (ACT 528). Transmitting the encrypted vector can include providing the encrypted vector to a worker computing device. The data processing system can select a worker computing device as a first of one or more worker computing device to process the encrypted vector. In some implementations, the data processing system can transmit the encrypted vector bucket-wise, that is where each bucket is transmitted separately to the worker computing device. In some implementations, the data processing system transmits the encrypted vector in a bulk transaction, where a majority of, or the entirety of, the encrypted vector is transmitted in a single message.

Figure 6:
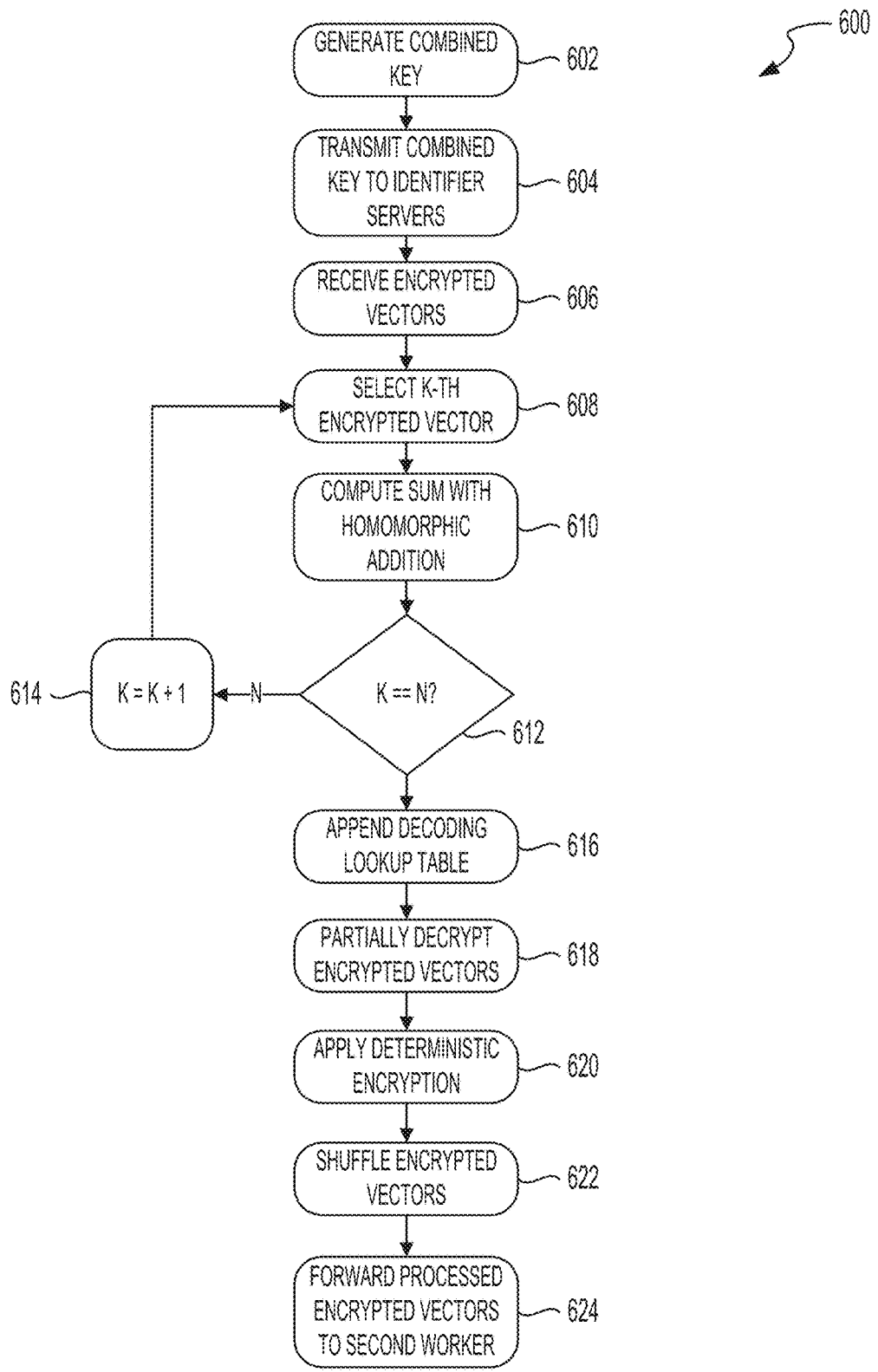
FIG. 6 depicts a flow chart illustrating an example method of processing an aggregated encrypted vector by a worker computing device.

Referring now to FIG. 6, depicted is a flow diagram of a method 600 for generating and aggregating encryption keys to process encrypted vectors by a worker computing device. The method 600 can be performed, for example, by at least one data processing system (e.g., at least one data processing system 105, etc.), or any other computing device described herein. The data processing system can generate a combined key (ACT 602). The data processing system can transmit the combined key to identifier servers (ACT 604). The data processing system can receive encrypted vectors (ACT 606). The data processing system can select the k-th encrypted vector (ACT 608). The data processing system can compute sum with homomorphic encryption (ACT 610). The data processing system can determine whether the counter register k is equal to the number of encrypted vectors n (ACT 612). The data processing system can append a decoding lookup table to the encrypted vectors (ACT 614). The data processing system can append a decoding lookup table (ACT 616). The data processing system can partially decrypt the encrypted vectors (ACT 618). The data processing system can apply deterministic encryption (ACT 620). The data processing system can shuffle the encrypted vectors (ACT 622). The data processing system can forward the processed encrypted vectors to a second worker (ACT 624).

The data processing system can generate a combined key (ACT 602). Generating the combined key can include generating at least one public key and at least one private key. In some implementations, the data processing system can generate a key that can be implemented at least as a part of an ElGamal encryption technique. For example, the data processing system can generate or select a random (e.g., pseudo-random, etc.) integer X modulo q (e.g., the order of the elliptic curve group). The data processing system can use the integer X as the private key for decryption, an can use g as a public key, where g is a generator. A generator can be, for example, a member of a cyclic group. The public key can be shared, for example, with one or more other worker computing devices. Each of the other worker computing devices can generate and transmit their own public and private key pair to the data processing system. To generate the combined key, the data processing system can combine each of the public keys received from other worker computing devices with its own public key.

The data processing system can transmit the combined key to identifier servers (ACT 604). The identifier servers can be, for example, the data processing system responsible for executing method 500, described herein above in conjunction with FIG. 5. The identifier servers can be the data processing systems 105A-N described herein above in conjunction with FIG. 1. In some implementations, the data processing system can transmit each of the public keys of the combined key generated in ACT 602 one at a time, where each of the public keys occupies a single message. In some implementations, the data processing system can transmit the combined key in a single message to the identifier servers (e.g., a single packet, a single transaction or series of packets, etc.).

The data processing system can receive encrypted vectors (ACT 606). After transmitting the combined key for encryption by the identifier servers, the data processing system can receive at least one encrypted vector from each of the identifier servers. In some implementations, the data processing system can receive the vectors periodically or in a burst transaction. Each vector can be associated with a respective identifier that reflects the identifier server from which the vector was received. Each of the encrypted vectors received from the identifier servers can be encrypted using the combined public key generated in ACT 602. The combined public key can allow each worker to partially decrypt the encrypted vectors received from the identifier servers.

The data processing system can select the k-th encrypted vector (ACT 608). To process and aggregate each encrypted vector received in ACT 606 using homomorphic addition, the data processing system can iterate over each of the encrypted vectors received by the data processing system. The data processing system can iteratively loop through each of the encrypted vectors based on a counter register k. For example, each of the encrypted vectors can be indexed in a data structure by an index value (e.g., index 0, index 1, index 2, etc.). To process an encrypted vector, the data processing system can select the encrypted vector that includes or is associated with the index value which is equal to, or approximately equal to, the counter register k. If it is the first iteration of the loop, the counter register k can be initialized to an initialization value (e.g., k=0, k=1, etc.) before selecting the k-th encrypted vector. Selecting the encrypted vector can include copying the data associated with the encrypted vector to a different region of computer memory in the data processing system, for example a working region of memory.

The data processing system can compute a sum of encrypted vectors with homomorphic addition (ACT 610). The data processing system can accumulate, add, or otherwise aggregate each of the encrypted vectors into an aggregate encrypted vector. The aggregate encrypted vector can include, for example, the aggregated total of each of the encrypted counter register buckets updated by the identifier servers. Recall that the identifier servers each maintain and update a min-increment counting bloom filter to represent the number of devices and attributes associated with the respective identifier server. By encrypting the server using homomorphic encryption, each identifier server can hide any information or data about the number of devices or types of attributes in association with the server. In this step, the data processing system (e.g., the worker computing device, etc.) can aggregate each of the encrypted vectors to create an aggregated vector that represents the total number and attributes of the devices across all of the identifier servers. By using homomorphic addition, the data processing system need not decrypt the encrypted vectors before aggregation, thereby preserving the differential privacy of the system. To perform homomorphic addition, the data processing system can homomorphically add the selected encrypted vector with an accumulator vector. If it the first iteration of the loop (e.g., k is equal to the initialization value, etc.), the data processing system can store the selected vector as the accumulator encrypted vector. If it is not the first iteration of the loop, the data processing system can perform homomorphic addition between the selected vector and the accumulator vector, and store the result of the homomorphic addition as the accumulator vector.

The data processing system can determine whether the counter register k is equal to the number of encrypted vectors n (ACT 612). To determine whether the data processing system has homomorphically added each of the encrypted vectors, the data processing system can compare the counter register (e.g., k) used to select each data record to the total number of encrypted vectors n. If the counter register k is not equal to (e.g., less than) the total number of encrypted vectors n, the data processing system can execute (ACT 614). If the counter register k is equal to (e.g., equal to or greater than) the total number of encrypted vectors n, the data processing system can execute (ACT 616). After adding all of the encrypted vectors, the data processing system can copy the accumulator vector to a different region of computer memory, thereby generating an accumulated, or aggregated, encrypted vector.

The data processing system can append a decoding lookup table to the encrypted vectors (ACT 614). In some implementations, the data processing system can add one to the register k to indicate the next unprocessed encrypted vector in the set of encrypted vectors (e.g., the encrypted vectors received by the data processing system in ACT 606, etc.). In some implementations, the data processing system can set the counter register k to a memory address value (e.g., location in computer memory) of the next unprocessed encrypted vector. In some implementations, the memory address value of the next unprocessed encrypted vector can be included in the data structure at the location of the current (e.g., selected) encrypted vector. After incrementing the value of the counter register k, the data processing system can execute (ACT 608).

The data processing system can partially decrypt the encrypted vector buckets. (ACT 616). To deterministically encrypt each bucket of the aggregated or accumulated encrypted vector, the data processing system can partially decrypt the values that correspond to the data processing system. For example, certain buckets of the aggregated encrypted vector may be able to be decrypted using one or more keys maintained by the data processing system. For example, the one or more keys can include the secret key generated by the data processing system in ACT 602. For example, in ACT 602, the data processing system generated a public and a private key, and proceeded to exchange public keys with other worker computing devices in communication with the data processing system. To create the combined key, the data processing system can concatenate, aggregate, or otherwise combine the private keys. Due to the nature of the ElGamal or homomorphic encryption key, the data processing system can partially decrypt any values that are encrypted using the aggregated public key. By only allowing partial decryption using a distributed homomorphic encryption scheme, the method 600 can preserve the differential privacy of the vectors generated by the identifier servers.

The data processing system can apply deterministic encryption (ACT 618). The deterministic encryption can be applied, for example, to the partially decrypted values generated by the data processing system in ACT 616. The deterministic encryption can be achieved by applying a secret key that is known only to the data processing system. For example, the data processing system can apply a secret exponent to all of the partially decrypted buckets generated in ACT 616. This operation can be performed via homomorphism (e.g., equivalent to changing the generator g to some random group element, etc.). The secret key can be a threshold secret key, which can only encrypt or decrypt values that satisfy a certain threshold. In this way, the data processing system can preserve the overall privacy and security of the system. The secret key can also be associated with a lookup table that can be used to decode the results of the deterministic encryption, or the aggregated deterministic encryption across all of the worker computing devices.

The data processing system can append a decoding lookup table (ACT 620). The decoding lookup table can be appended to the deterministically encrypted vector that was partially decrypted in ACT 616. The decoding lookup table may be used, for example, to decode the final output of the distributed deterministic encryption scheme across all of the worker computing devices. By using a deterministic encryption scheme and partial decryption of the values, the data processing system can preserve the differential privacy of the system, and protect any private or protected data indicated by the identifier servers in their min-increment bloom filters. Appending the decoding lookup table can include, for example, concatenating the lookup table to the deterministically encrypted and partially decrypted vector. Because the lookup table can only decrypt the workers contribution to the decryption, no subset of worker computing devices can completely decrypt the data set. The security of the system is further improved by considering that threshold encryption is used, where only the values that satisfy a threshold are decrypted and provided to the worker computing device. Prior to shuffling the encrypted vector buckets, the data processing system can append noise values to the vector using the process outlined in method 700 described herein below in FIG. 7.

The data processing system can shuffle the encrypted vector buckets (ACT 622). Shuffling the encrypted vector buckets can include randomly permuting the vector buckets. For example, the data processing system can access each of the buckets of the encrypted vector, and change their order in a random (e.g., pseudo-random, etc.) way. The data processing system can shuffle or permute the buckets secretly, such that no other computing device can know or determine the permuted order of the permuted buckets. Permuting or shuffling the encrypted vector can include not shuffling the order of the lookup table appended to the encrypted vector. This can ensure that final determination of the values of the encrypted vector can be calculated using the lookup table.

The data processing system can forward the processed encrypted vectors to a second worker (ACT 624). To fully process and deterministically encrypt the entire vector, the encrypted vector can be processed by each worker computing device that contributed to the combined key generated in ACT 602. The combined key value comprises each of the public keys generated by each worker computing device (and including the data processing system). Because the encryption scheme is homomorphic, each of the private keys of the workers can partially decrypt the aggregated encrypted vector that is combined using the homomorphic scheme, but no worker computing device can completely decrypt the vector. This allows each worker computing device to deterministically encrypt the partially decrypted values, and forward to the next worker device. After the worker devices have finished deterministically encrypting the vector based on the partial decryption, the results can be aggregated and a final result can be calculated using the lookup table appended to the encrypted vector.

Figure 7:
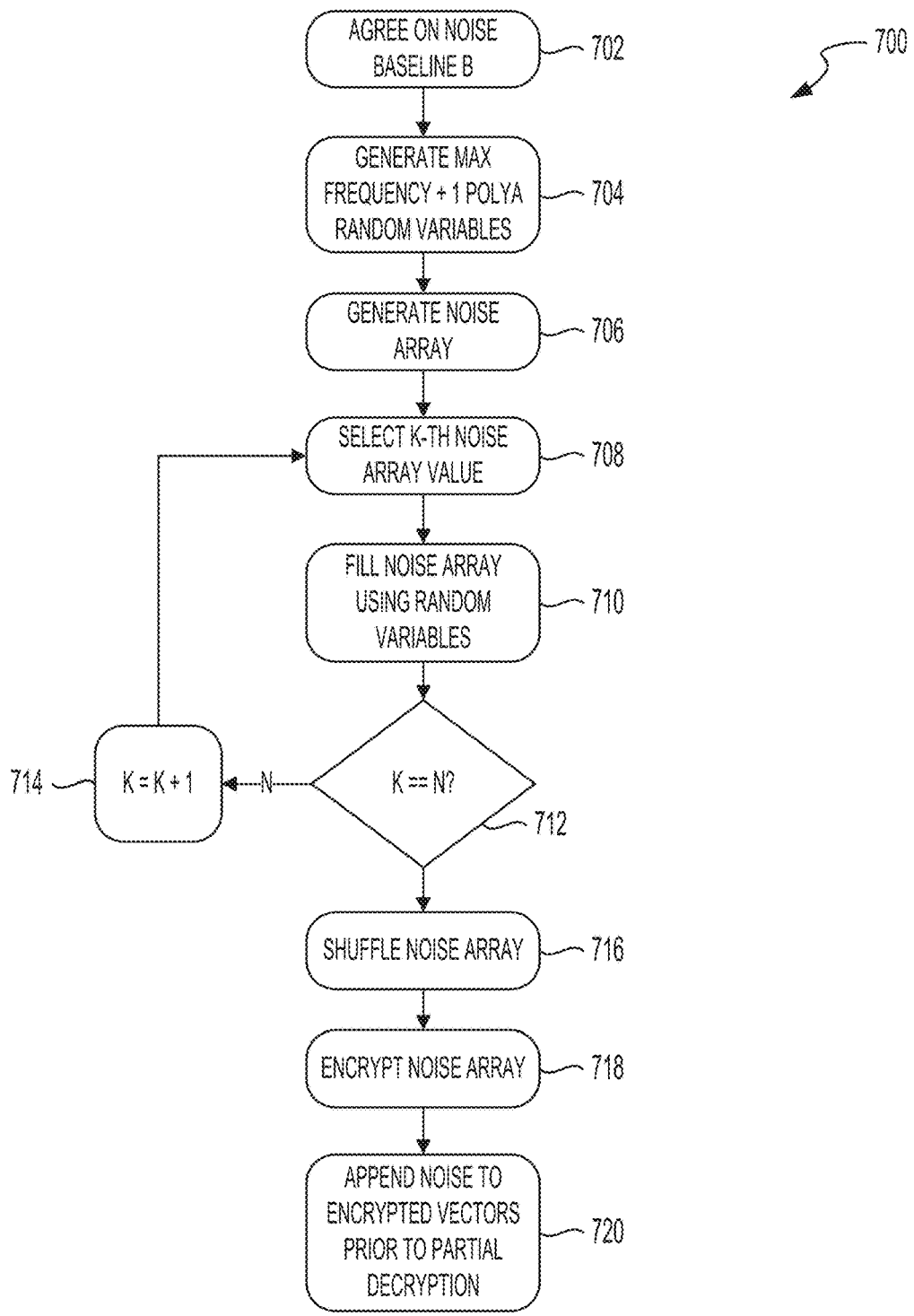
FIG. 7 depicts a flow chart illustrating an example method of generating and incorporating noise the aggregated encrypted vector during processing by a worker computing device.

Referring now to FIG. 7, depicted is a flow diagram of a method 700 for incorporating noise into encrypted aggregated vectors to provide differential privacy between worker computing devices. The method 700 can be performed, for example, by at least one data processing system (e.g., at least one data processing system 105, etc.), or any other computing device described herein. The data processing system can agree on a noise baseline B (ACT 702). The data processing system can generate a number of random variables (ACT 704). The data processing system can generate a noise array (ACT 706). The data processing system can select the k-th noise array value (ACT 708). The data processing system can fill the noise array using random variables (ACT 710). The data processing system can determine whether k is equal to the number of noise array values n (ACT 712). The data processing system can increment the counter register k (ACT 714). The data processing system can shuffle the noise array (ACT 716). The data processing system can encrypt the noise array (ACT 718). The data processing system can append noise to encrypted vectors prior to partial decryption (ACT 720).

The data processing system can agree on a noise baseline B (ACT 702). The noise baseline can be, for example, an integer that will likely be greater than any negative noise value generated by an individual worker computing device (e.g., the data processing system, other data processing systems, etc.). For example, the data processing system may use particular thresholds for noise calculations, such that any generated noise does not or cannot exceed the thresholds. The noise baseline can be configured such that and noise added or subtracted to the baseline value (e.g., the integer value, etc.) will not result in a negative number. To agree on a baseline noise value, each of the worker computing devices can exchange a generated baseline value until each worker is satisfied that the baseline noise value will not result in negative values. If a worker computing device agrees with the baseline noise value, the worker computing device can broadcast an agree message to the other computing devices, along with the baseline noise value. Once an agree message has been received from each of the worker computing devices, the devices have agreed on a baseline noise value.

The data processing system can generate a number of random variables (ACT 704). The number of random variables can be, for example, the maximum desired frequency (e.g., the K+ frequency, etc.) that is to be measured by the system, plus one. This can be designated as max_frequency+1. The random variables can be any kind of random variable (e.g., Polya random variables, etc.). The random variables can be generated as a set of random variables. For example, the set of random variables can be organized as $[X_0, X_1, X_2, \ldots, X_i, \ldots, X_{mf}]$, where $X_i$ indicates an indexed value of the set (e.g., any $X_i$ of the set of random variables) and $X_{mf}$ indicates the maximum frequency to be measured by the system.

The data processing system can generate a noise array (ACT 706). The data processing system can allocate a noise array that is of a particular size. The size of the noise array can be, for example, 'f·(B−$X_i$) for each $X_i$ in the set of random variables generated in ACT 704. The data processing system can determine the total sum of the baseline minus the random variables, for example, by computing a difference of each random variable and the baseline noise value, and accumulating each of the differences. The total size of the noise array can be equal to the sum of the differences.

Generating the noise array can include allocating a region of memory that is equal to the size of the noise array.

The data processing system can select the k-th noise array value (ACT 708). To fill the noise array based on each random variable generated in ACT 704, the data processing system can iterate over each of the noise array values (e.g., each of the random variables generated in ACT 704, etc.). The data processing system can iteratively loop through each of the noise values based on a counter register k. For example, each of the noise values can be indexed in a data structure by an index value (e.g., index 0, index 1, index 2, etc.). To process a noise value, the data processing system can select the noise value that includes or is associated with the index value which is equal to, or approximately equal to, the counter register k. If it is the first iteration of the loop, the counter register k can be initialized to an initialization value (e.g., k=0, k=1, etc.) before selecting the k-th noise value. Selecting the noise value can include copying the data associated with the noise value to a different region of computer memory in the data processing system, for example a working region of memory.

The data processing system can fill the noise array using random variables (ACT 710). Using the select noise value (e.g., the selected random variable $X_k$), the data processing system can compute difference between the baseline noise value and the random variable. This value can be computed using the equation $D=B-X_k$, where D is the respective difference value. The data processing system can then fill the noise array with D copies of k, where the value of k is equal to the noise value. This can include, for example, accessing the k-th position in the noise array, and adding k*D to the noise array. In this way, each position in the noise array can be populated by a pseudo-random noise value based on the baseline value and the random variables generated by the system.

The data processing system can determine whether k is equal to the number of noise array values n (ACT 712). To determine whether the data processing system has updated each position of the noise vector, the data processing system can compare the counter register (e.g., k) used to select each noise value to the total number of noise values n. If the counter register k is not equal to (e.g., less than) the total number of noise values n, the data processing system can execute (ACT 714). If the counter register k is equal to (e.g., equal to or greater than) the total number of noise values n, the data processing system can execute (ACT 716).

The data processing system can increment the counter register k (ACT 714). In some implementations, the data processing system can add one to the register k to indicate the next unprocessed data record in the set of maintained data records (e.g., the data records maintained by the data processing system in ACT 502, etc.). In some implementations, the data processing system can set the counter register k to a memory address value (e.g., location in computer memory) of the next unprocessed data record. In some implementations, the memory address value of the next unprocessed data record can be included in the data structure at the location of the current (e.g., selected) data record. After incrementing the value of the counter register k, the data processing system can execute (ACT 524).

The data processing system can shuffle the noise array (ACT 716). Shuffling the noise array can include randomly (e.g., pseudo-randomly, etc.) swapping the positions of the values in the noise array, thereby generating a randomly permuted noise array. Because values of each position of the noise array scale larger as the size of the k increases (e.g., for each position k of the noise array, the value of the noise is equal to k*D, where D is equal to the baseline noise level minus the random variable $X_k$). In one embodiment, shuffling the noise array can include selecting a random (e.g., pseudo-random, etc.) position of the noise array, and swapping it with another pseudo-random position of the noise array. In another embodiment, shuffling the noise array can include generating a second noise array that includes the values of the noise array pseudo-randomly assigned to positions in the second noise array. This can ensure that the data processing system generates a noise array that is at least pseudo-randomly distributed with respect to array position.

The data processing system can encrypt the noise array (ACT 718). The data processing system can encrypt each position of the noise array using the combined key generated in ACT 602 of the method 600, described herein above in conjunction with FIG. 6. In some implementations, the data processing system can encrypt the entire noise array using the combined key in a single step, rather than encrypting each of the positions of the noise array individually. By encrypting the noise array using the same public key used to encrypt the aggregated vectors, the data processing system is able to combine the noise array with the aggregated vector in future steps to improve differential privacy of the system. Later, when the data processing system decodes the aggregated results, the data processing system can perform additional computations to "extract" the noise from the result, leaving only a differential computation of the K+ frequency of the device identifiers and attributes.

The data processing system can append noise to encrypted vectors prior to partial decryption (ACT 720). Appending the noise to the encrypted vectors can include adding the noise itself to the encrypted vector values, thereby introducing additional levels of privacy to the data vectors without reducing the total accuracy of the data. In some implementations, the data processing system can append each noise value (e.g., each position in the noise array) to encrypted vector prior to the partial decryption step (e.g., ACT 616). This can mean that when the final histogram is constructed by the accumulator computing device, the data processing system can simply remove B*number of noise vectors from each bucket of the histogram to remove the noise from the data. In some implementations, the data processing system can receive a noise vector from each worker computing device, and append each of the noise values to the encrypted vector prior to the partial decryption step. In this way, the data processing system can create a large vector with many noise values that are permuted as the vector travels throughout the system. Because no one worker device knows which values are noise values, no single worker can determine the original data provided to the data processing system from the identifier servers. This is a significant improvement to the security of data analysis systems.

FIG. 8 shows the general architecture of an illustrative computer system 800 that may be employed to implement any of the computer systems discussed herein in accordance with some implementations. The computer system 800 can be used to provide information via the network 110 for display. The computer system 800 of FIG. 8 comprises one or more processors 820 communicatively coupled to memory 825, one or more communications interfaces 805, and one or more output devices 810 (e.g., one or more display units) and one or more input devices 815. The processors 820 can be included, for example, in the data processing systems 105A-N, or the other components of the system 100 such as the client devices 120A-N.

In the computer system 800 of FIG. 8, the memory 825 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 80M of FIG. 8, the data processing systems 105A-N can include the memory 825 to store information related to the sets of user identifiers, the generated vectors, among others. The processor(s) 820 shown in FIG. 8 may be used to execute instructions stored in the memory 825 and, in so doing, also may read from or write to the memory various information processed or generated pursuant to execution of the instructions.

The processor 820 of the computer system 800 shown in FIG. 8 also may be communicatively coupled to or control the communications interface(s) 805 to transmit or receive various information pursuant to execution of instructions. For example, the communications interface(s) 805 may be coupled to a wired or wireless network, bus, or other communication means and may therefore allow the computer system 800 to transmit information to or receive information from other devices (e.g., other computer systems). While not shown explicitly in the system of FIG. 8, one or more communications interfaces facilitate information flow between the components of the system 800. In some implementations, the communications interface(s) may be configured (e.g., via various hardware components or software components) to provide a website as an access portal to at least some aspects of the computer system 800. Examples of communications interfaces 805 include user interfaces (e.g., web pages), through which the user can communicate with the computer system 800.

The output devices 810 of the computer system 800 shown in FIG. 8 may be provided, for example, to allow various information to be viewed or otherwise perceived in connection with execution of the instructions. The input device(s) 815 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Measurement Accuracy

This section focuses on comparing the FreqLogLog (FLLs), CBF, and Min Increment CBF (MICBFs) methods across a range of configurations. The following tables, data, and descriptions with respect to FIGS. 9A-17B are example, and should not be construed as limiting in any way. Each configuration can be simulated over 100 trials where each trial consists of inserting 1 million elements according to a particular frequency distribution, which can be a parameter of the simulation. For example, the element 1234 will be inserted 1 or more times depending upon a draw from the simulation's frequency distribution. This means that for the uniform distribution, which is discussed below, we insert approximately 27,500 unique elements for each of 8 frequencies, for a total of about 220,000 unique elements. Finally, a fixed random seed is used across configurations in order to ensure that the set whose cardinality and element frequency are being estimated is identical for each configuration.

The following frequency distributions are considered in order to demonstrate that measurement accuracy is not dependent upon the distribution of element frequencies. More could be done here in order to more conclusively demonstrate this, but overall the distribution does not appear to have an effect. Therefore, after an initial set of simulations only "UNIFORM 1 to 8" is used. The descriptions indicated in Table 2 below are provided in conjunction with the data indicated in FIGS. 9A-17B.

TABLE 2

| Name | Description |
| --- | --- |
| UNIFORM 1 to 8 (a.k.a. uniform) | The likelihood that an element has frequency in [1, 8] is equally likely. |
| LINEAR 1 to 8 | The likelihood that an element has frequency weighted linearly where a frequency of 1 has a weight of 8 and frequency of 8 has a weight of 1. |
| LINEAR 8 to 1 | This is the reverse of LINEAR 1 to 8. |

Several different configurations of both FLLs and CBFs can be considered. For FLLS, the main parameter is the number of buckets to use, which is a power of two. Thus, FLL_2_16 indicates that 2≠buckets was used. For CBFs there are three parameters, whether to enable the min-increment feature, the number of buckets (m), and the number of hash functions (k).

The following table shows the set of configurations that were simulated along with their memory usage. For the CBFs, we report total memory usage where we assume I byte per bucket, however it may be possible to get this down to 4 bits per bucket or perhaps less depending upon the maximum frequency we desire to measure. However, the practicality of this reduction is not that important when considered from the perspective of the MPC protocol, which can bring an equivalent ciphertext expansion to the buckets regardless of the plaintext size, as described herein. For the FLLs, we report total memory assuming 3 bytes per bucket. Bloom filters may utilize significantly more memory than HLLs, however they can provide more accurate measurement and are amenable to a secure multi-party protocol that leaks very little information.

TABLE 3

| Configuration Name | Description | Bloom Filter Buckets | Bloom Filters Hashes | Memory Usage (MB) |
| --- | --- | --- | --- | --- |
| CBF_0_01_Uniform | CBF with a 1% false positive rate on the uniform frequency distribution | 9,585,059 | 7 | ~9.6 MB |
| CBF_MI_0_01_Uniform | Min-increment CBF with a 1% false positive rate on the uniform frequency distribution | 9,585,059 | 7 | ~9.6 MB |
| CBF_MI_0_1_Uniform | Same as above but with a 10% false positive rate | 4,792,530 | 4 | ~4.8 MB |
| CBF_MI_0_25_Uniform | Same as above but with a 25% false positive rate | 2,885,391 | 3 | ~2.8 MB |

TABLE 3-continued

| Configuration Name | Description | Bloom Filter Buckets | Bloom Filters Hashes | Memory Usage (MB) |
|---|---|---|---|---|
| CBF_MI_0_3_Uniform | Same as above but with a 30% false positive rate | 2,505,912 | 2 | ~2.5 MB |
| CBF_MI_0_4_Uniform | Same as above but with a 40% false positive rate | 1,907,140 | 2 | ~1.9 MB |
| CBF_MI_0_5_Uniform | Same as above but with a 50% false positive rate | 1,442,696 | 2 | ~1.4 MB |
| FLL_2_14_Uniform | FLL with 2 to the power of 14 buckets on the uniform frequency distribution | N/A | N/A | ~48 kB |
| FLL_2_18_Uniform | FLL with 2 to the power of 18 buckets on the uniform frequency distribution | N/A | N/A | ~790 kB |
| FLL_2_20_Uniform | FLL with 2 to the power of 20 buckets on the uniform frequency distribution | N/A | N/A | ~3.2 MB |
| FLL_2_22_Uniform | FLL with 2 to the power of 22 buckets on the uniform frequency distribution | N/A | N/A | ~12.6 MB |

The charts illustrated in FIGS. 9A-17N how the log of the mean absolute error (log 10(MAE)), the mean absolute error rate (MAER), the log of the root mean-squared error, (log 10(RMSE)), and the mean error (ME). The charts that report error show k+ reach for values up to 10, while the chart that reports a rate only shows values up to 8. This is because the simulated max frequency was always 8, and therefore any non-zero values for 9+ and 10+ values are errors.

Figure 9A:
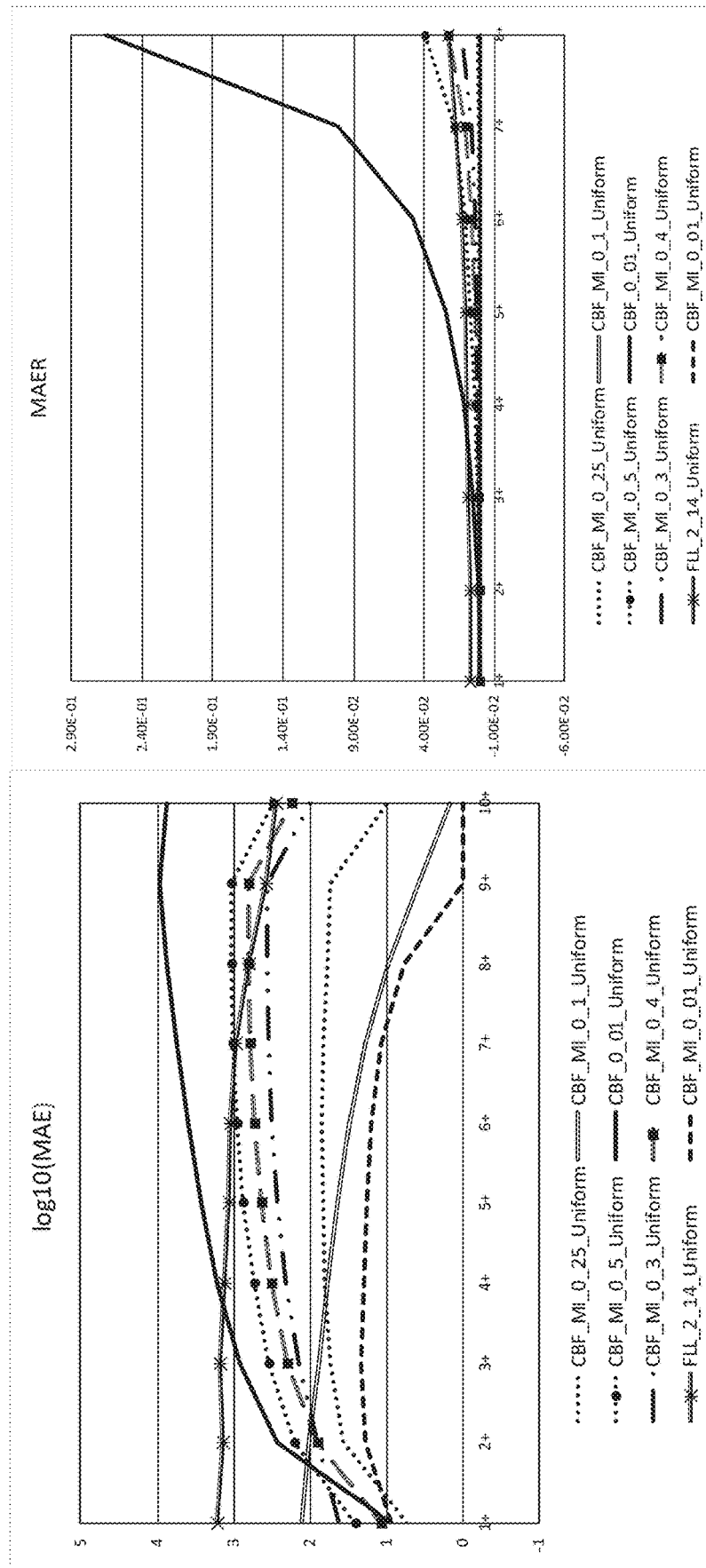
FIGS. 9A and 9B depict example data graphs illustrating the comparison of various experimental parameters of the system and their impact on resulting computations.
Figure 9B:
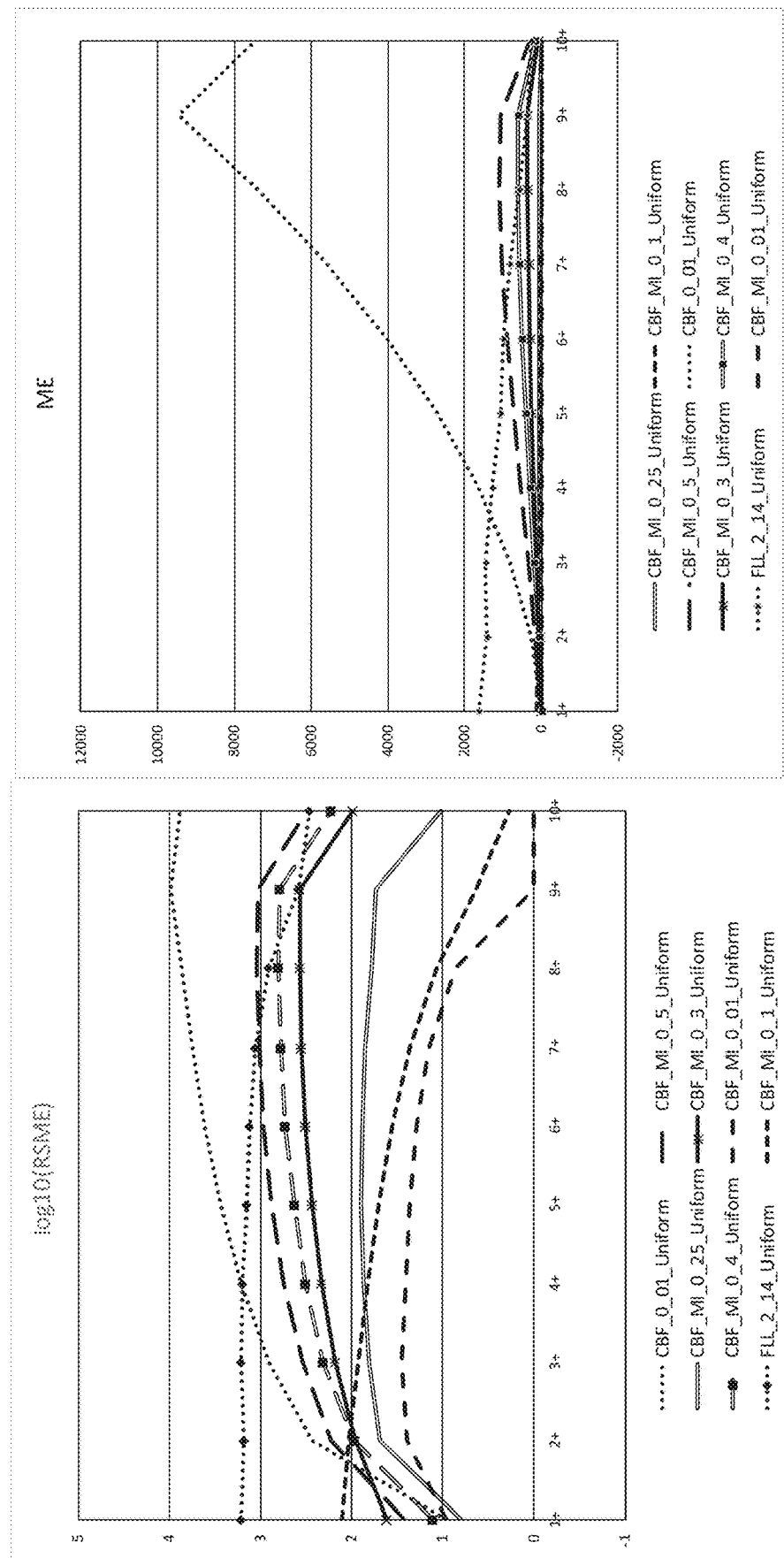

FIGS. 9A-B considers several configurations of the CBF and FLL_2_14_Uniform. For the CBF to be competitive, the min-increment feature may need to be activated, and therefore all future results may utilize MICBFs. The min-increment CBFs may substantially outperform the FLL, though the error rate of the FLL is only about 1%, which is quite good. On the other hand, the best MICBF has nearly zero error, but it comes at the cost of substantially more memory. All methods are biased toward over estimating as shown by the ME plot. At a frequency of 8, the MI_CBF_0_4 has comparable performance to the FLL but with ~50× memory usage. The MICBF does however do much better at lower frequencies.

Figure 10A:
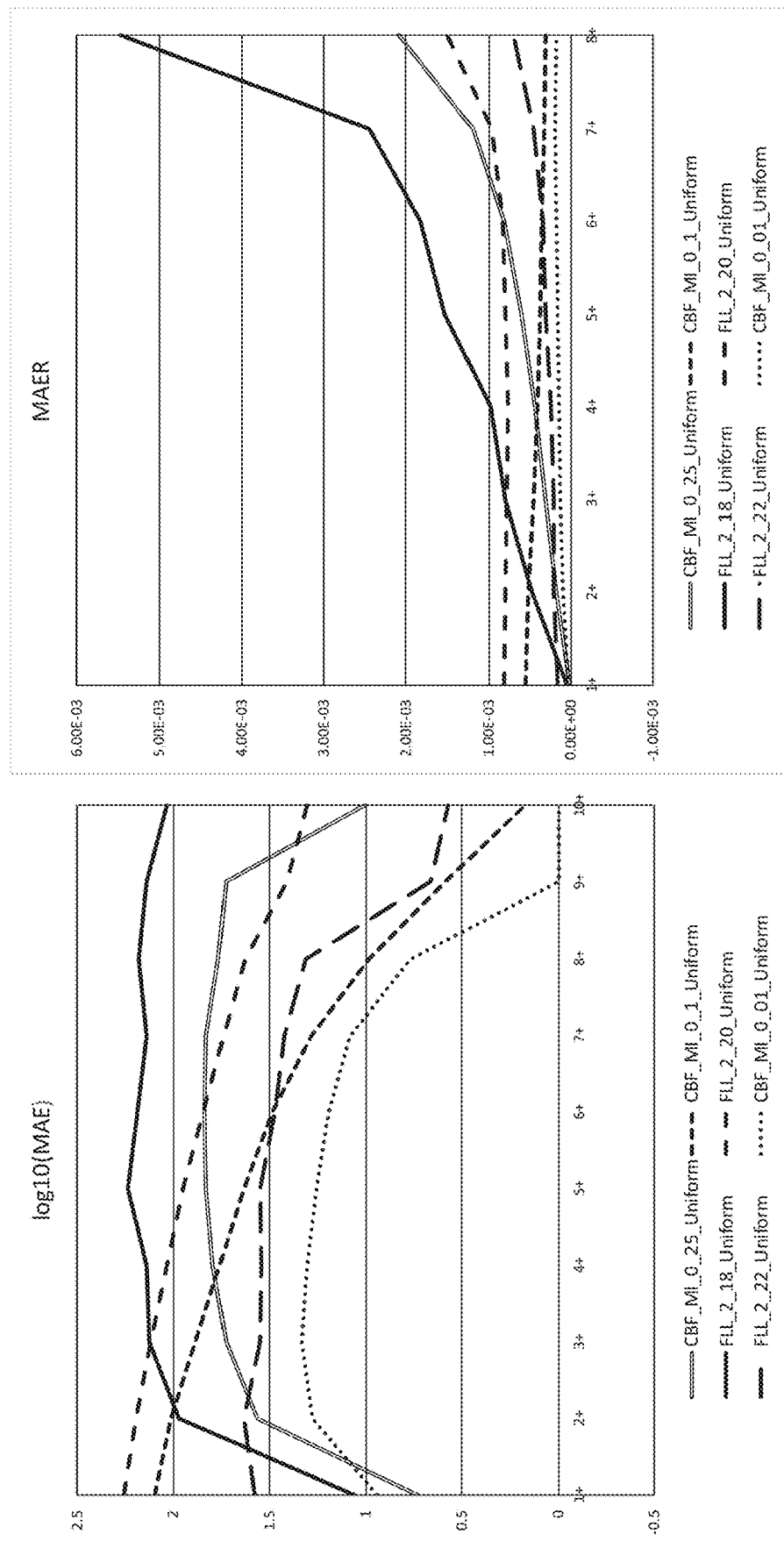
FIGS. 10A and 10B depict example data graphs illustrating the comparison of various experimental parameters of the system and their impact on resulting computations.
Figure 10B:
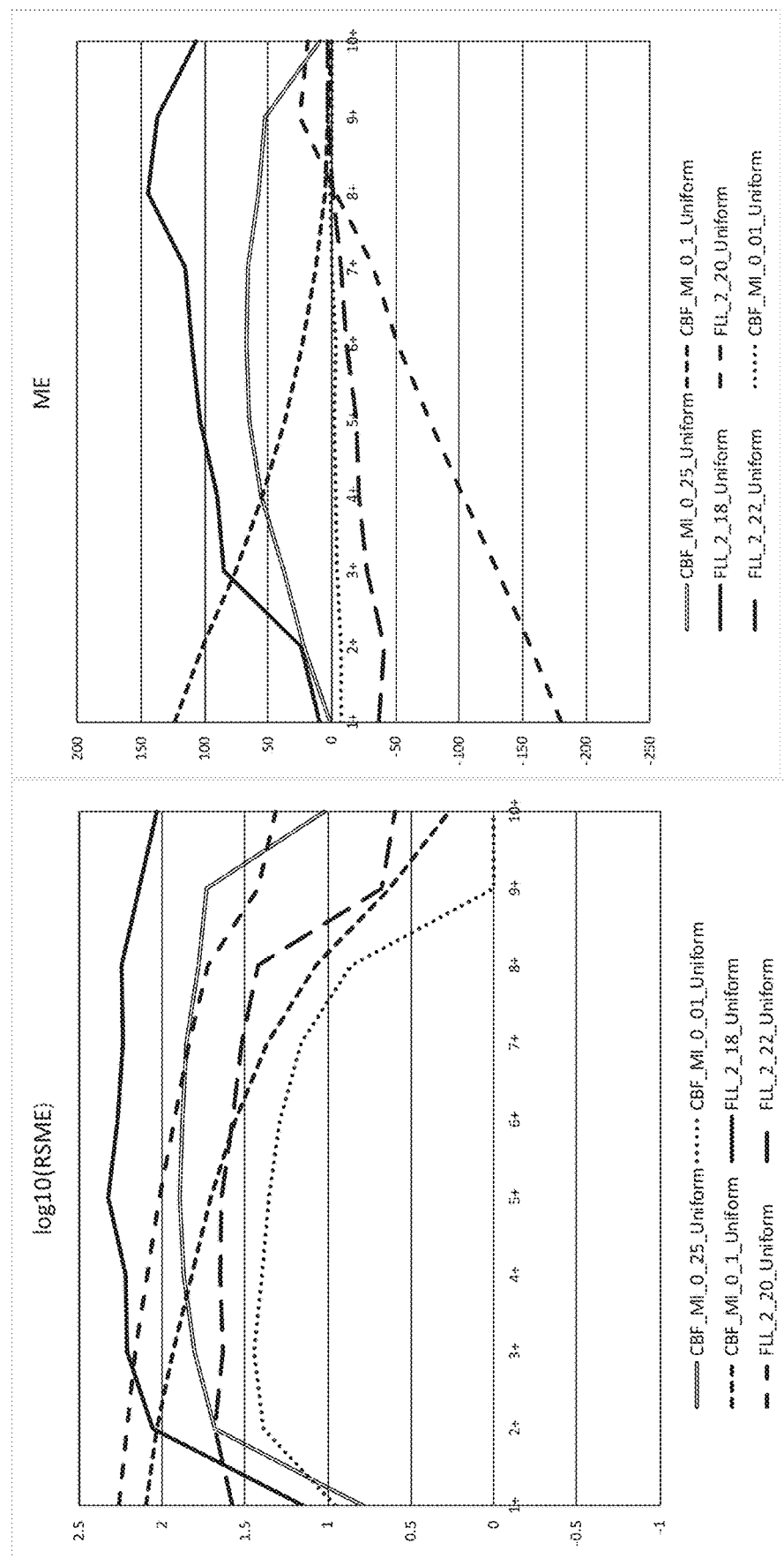
Figure 11A:
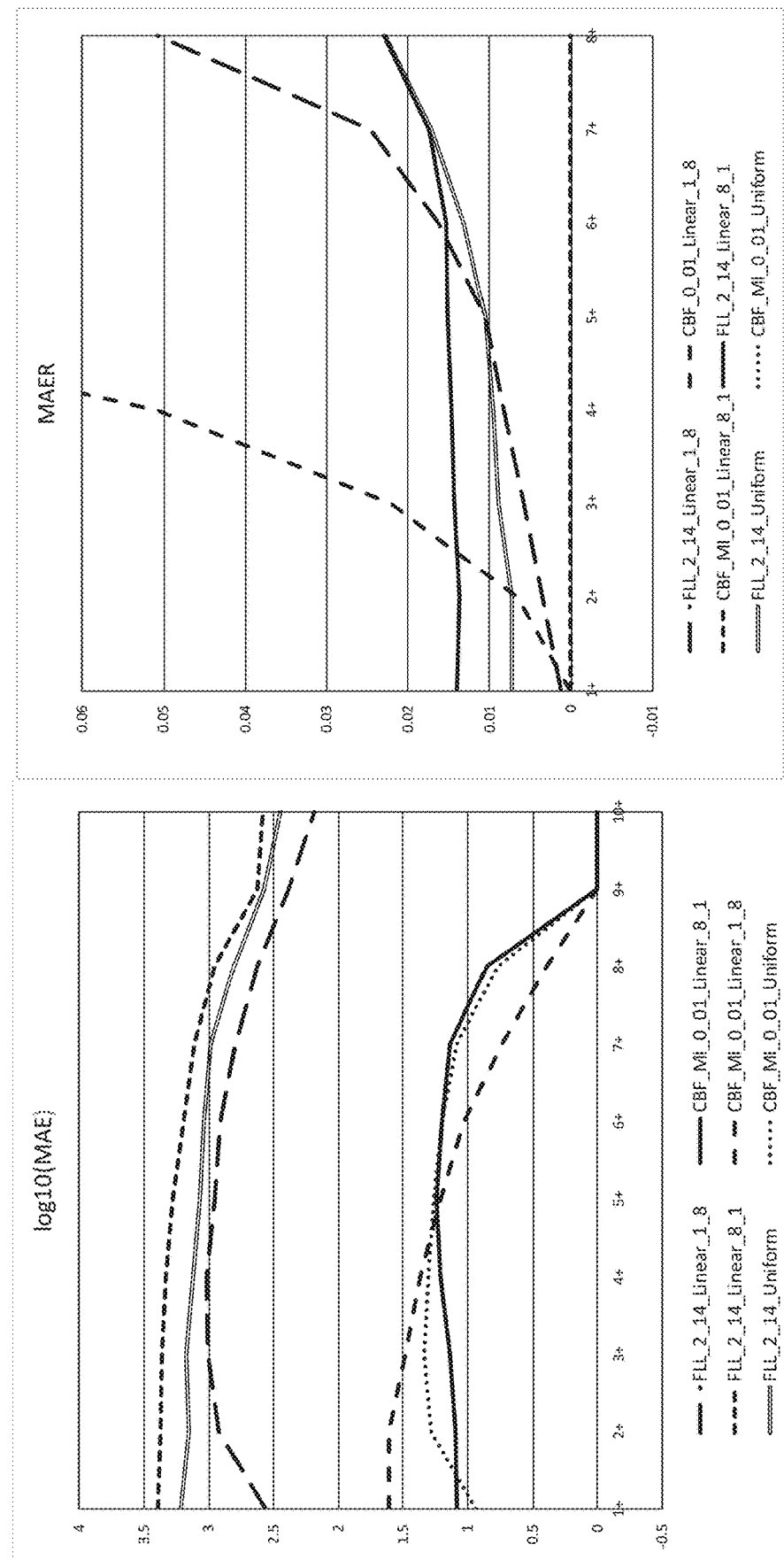
FIGS. 11A and 11B depict example data graphs illustrating the comparison of various experimental parameters of the system and their impact on resulting computations.
Figure 11B:
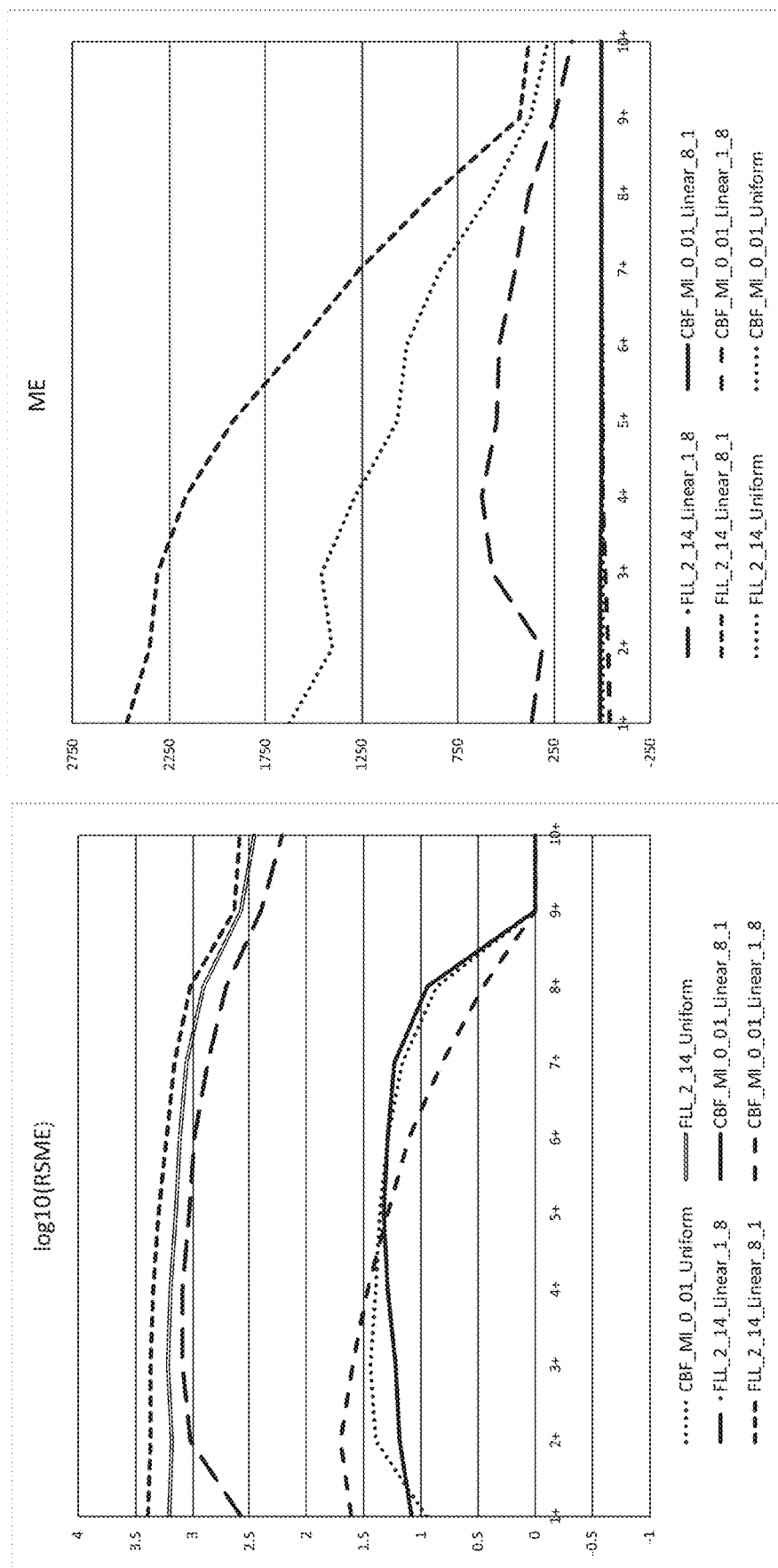

Next, in FIGS. 10A-B, several higher memory FLLs were tested. Illustrated are the same metrics as above for the MICBFs and three higher memory FLLs. The main observation is that even the highest memory FLL. FLL_2_22 (yellow line), which uses 12.6 MB of memory is outperformed by the CBF_MI_0_01, which uses 9.6 MB of memory. Another observation is that FLLs estimate higher frequencies less accurately whereas MICBFs have a more consistent error across frequencies. A final interesting, and somewhat puzzling result is related to the shape of the curves. Looking at the log 10(MAE) plot it appears that the general shape of the MICBF and FLL errors are the same across parameterizations, however upon closer inspection the curve for FLL_2_18 looks quite similar to the MICBF family of curves and CBF_MI_0_1 looks similar to the FLL family of curves. This is not an error, the results having been confirmed several times.

Another consideration on the baseline set of measurements is how the two methods do with respect to different frequency distributions. Here, FLL_2_14 and CBF_MI_0_01 are tested against the frequency distributions described above, and the results are shown in FIGS. 11A-B. Overall. MICBFs are resilient to changes in frequency distribution, exhibiting a stable nearly zero rate of error across the three distributions, whereas the error rate of the FLL fluctuates by up to 2.5% depending upon the frequency distribution. Specifically, where the frequency distribution is less dense the FLL has a greater tendency to overestimate cardinality. This is shown by the overestimation (~1.5%) of 1+ reach for the LINEAR_8_1 distribution as well as the overestimation (~4.5%) of 8+ reach for the LINEAR_1_8 distribution. Presumably, the latter exhibits greater error because 1+ reach are inclusive of all frequencies whereas 8+ is not, which means fewer buckets to average over.

Figure 12:
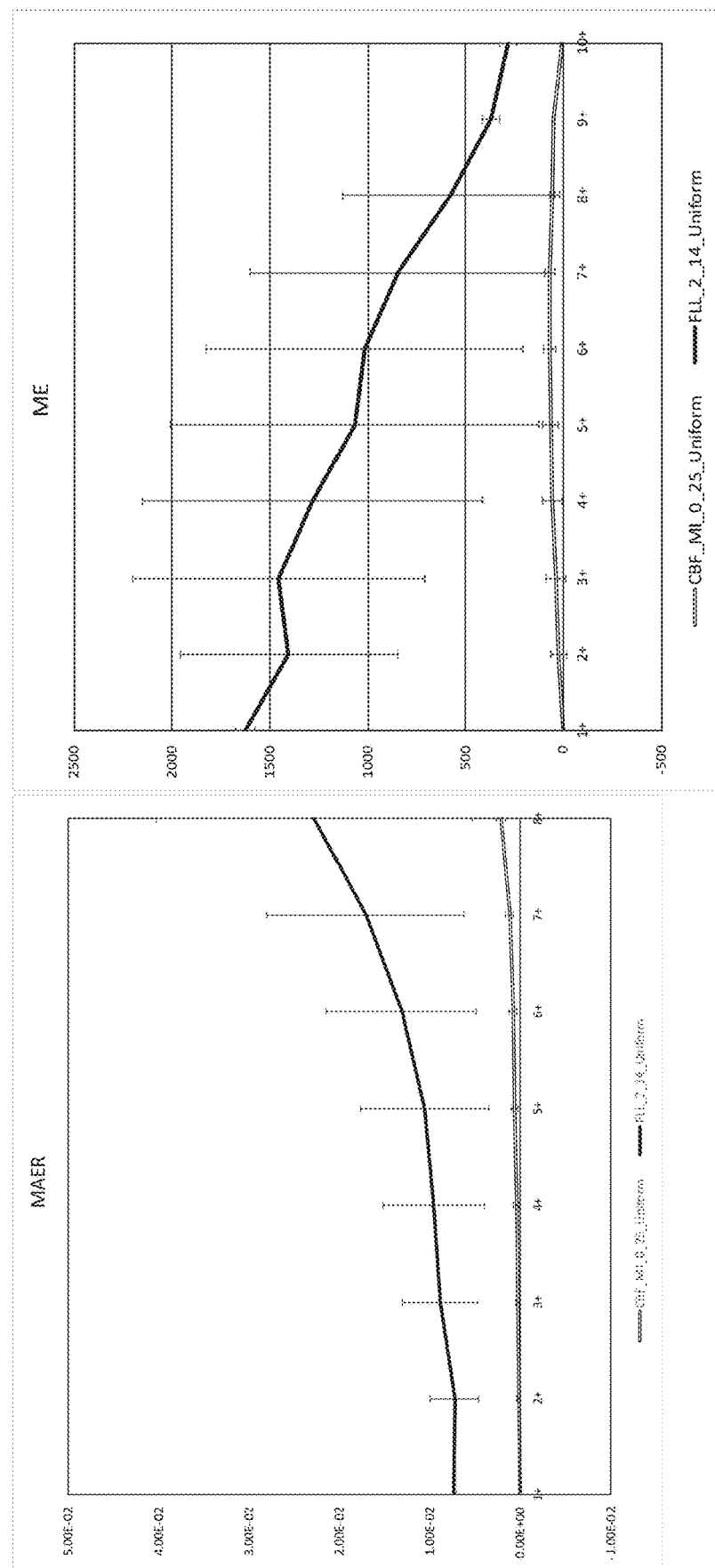
FIG. 12 depict example data graphs illustrating a comparison between a FreqLogLog implementation and a counting bloom filter implementation as described herein.

Finally, FIG. 12 considers the variability of the estimators. Here, the log-scaled plots are omitted (only the MAER and ME are shown), and only two estimates are shown in order to keep the charts from getting too busy. Moreover, to make it a completely fair comparison. CBF_MI_0_25_Uniform is compared to FLL_2_14_Uniform. What is clear is that the FLL has increasing variability at higher frequencies, which as above can be explained by the fact that at higher frequencies fewer buckets are available to average over. However, even at the lowest frequency the FLL has significantly more variability than the MICBF, which has consistently small variability across all frequencies.

Overall, compared to FLLs. MICBFs are more accurate and have less variability across a larger range of frequency distributions, albeit with significantly more memory usage. The following will consider how to apply differential privacy to MICBFs.

At least two approaches to making MICBFs differentially private are presented herein, both of which will use the two-sided geometric distribution for noise. The first is to apply differential privacy (DP) to the individual CBF buckets, which results in quite poor measurement quality, the details of which are reviewed below. On the other hand, the second method, which is to apply DP to the histogram of bucket values has solid results.

Given that the cardinality estimation can use the histogram of bucket values and assuming that the histogram can be computed without revealing the bucket values, which will be shown to be possible in the next section, then differential privacy can be applied to the bucket value histogram itself. Now, normally the sensitivity of a histogram query can be 1, however since we are considering a histogram of bucket values and each client device identifier or attribute data is represented k times, the sensitivity is actually k, or again just the number of hash functions. For the CBF_MI_0_01 family this value is 7.

Figure 13A:
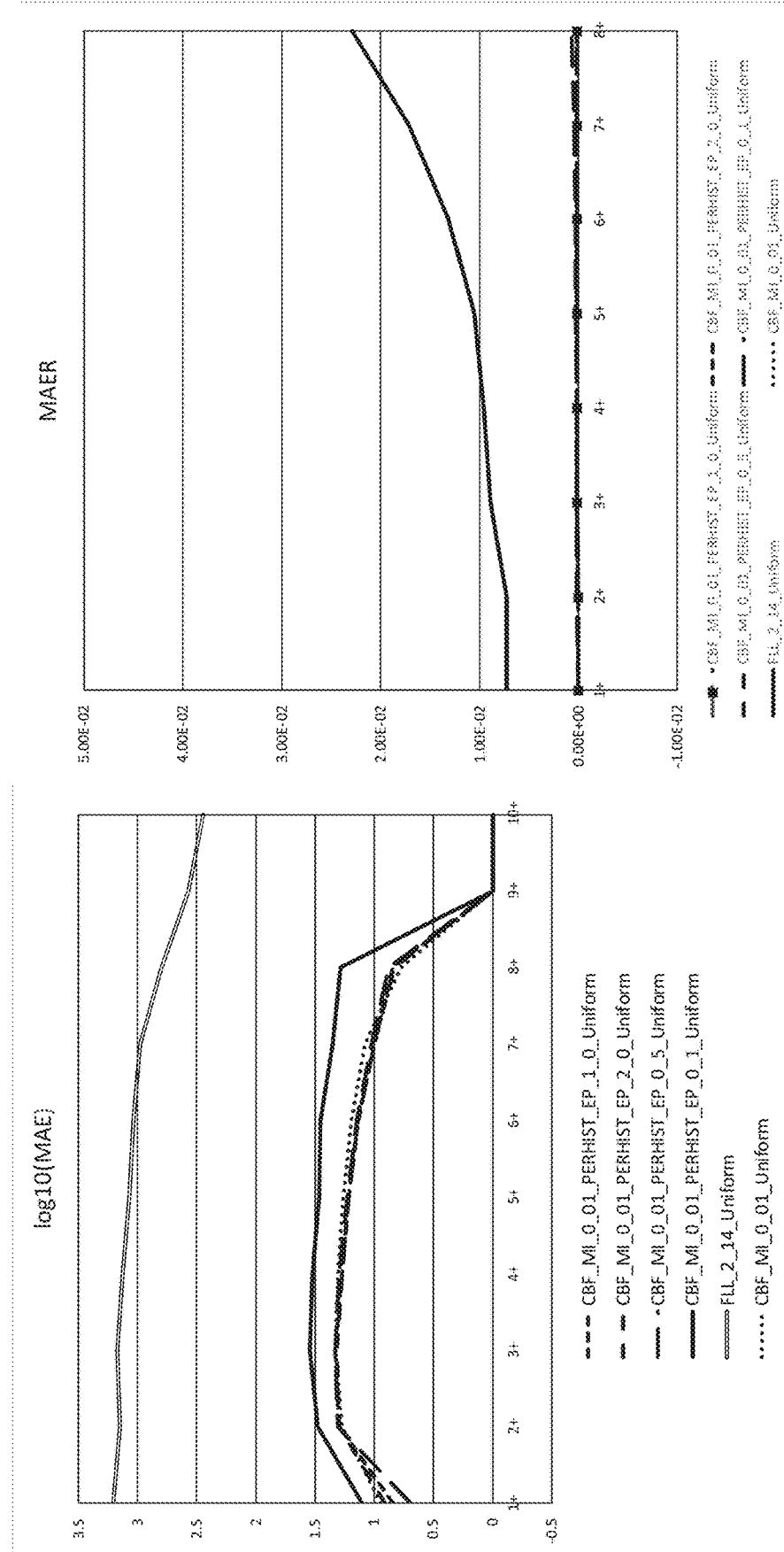
FIGS. 13A and 13B depict example data graphs illustrating the comparison of various experimental parameters of the system and their impact on resulting computations.
Figure 13B:
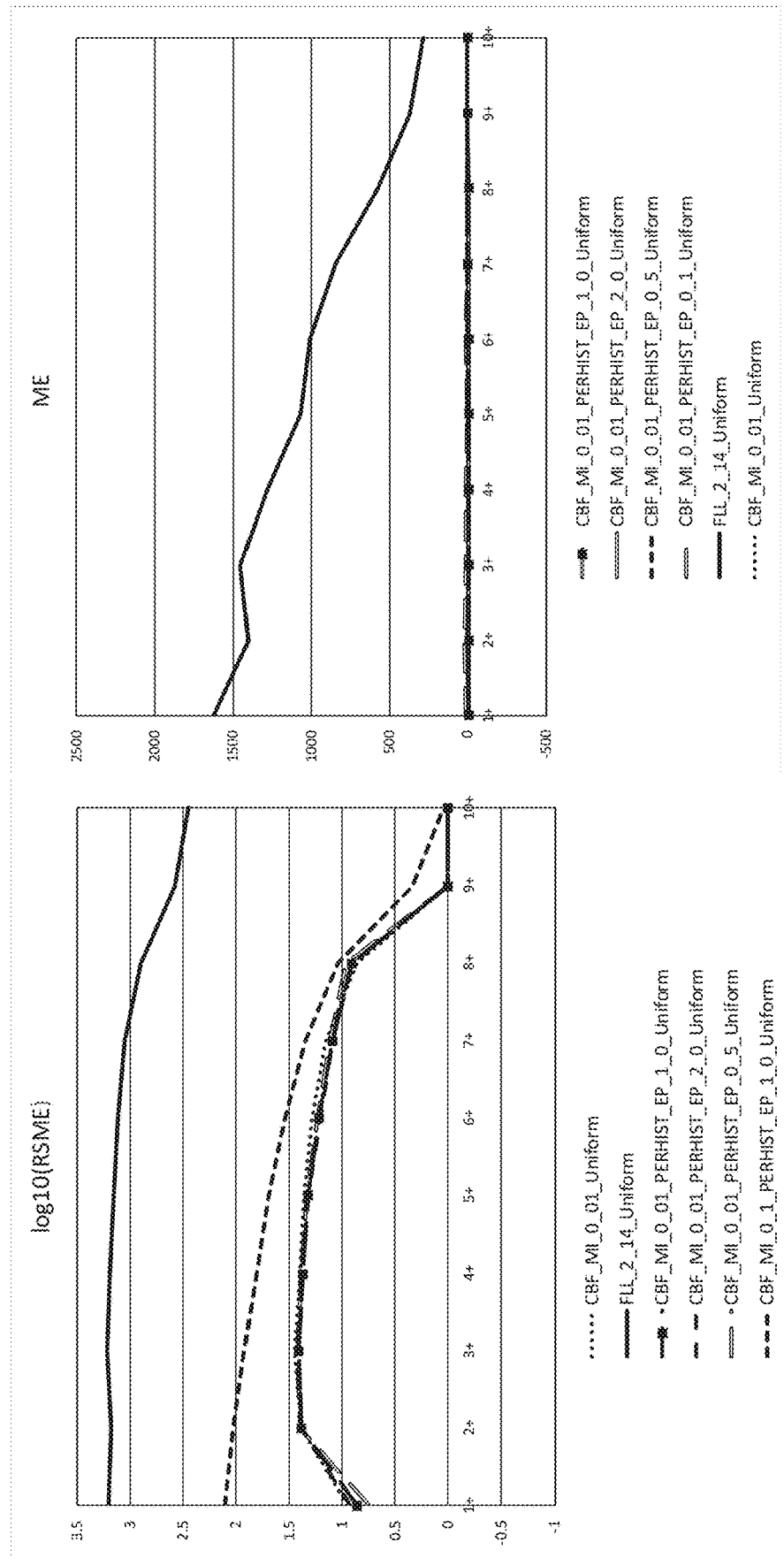

FIGS. 13A-B shows the estimates given for epsilon values of 0.1, 0.5, 1, and 2. These correspond to two-side geometric distribution parameters of 0.0142, 0.0689, 0.1331, and 0.2485 respectively. Adding noise to the histogram has relatively no impact for modest values of epsilon and even with epsilon equal to 0.1 the measurement is reasonable.

Figure 14A:
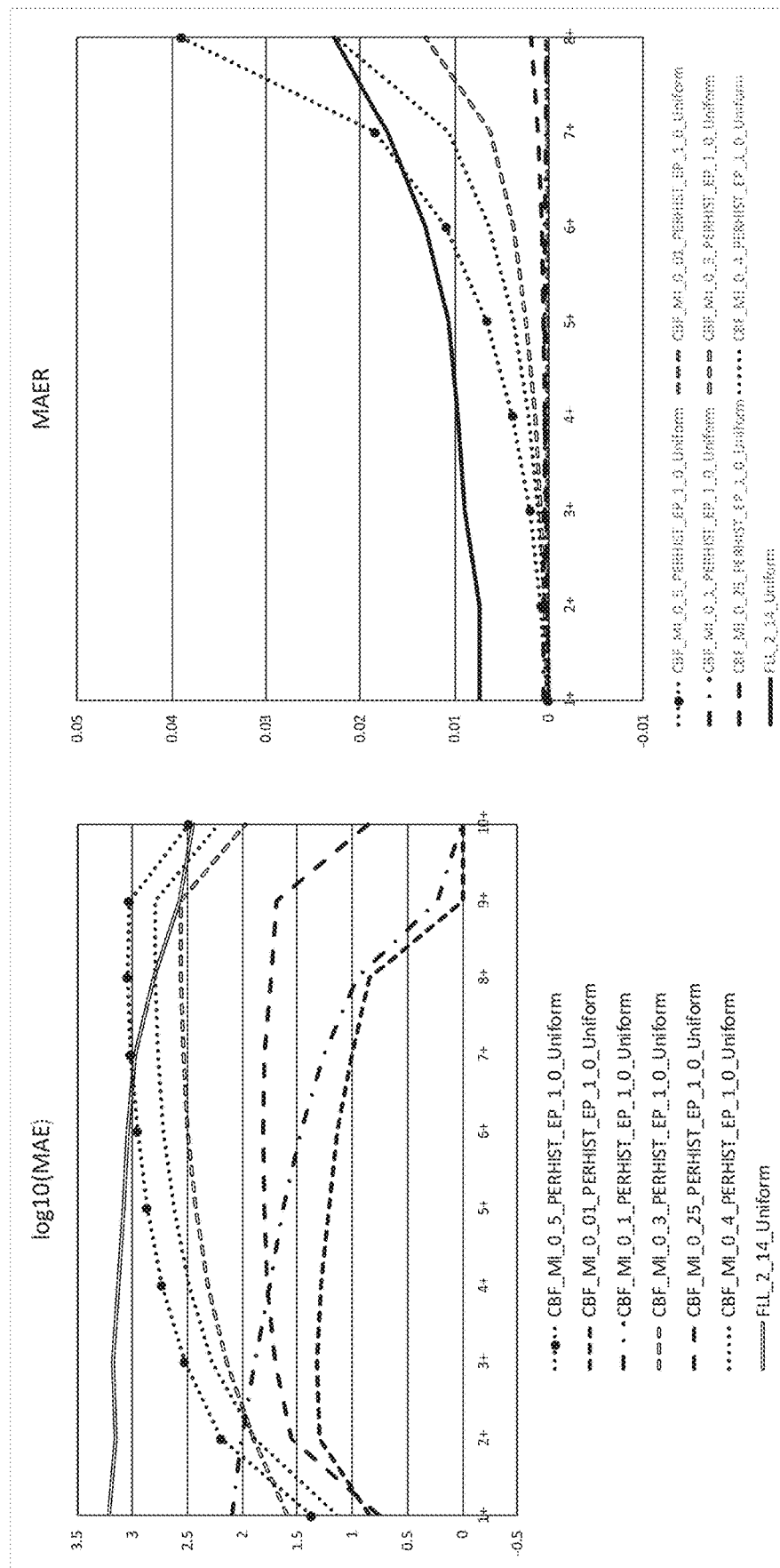
FIGS. 14A and 14B depict example data graphs illustrating the comparison of various experimental parameters of the system and their impact on resulting computations.
Figure 14B:
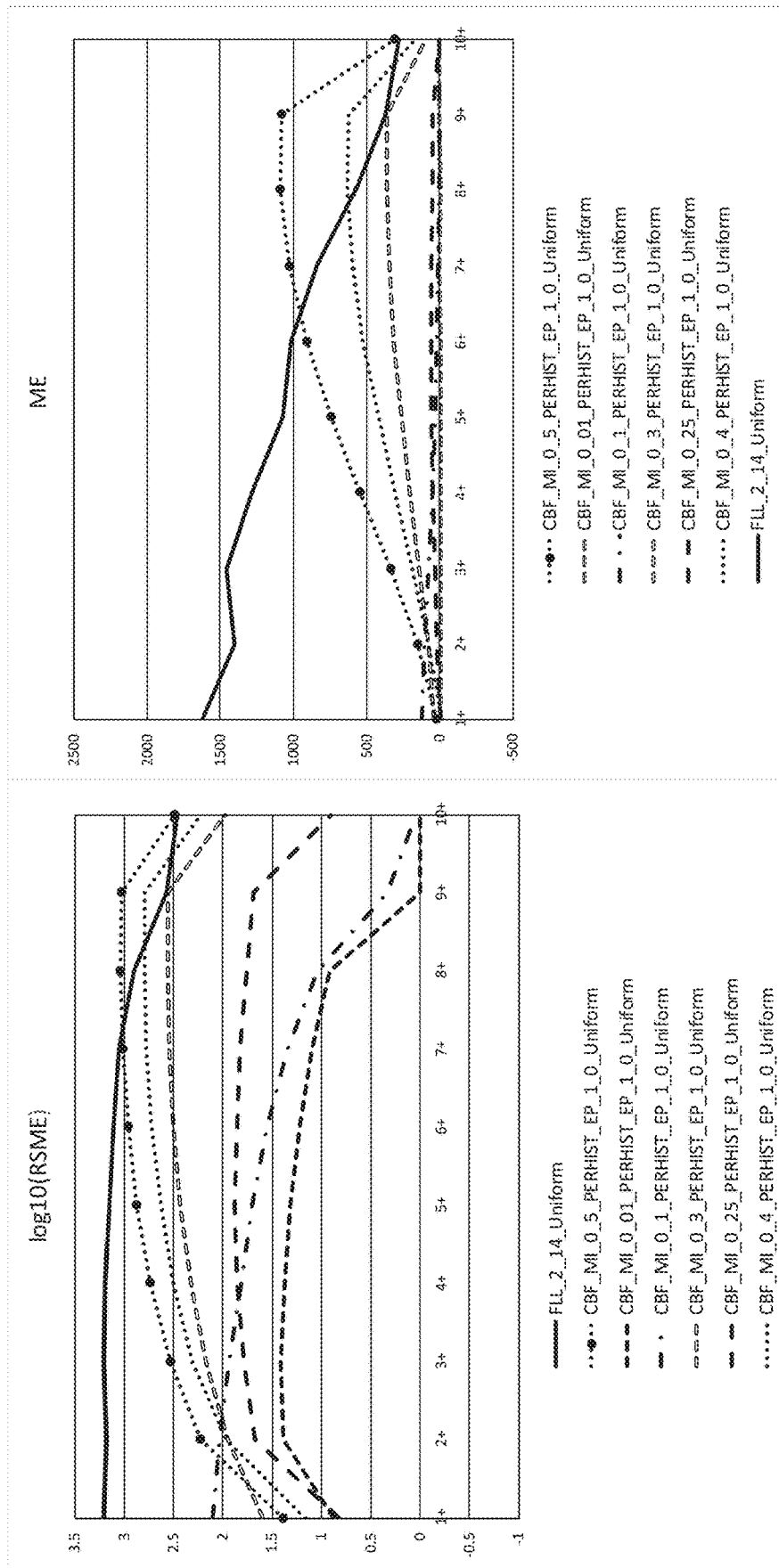

Finally, FIGS. 14A-B the accuracy of several parameterizations of the MICBF for an epsilon of 1. Here, even with differential privacy, CBF_MI_0_4 continues to perform about as well as the FLL at higher frequencies.

Figure 15:
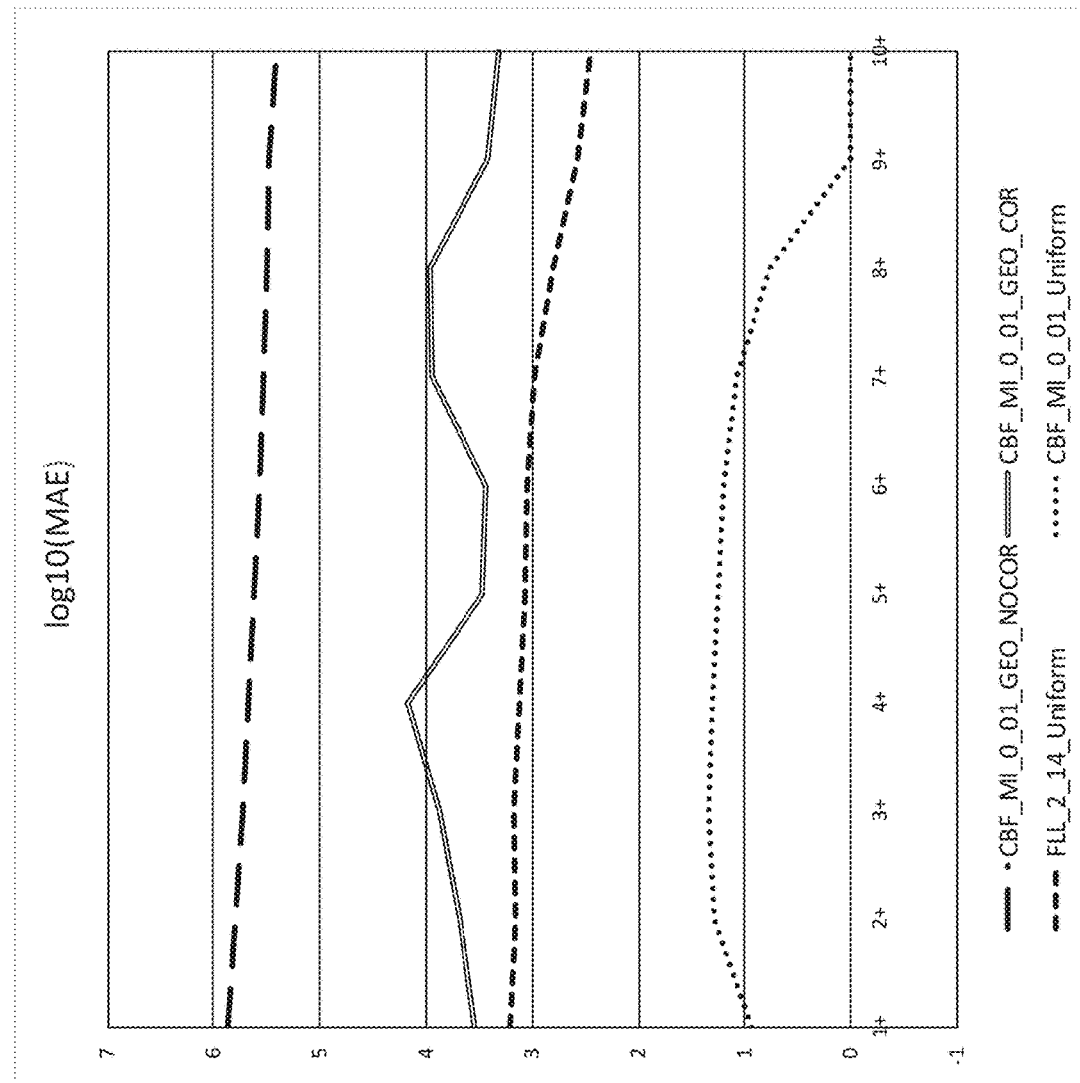
FIG. 15 depicts example data graphs illustrating the comparison of various experimental parameters of the system and their impact on resulting computations including the addition of noise.
Figure 16A:
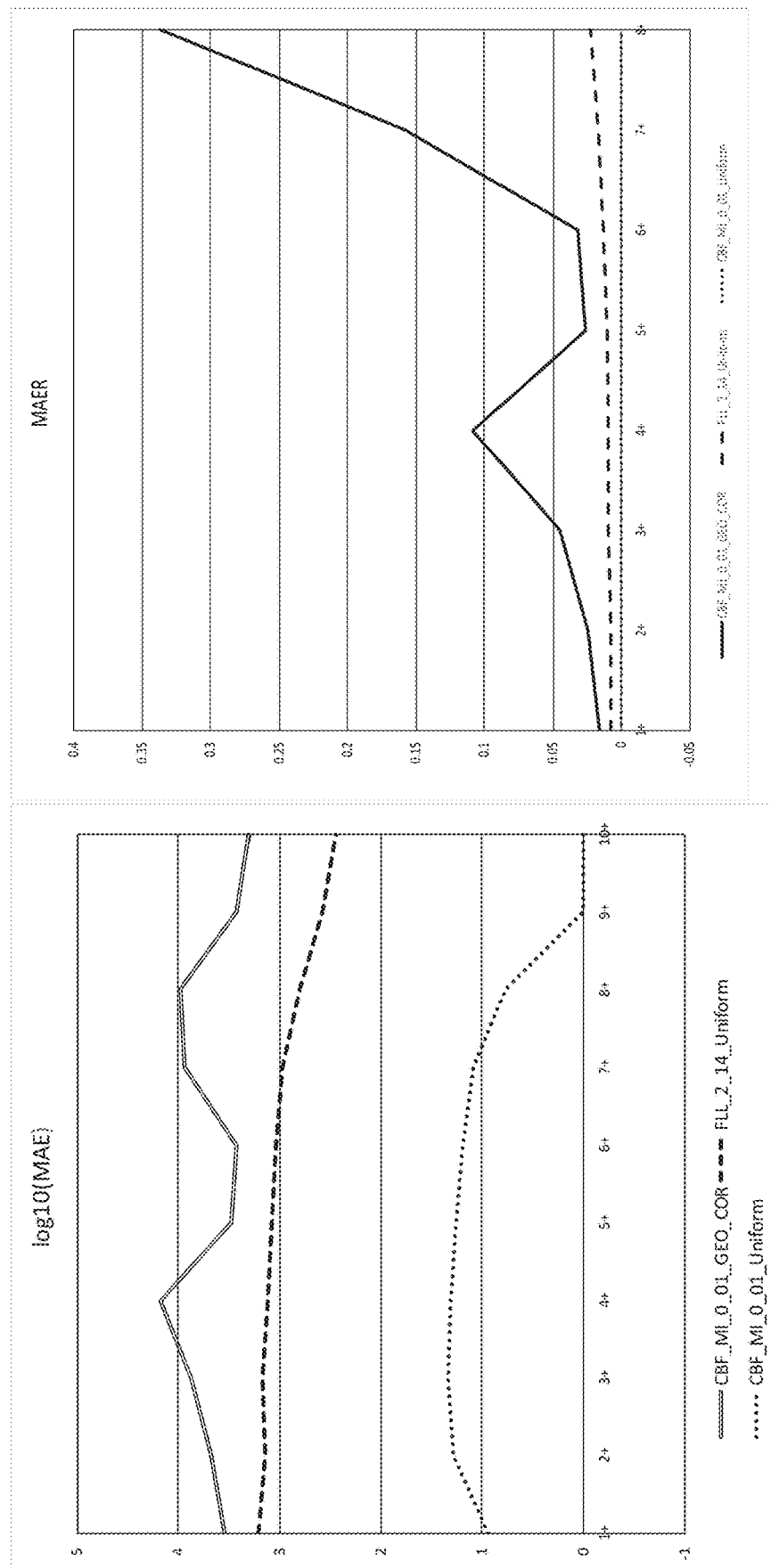
FIGS. 16A and 16B depict example data graphs illustrating the comparison of various experimental parameters of the system and their impact on resulting computations including the addition of noise values to the data.
Figure 16B:
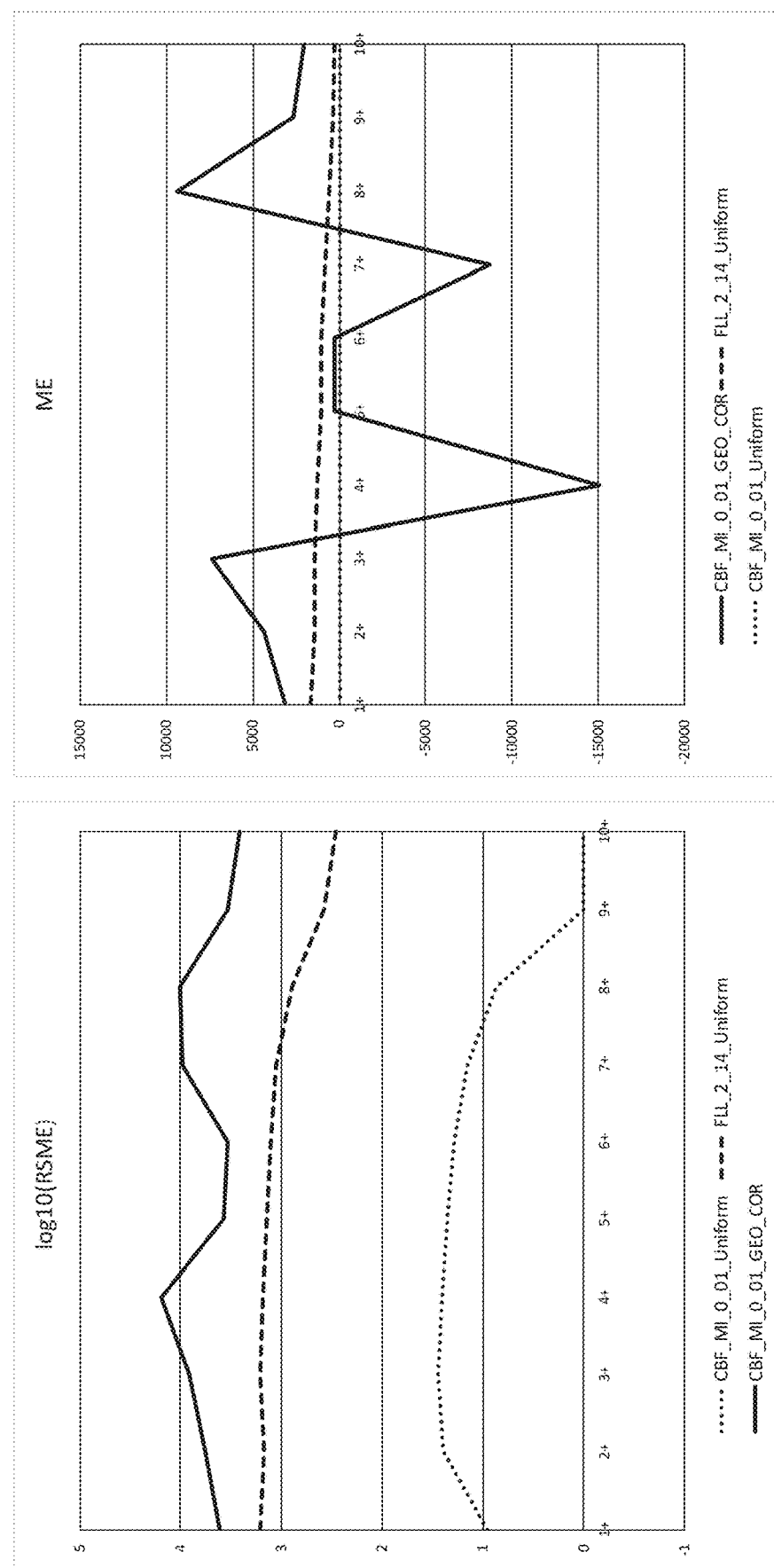
Figure 17A:
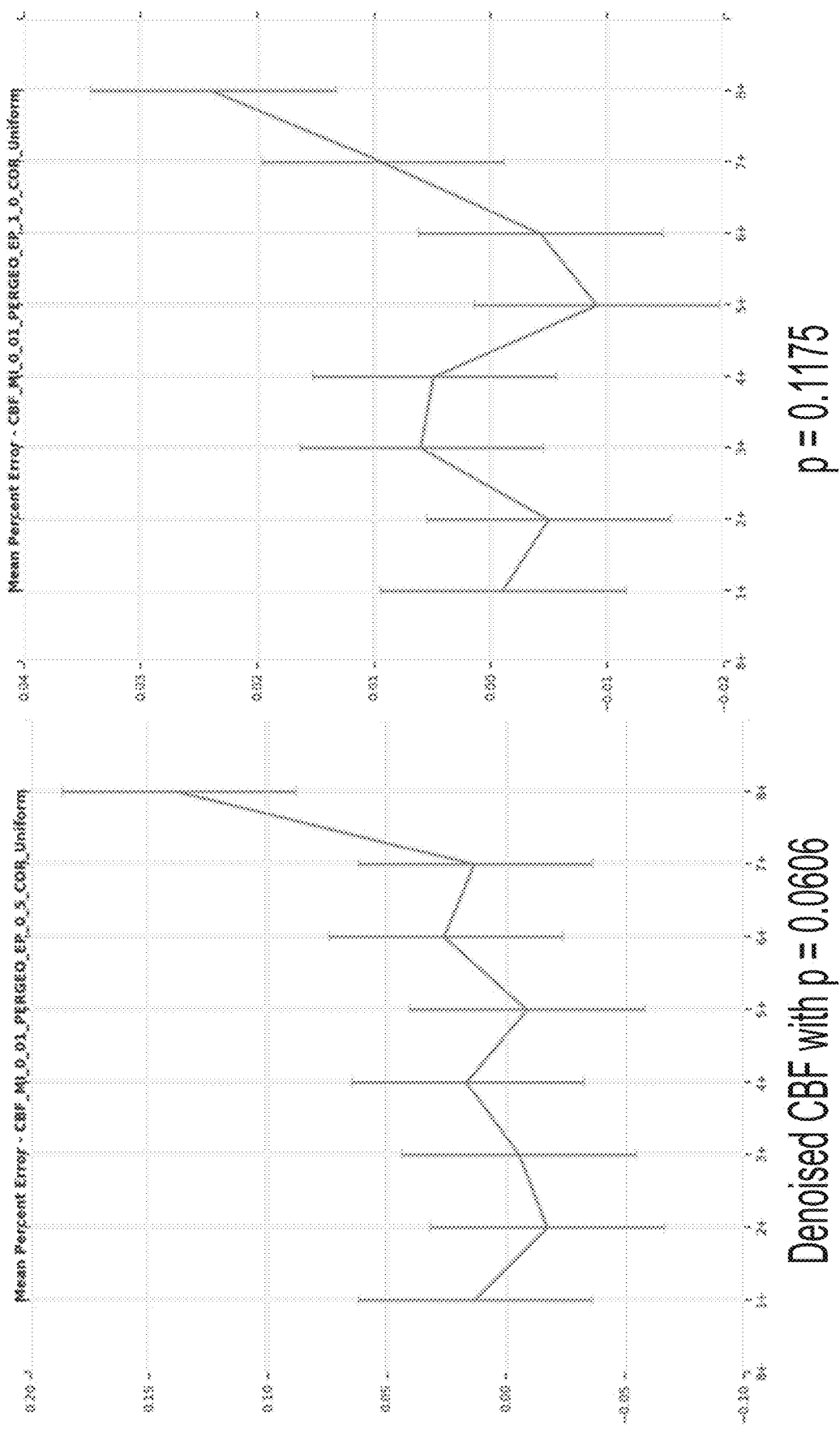
FIGS. 17A and 17B depict example data graphs illustrating various standard error values of counting bloom filter implementations implementing noise in an alternative configuration, as described herein.
Figure 17B:
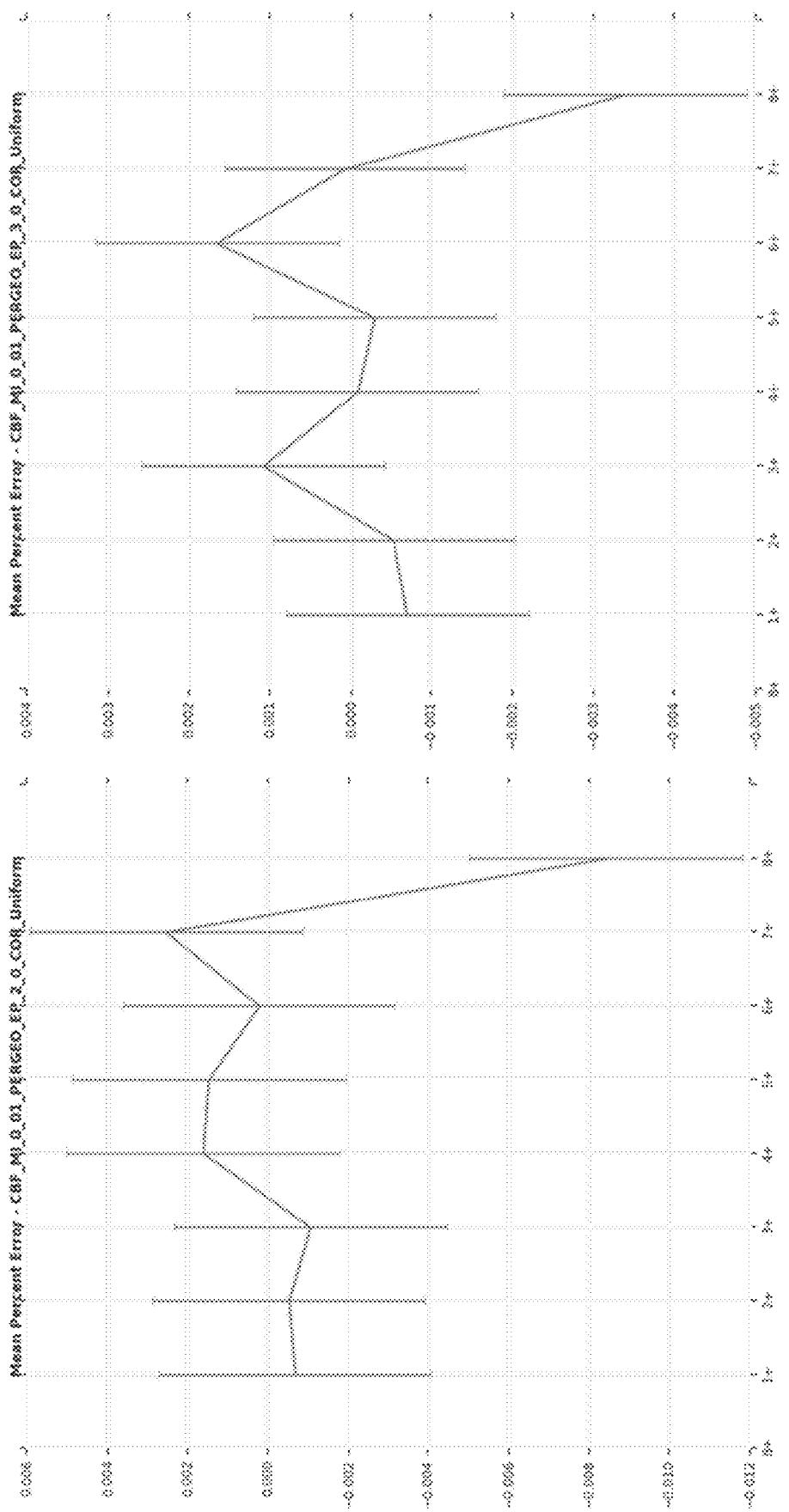

FIG. 15 shows the log 10 of the MAE for CBF_MI_0_01 without any noise added (Uniform), with noise added and uncorrected (GEO_NOCOR), and with noise after correction (GEO_COR). An epsilon of 1 is used and the sensitivity of the query is set to 8, which means a two-sided geometric distribution with parameter 0.1175 was used. For reference FLL_2_14 is also shown. The CBF with geometric noise prior to correction is unusable, however even the de-noised version exhibits up to an order of magnitude more error than the FLL. FIGS. 16A-B show the full set of charts but removes GEO_NOCOR. One observation that comes from inspecting the plot of mean error is that the estimates fluctuate between over and under estimation as the frequency changes.

The observation leads to another question about the variance of the estimation under the denoised regime, which was investigated by taking a single CBF and applying 100 different noise vectors to it. This was done for a query with a sensitivity of 8 and four different values of epsilon (0.5, 1, 2, and 3), however what is important is the parameter for the geometric distribution that these values imply, which is listed in FIGS. 17A-B. Observe that for p=0.06, the standard deviation of the estimate varies by about 5% around the mean. Furthermore, given that the sensitivity of the query is likely to be much higher than eight, p=0.06 is probably the maximum value we would expect to see for the noise distribution.

B. Cascading Legions Frequency and Cardinality Estimation

The implementations, techniques, systems, methods, or processes described in this section can be performed, executed, or otherwise carried out by any of the computer systems described in Section A above or any computer system described in this section.

Identifier servers can be associated with sets of client devices, for example by maintaining a client identifier that is associated with the respective client device. Each client identifier can include attribute information that describes the association between each identifier server and client device. Attribute information can include information about the relationship between the client device and the identifier server (e.g., web-browsing history, interaction data, association time, network analysis data, etc.), and can include protected or otherwise private information received from the respective client device. Different identifier servers may maintain different attribute data and different client identifiers that correspond to the same respective client devices. Typically, to determine whether there is duplicate attribute data between each identifier server, the identifier servers may share the attribute data, which can include protected or private information, to a centralized server to de-duplicate any client attribute information.

However, the transmission of all client attribute data poses issues to scalability. As the number of client identifier servers increases, the amount of client device attribute data transmitted via the network typically increases as well. Because the attribute data can be detailed and relatively large for each client device, transmitting such information at scale can exhaust network bandwidth and computational resources. Further, it would be beneficial for a system to not only compute a total number of user identifiers, but also compute the number of client devices that satisfy a particular attribute data criteria, such as the frequency of a particular attribute, without transmitting protected or private attribute information over the network. In addition, implementations of encrypted probabilistic data structures used to solve these issues suffer from sketch sizes that are impractically large (e.g., on the order of gigabytes).

To address the foregoing issues, aspects of the systems and methods of this technical solution can utilize a cascading legions scheme. The probabilistic data structure described herein can grow logarithmically in size based on the number of members in the multiset of client device identifiers. A publisher computing device can compute a hash of its as associated set of client devices and their frequency of activity (e.g., frequency of interaction with a content item, etc.) to generate a set if hashed device identifiers. The publisher can generate a cascading legions data structure that includes a matrix of bit values. Each row of the matrix can correspond to the number of least significant zeroes in each hashed data record. Each column of the matrix can correspond to a modulus value of each hashed data record.

The publisher computing device can populate the cascading legions matrix by determining the number of least significant zeroes in a data record. For example, the first row in the matrix can correspond to a single least significant zero (e.g., 1111 1110), the second row in the matrix can correspond to two least significant zeroes (e.g., 1111 1100), and so on. Each device identifier can be hashed using a hash function that produces a uniformly distributed output. Accordingly, the probability p of any hashed identifier corresponding to a row in the matrix can be equal to $2-k$, where k is the index of the matrix. For example, any given hashed identifier can have a 50% chance (e.g. p=0.5) of populating the first row, a 25% chance (e.g. p=0.25) of populating the second row of the matrix, and so on. If the publisher computing device determines that a hashed identifier corresponds to a row of the matrix, the publisher can perform a modulus operation on the hashed data record to select a position of that row, and set the bit at that position to one. The publisher computing device can perform this operation for all identifiers associated with the publisher. After the publisher computing device populates the matrix with all the identifiers, the publisher computing device can randomly flip the bits of each row of the matrix with probability p, thereby making the sketch differentially private.

Techniques implementing cascading legions data structures can address the challenges of HyperLogLog. As described herein above (e.g., in Section A, and throughout, etc.) with respect to counting bloom filters, cascading legions data structures can be generated by one or more identifier servers (e.g., the data processing systems 105A-N, etc.) sketches can be merged in a privacy preserving way via a combination of secure multi-party computation (e.g., based on homomorphic encryption, etc.) and adding differential privacy noise.

Using an approach based on Counting Bloom Filters (CBF), described herein above in Section A, can provide for privacy-safe reach and frequency deduplication across multiple publishers. Such solutions can implement an encryption scheme with multiplication homomorphism, which can improve the computational performance of distributed verification techniques. In such approaches, the size of the sketch can store the audience of size close to that of the total internet population, or other populations of various magnitudes. Such approaches can allow each publisher to upload datasets of a few gigabytes for each request, or some form of feedback loop, where the system can start with a small sketch and subsequently request a larger one if the audience turns out large, or based on other aspects of the method.

Approaches based on HyperLogLog (HLL) can implement min/max operations which may utilize more computationally expensive encryption. Maintaining the differential privacy protection of user identifiers placed in the sketch in HLL implementations also appears to be a standing challenge.

Approaches implementing the Cascading Legions Cardinality Estimator (CLCE) techniques described herein can combine the ideas of Counting Bloom Filters (e.g., described herein above in Section A, etc.) and HyperLogLog, and address the at least the foregoing issues. Accordingly, the CLCE implementations detailed herein present an improvement to cardinality determination algorithms across multiple sets of data without compromising the differential privacy of device identifiers. Unlike other implementations and techniques, the size of a cascading legions sketch can grow logarithmically with the size of the number of identifiers associated with a particular identifier server (e.g., a data processing system 105, etc.). No min/max operations are needed to implement such techniques, so a computationally inexpensive encryption scheme can be used for CLCE. The structure of the sketch is similar to counting bloom filter approaches described herein above in Section A, so multi-party computation (MPC) developed for CBF (e.g., described herein above in Section A) can be applied to CLCE sketches to calculate the frequency and cardinality of sets of device identifiers and target attributes.

At the same time, the cardinality estimate obtained by CLCE can be unbiased, and the union operation is commutative, which can provide high quality of results when compared to other implementations. A CLCE Sketch can include at least two parameters: a number of legions l and number of positions in the legion n. The sketch can be a two dimensional n×l array of bits. In some implementations, the sketch can be a two dimensional n×l array of counter registers, or another type of variable or data type that may be stored in one or more data structures in computer memory (e.g., the memory of the data processing system 105 etc.). An empty sketch can be initialized to an initialization value (e.g., zero).

An example representation of the estimator is included below in the following pseudocode:

```
class CascadingLegions:
    def __init__(self, l, n):
        self.l = l # number of legions
        self.n = n # number of positions in a legion
        self.legions = new array l by n filled with zeros
    def Add(self, element):
        binary_fingerprint = binary fingerprint of element
        legion = number of least significant zeros in binary_fingerprint
        # Elements that belong beyond the last legion are placed into the last
        # legion.
        if legion >= self.l:
            legion = self.l - 1
        # Position uses the bits of binary_fingerprint that
        # remain after removing trailing 0s and the 1.
        position = (binary_fingerprint // 2 ** (legion + 1)) % self.n
        self.legions[legion, position] = 1
    @staticmethod
    def ExpectedBits(num_elements):
        # It is easy to see that the following is the formula for expected number of
        # bits activated after num_elements elements were added.
        return sum(
            1 - exp(num_elements / (2 ** i * self.n)) * self.n
            for i in range(1, self.l)) + (
                1 - exp(num_elements / (2 ** (self.l - 1) * self.n)) * self.n
    def EstimateCardinality(self):
        b = count bits in self.legions
        return average num_elements for which int(ExpectedBits) is equal to b
    def Merge(self, other_sketch):
        self.legions = elementwise OR of self.legions and other_sketch.legions.
```

Although the above representation of the estimator may indicate that the functions of the estimator (e.g., construction of the cascading legions sketch, adding elements to the sketch, determining expected number of bits based on legion, estimating the cardinality of a set based on the sketch, and the merging of other sketches, etc.) take place on a single computing device as a part of a single class, it should be understood that the above pseudo-code is constructed in this manner purely for example algorithmic representation, and should not be construed as describing the construction of any system performing such techniques. It should be understood that any computing device described herein can perform any of the functionalities described above, and such techniques can be distributed across one or more computing devices (e.g., the data processing systems 105A-N, the worker computing devices 405A-N, the aggregator computing device 410, etc.). Nor should the above pseudo-code be construed as limiting in any respect to the systems and methods described herein, as it should be understood that the above representation is purely for example purposes, and may only describe one or more aspects of the implementations described herein.

A cascading legions sketch with parameters (l, n) can estimate the cardinality of sets of size up to $2^l$ with relative error having standard deviation equal to (e.g., equal to, approximately equal to, etc.)

$$\frac{1}{l}$$

Figure 18:
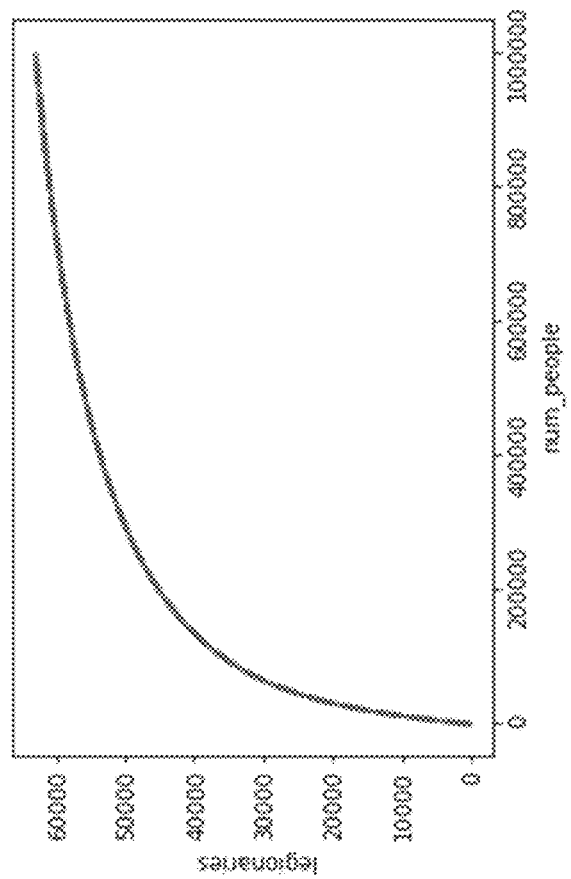
FIG. 18 depicts the relative error of user identifier estimation using a cascading legions cardinality estimator approach.
Figure 20:
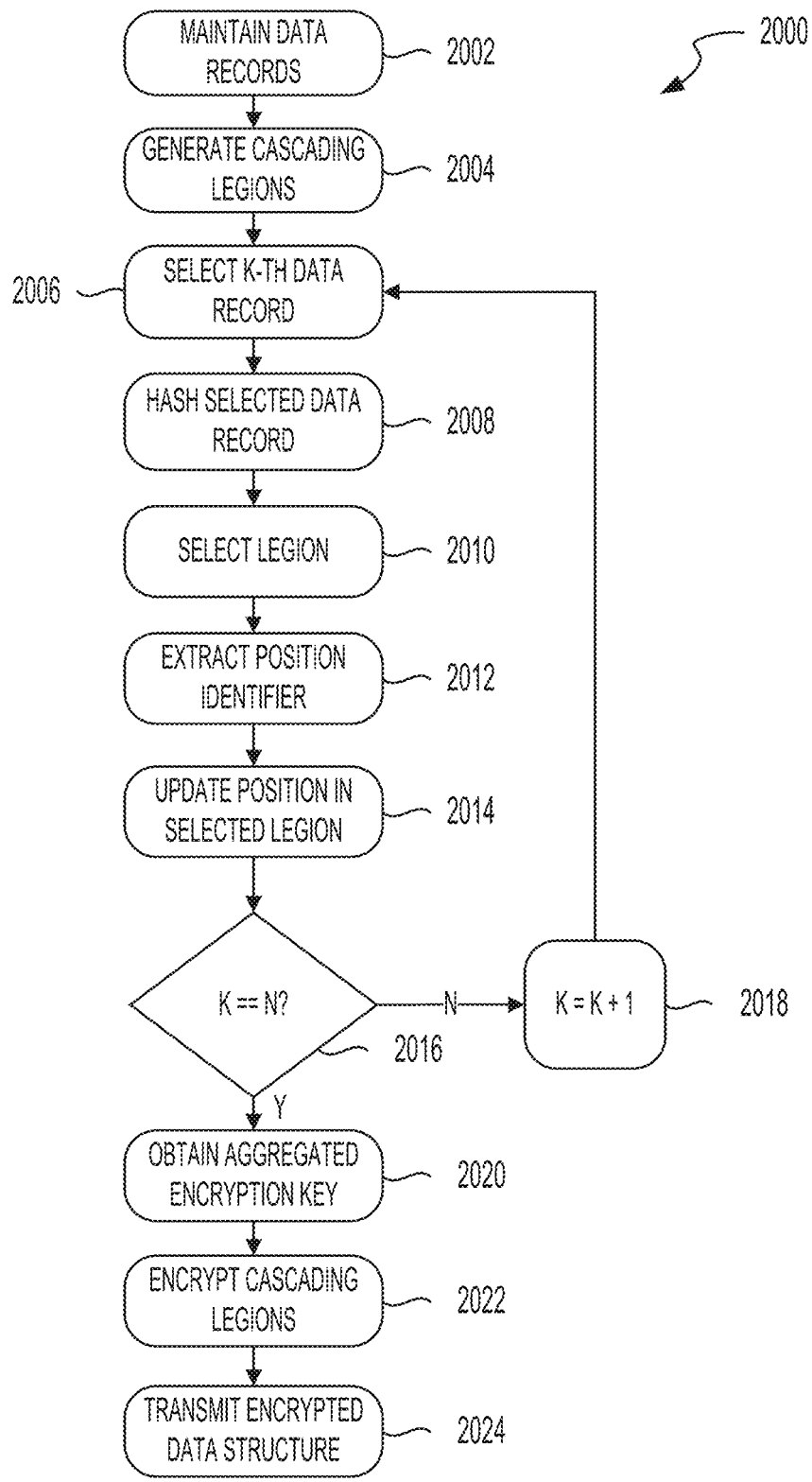
FIG. 20 depicts a flow chart illustrating an example method of generating an encrypted vector representing one or more data records.

Referring now to the graph illustrated in FIG. 18, depicted is a theoretically estimated number of bits that are occupied by device identifiers added to the sketch, along with 10 simulations. CLCE parameters of n=10K, l=7 are used. The data represented in FIG. 18 should be considered as purely example data, and implementations of the techniques described herein can produce different results. Accordingly, it should be understood that the data is purely example data, and should not be considered as limiting in any respect.

The lines in FIG. 18 may be visually indistinguishable. In FIG. 18, the relative error of device identifier estimation from the number of legionaries stays under 2%. The error reaches 4% for small audiences because for simplicity we drop user identifiers that fall beyond the last legion. In some implementations, the user identifiers that fall beyond that last legion are not dropped.

Figure 19:
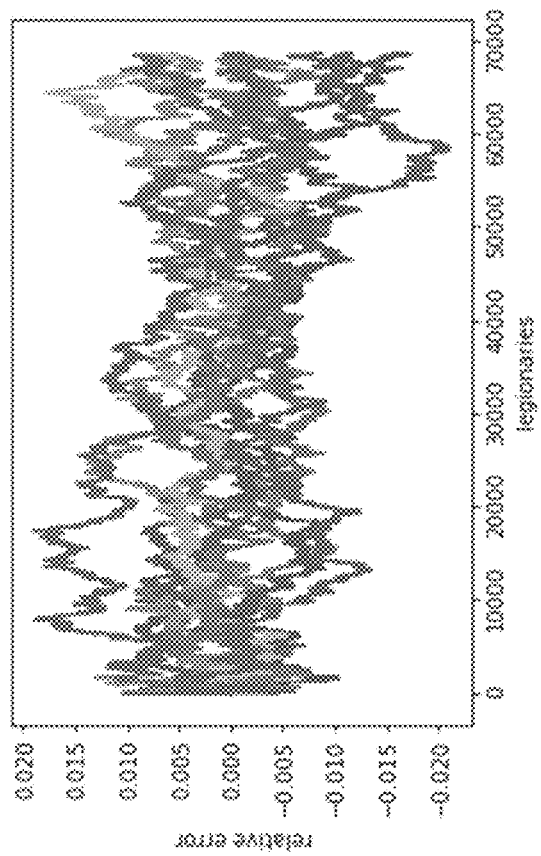
FIG. 19 depicts a graph illustrating various experiments employed using a cascading legion cardinality estimator approach.

FIG. 19 depicts example data from a sketch with 32 legions and 10 K positions can be sufficient for accurately measuring arbitrary sets of modern device identifiers. This sketch can contain 320 kilobits, but may include a different number of bits, legions, or legion positions with varying parameters.

To perform cascading legions cardinality or frequency estimation, the system (e.g., the system 100, the systems 400A-C, any combination thereof, etc.) can perform any combination of the following process. First, the system can include a large number (e.g., greater than 1, 10, 100, 1000, or 10000, etc.) of publisher computing devices (e.g., data processing systems 105A-N, other computing devices described herein, identifier servers, etc.) that can generate sketches (e.g., cascading legions sketches as described herein, other data structures or sketches described herein, etc.) and a small number of workers (e.g., worker computing devices 405A-N, other computing devices described herein, etc.) to execute a secure protocol for combining sketches. The secure protocol for combining sketches can be the MPC protocol described herein above in Section A, using the cascading legions sketches described in this section. Next, the system can encrypt sketches with the ElGamal cryptosystem, and as with the CBF design described above in Section A, to decrypt well-known values, the system can use multiplicative homomorphism (e.g., using ElGamal encryption, etc.) to achieve addition by observing that exponents are additive under multiplication by the same base. For example, 2^5*2^5=2^10. Third, recall that distinct ElGamal public keys can be combined and that decryption (or partial decryption, if only some private keys are used, etc.) can apply each private key whose public key was part of the combination. Each worker can generate a key pair, and the combined public key can be used by publisher computing devices (e.g., the data processing systems 105A-N, other computing devices described herein, identifier servers, etc.) to encrypt their sketches.

Each of the worker computing devices (e.g., the worker computing devices 405A-N, the aggregator computing device 410, etc.) can exchange and combine public keys as described herein to generate an aggregated public key. Once an aggregated public key (e.g., the combined ElGamal or homomorphic addition encryption scheme keys, etc.) is generated, the protocol can proceed as follows. Each publisher computing device can encrypt their sketch and provide it to at least one worker computing device (e.g. worker computing device. 405A, the aggregator computing device 410, etc.), which may sometimes be referred to as the first worker computing device.

The first worker computing device can sum each sketch position-wise (e.g., bucket-wise, combining each counter register, variable, or data entry with like index values or positions, or each position of each respective legion, etc.) to generate a combined sketch. The combined sketch can be the same dimensions as, or be constructed to accommodate the dimensions of, each of the sketches received from each of the identifier servers (e.g., the data processing systems 105A-N, sometimes referred to as the publisher computing devices, etc.) In some implementations, if the cascading legions sketch is a bit matrix data structure, combing the sketches can include performing a bitwise-OR operation across all of the sketches to be combined. In some implementations, if the cascading legions sketch is a value matrix data structure (e.g., a matrix of another type of variable, value, or counter register, etc.), the first worker can perform another type of combination operation (e.g., addition, multiplication, homomorphic addition, etc.) across the sketches to be combined, as described herein.

The worker computing devices (e.g., the worker computing devices 405A-N, the aggregator computing device 410, etc.) of the system (e.g., system 405A-C) can shuffle the combined sketch while applying a layer of deterministic encryption and removing a layer of non-deterministic encryption, as described herein above with respect to the MPC protocol described in section A. For example, the first worker computing device can shuffles the bits (or other type of data in the matrix, etc.) across positions and legions, and then passes the result to second worker computing device. Prior to shuffling the encrypted and combined sketch, each worker computing device can partially decrypt the sketch using the private decryption key that corresponds to that workers contribution to the aggregated encryption key (e.g., the aggregated ElGamal encryption key created by the worker computing devices, etc.). After partially decrypting the sketch using the private decryption key, the worker computing device currently processing the sketch can apply a deterministic encryption scheme to the sketch. After applying the layer of deterministic encryption, the worker computing device can permute, or shuffle, the positions in the encrypted data structure. If the data structure is a cascading legions data structure, the worker computing device can permute the n positions in each of the l legions. In some implementations, the worker computing device can permute the order of the l legions.

This process can continue for each of the worker computing devices 405. For example, the second worker computing device (e.g. worker 405B, etc.) can removes its layer of non-deterministic encryption and adds a layer of deterministic encryption, and optionally permute. The second worker can then transmit the processed sketch result to a third worker computing device (e.g., worker 405C, etc.). The process can continue until each of the worker computing devices have removed the layer of non-deterministic encryption (e.g., using the private decryption key generated with the public encryption key used to create the aggregated encryption key), and applied its layer of deterministic encryption, and optionally permuted the sketch.

The workers (e.g., the workers 405A-N, the aggregator computing device 410, etc.) can be arranged in a ring configuration. In such configurations, the first worker computing device (e.g., the worker 405A, or the aggregator computing device 410, etc.) can process the encrypted sketch and transmit the output to the second worker computing device, the second worker can transmit the output to the third worker computing device, and so on. Once the final worker computing device (e.g., the worker 405N, where N is the number of worker computing devices, etc.) has processed the sketch, it can transmit the output to the first worker computing device (e.g. the worker computing device 405A, the aggregator computing device 410, etc.). The first worker computing device can then remove its non-deterministic encryption, and add a layer of deterministic encryption, if it has not done so already in the first step of the process. In some implementations, the first worker computing device can combine each of the sketches and transmit the combined encrypted sketch to the second worker computing device, and remove its layer of non-deterministic encryption and apply its layer of deterministic encryption as the final processing step, after the sketch has been processed by each of the worker computing devices in the ring configuration.

Next the value 0 is deterministically encrypted by each worker, thus revealing the number of zeroes in the sketch. From here an estimate of the cardinality can be computed.

In some implementations, the number of zeroes can be counted without the deterministic encryption. Since the message is in the exponent, the system can rely on the fact that an encryption of 0 will just be the identity element of the group. So instead of deterministic encryption, the system can choose a random exponent for every ciphertext (instead of using the same exponent for all, which is what the deterministic encryption can be). The '0' elements can remain 0, and the rest can be randomized. This can improve the overall privacy of the system, as it reveals the number of 0s and nothing more. The system can determine the 'reference legion' from the total cardinality, and shuffle the legions form the golden upward.

Notice that for estimation the system can reveal a partial histogram of bucket values. That is, the system can know the count of zeroes present and the count of all other values, can be assumed to be ones. Next, observe that for any user identifier that was added to the sketch its contribution to the histogram can increase the count of "ones" by at most one, where the contribution of any single identifier to the histogram could actually be zero due to hash collisions. Thus, the sensitivity of the query can be 1.

Adding noise, which can be drawn from a two-tailed geometric distribution, can be done in at least one of two ways. A simpler implementation can include unmasking the histogram to the workers and then to simply add the correct amount of noise to each histogram bucket before computing the estimation. This can cause the output of the computation differentially private, but the workers learn the true histogram values.

A more complex, but safer, implementation of adding noise can include distributing its generation across the workers. In such implementations, each worker can draw two Polya random variables $(X_i, Y_i)$, which represent respectively the number of zeroes and the number of ones to be added to the histogram by the ith worker. Note that Polya random variables, which are a special case of a negative binomial, can be constructed so as to sum to a two-tailed geometric random variable.

First, the workers can begin by agreeing on an arbitrary baseline of noise to be added to each bucket. Call this value B. Then, during the shuffle phase, each worker can add B–X zeroes to the sketch and B–Y ones to the sketch. Finally, the worker that aggregates the histogram can subtract the value B*W from each histogram bucket, where W is the number of workers. This then leaves us with the required noise distribution.

There are at least two options for the frequency histogram estimation, including probabilistic deconvolution and frequency histogram estimation.

At least one technique to estimate the frequency of a multiset using cascading legions is based on probabilistic deconvolution. Probabilistic deconvolution techniques can generate a frequency histogram based on the final decrypted, aggregated, and optionally shuffled cascading legions sketch generated by the worker computing devices (e.g., the worker computing devices 405A-N, the aggregator computing device 410, etc.). To estimate the frequency histogram, the self.legions (e.g., the legions data structure, etc.) can store frequency associated with the user identifier rather than just a bit of presence. In such implementations, the cascading legions data structure is not a matrix of bit values, but is instead generated to be a matrix of frequency values that are updated as described herein. When encrypted using the aggregated public key generated by the worker computing devices 405A-N, the frequency value of each position in each legion can turn into a power of some prime (e.g., each position in each legion is encrypted independently using the aggregated key, etc.). In some implementations, other encryption schemes are used, and each legion is encrypted independently using the aggregated public key. In some implementations, the entire cascading legions data structure is encrypted once using the aggregated public key, rather than position-wise or legions-wise.

The system can decrypt the legions left to right (e.g. in ascending or descending order of legion index, etc.) until we hit a reference legion (e.g. the first legion where less than half of positions are activated, etc.). For example, once the aggregated data structure has been processed by each of the worker computing devices (e.g., the worker computing devices 405, the aggregator computing device 410, etc.), the aggregator computing device can incrementally decrypt each legion in the cascading legions data structure. Once a legion is decrypted, the aggregator computing device can determine the number of positions that are populated in the legion. The aggregator computing device can determine the number of positions in the legion that are populated by iterating through each position in the decrypted legion, and determining whether the position value is equal to zero (or below a threshold value, or equal to another predetermined value, or satisfying some other non-population criteria, etc.). The aggregator computing device can determine that a particular legion is the reference legion if less than half of the positions in that legion are populated. If the aggregator computing device determines that a legion is not the reference legion, the aggregator computing device can decrypt the next legion in the cascading legions data structure. The next legion in the cascading legions data structure can be, for example, the legion that corresponds to the next greatest legion index, or some other metric that identifies the next legion (e.g., the next memory address, etc.).

From the reference legion onward there can be a small number of collisions. So the system can shuffle all the legions together and then decrypt. The frequencies are used as a sample to determine the resulting frequency histogram. Some adjustment can be done by finding most likelihood original histogram that resulted in observed histogram after collisions. This approach can include homomorphic encryption to filter out registers (e.g., positions, etc.) to which more than one user contributed and getting a clean sample of user frequencies.

Same key aggregation structure is a pair of an encrypted counter and a key (E(count), E(key)). Addition over the cascading legions data structure can be defined as:

$(E(\text{count1}), E(\text{key1})) + (E(\text{count2}), E(\text{key2})) = (E(\text{count1}+\text{count2}+R^*(\text{key1}-\text{key2})), E(\text{key1}+R^*(\text{key1}-\text{key2})))$.

Where R is a random number. This addition operator can be computed homomorphically.

This structure can behave as follows:

If key1=key2=key then $$(E(count1),E(key))+(E(count2),E(key))=(E(count1+count2),E(key)).$$

At least one other technique to estimate the frequency of a multiset using cascading legions is based on frequency histogram estimation. Frequency histogram estimation based techniques can estimate the frequency of a particular target criteria by generating a frequency histogram for further estimation and processing. For each register (e.g., legion position, etc.) the system can add a same-key aggregator. Publisher computing devices (e.g., identifier servers, data processing systems 105A-N, etc.) can use a hash of the virtual id that initiates the register as the key. If the publisher computing device doesn't have a device identifier they add a special empty token. Register booleans get combined first and non-combined impression aggregators can be shuffled along with them. For registers that are non-zero the empty tokens get decrypted and discarded. The remaining impression aggregators can be combined. Then counters are decrypted.

The system can apply differential privacy protection to each of the cascading legions data structures to obscure or otherwise protect the privacy of the device identifiers and attributes that contributed to the generation of each cascading legions data structure. For example, each publisher computing device (e.g., identifier server, data processing system 105A-N, etc.) can protect apply differentially private noise to the cascading legions sketch by randomly flipping bits, similarly do how it's done with bloom filters described herein above in Section A. In some implementations, if each position in the sketch is a counter register for frequency estimation, the differential privacy can be implemented by randomly adding, updating, or otherwise incrementing random positions in the legions. For example, such noise may be added by incrementing by predetermined amounts, such as by one, two, etc., or by a random amount within certain thresholds (e.g., a random number between zero and 100, or any other range, etc.).

The system can apply the noise by flipping each legion x position (e.g., or adding to counter register as described above, etc.) bit with probability p. For k sketches, and at some position you had combination of bits b, then this combination translates to combination of bits (b') with probability $p^{(k-a)}*(1-p)^a$, where a is the number of positions i for which $b\_i=b'\_i$. When applying this rationale to the counter register based frequency legions, the same analysis applies for positions that are or are not equal to zero (e.g., all positions equal to zero can be treated as binary zero for this analysis, and all positions not equal to zero can be treated as binary one for this analysis, etc.). Thus, the system can compute stochastic matrix of combination transitions and obtain noise correction matrix by inversion.

The system can estimate the cardinality or frequency based on the reference legion. Thus the system can treat the combined cascading legion sketch (e.g., after processing by the worker computing devices and the aggregator computing devices, etc.) as a collection of bloom filters, or counting bloom filters, and pick the one with the least noise. The system can use a heuristic for picking the reference legion: it can be selected as the first legion that is saturated by less than half of bits (after noise removal is applied), or in the case of counter registers, the first legion that has less than half of its positions populated. Each legion can be analyzed in the order of decreasing probability of population. For example, because each legion can be populated based on the Referring now to FIG. 5, depicted is a flow diagram of a method 2000 for generating a cascading legions data structure based on device identifier values and attribute data. The method 2000 can be performed, for example, by at least one data processing system (e.g., at least one data processing system 105, etc.), or any other computing device described herein. The data processing system can maintain data records (ACT 2002). The data processing system can generate an empty cascading legions data structure (ACT 2004). The data processing system can select the k-th data record (ACT 2006). The data processing system can hash the selected data record (ACT 2008). The data processing system can select a legion (ACT 2010). The data processing system can extract a position identifier (ACT 2012). The data processing system can the position in the selected register legion (ACT 2014). The data processing system can determine whether the counter register k is equal to the number of data records n (ACT 2016). The data processing system can increment the counter register k (ACT 2018). The data processing system can obtain an aggregated encryption key (ACT 2020). The data processing system can encrypt the vector counter registers (ACT 2022). The data processing system can transmit the encrypted vector (ACT 2024).

The data processing system can maintain data records (ACT 2002). The data records (e.g., the data records 122A-N) can include, for example, one or more device identifiers (e.g., the client identifiers 122A-N) and one or more attributes (e.g., the attributes 127A-N). The data records can be one or more data structures stored in a database (e.g., the database 115) communicatively coupled to the data processing system. Maintaining the data records can include storing the one or more data records in computer memory. In some implementations, the data processing system can maintain the data records in response to receiving one or more messages (e.g., requests, indications, data packets, etc.) at least one client device (e.g., at least one client device 120). The data processing system can extract at least one identifier from the message, along with any attributes present in the message, and generate a data record to include the identifier and the attributes. The data processing system can then maintain (e.g., store, load, or otherwise record) the data record in computer memory, such as a database, one or more data structures, or a non-volatile computer-readable medium. In some implementations, the data processing system can receive one or more data records from one or more client devices (e.g., the client devices 120A-N, etc.).

The data processing system can generate a cascading legions data structure (ACT 2004). To generate a cascading legions data structure, the data processing system can allocate one or more regions of memory to accommodate at least one bit array, at least one counter register array, or at least one counter register. The allocated at least one bit array, at least one counter register array, or at least one counter register can correspond to at least one coordinate of the cascading legions data structure (e.g., a position in a particular legion, etc.). By generating and allocating memory for one or more counter registers, the data processing can generate the vector comprising the counter registers. The data processing system can generate at least one legion, which can be an array of bits or an array of counter registers. The data processing system can assign each generated legion a legion id (e.g., the legion identifier 1 used above, etc.), and can assign each position (e.g., each bit, counter register, etc.) in each legion a position identifier. In some implementations, position identifiers can be the same between legions, but different among the same legions. For example, all positions in a particular legion can have different position identifiers, but similar positions in two different regions can have the same identifier. The data processing system can initialize each of the positions (e.g., bit value or counter register, etc.) of the cascading legions data structure to an initialization value, for example zero, or one. The data processing system can generate the cascading legions data structure, which can correspond to a matrix of counter registers or bit value, where each position in the matrix is sometimes referred to as a "bucket", or as "buckets". For example, the data processing system can receive an indication to generate a cascading legions data structure with l legions and n positions per bucket, or l×n buckets across l legions. The data processing system may access an internal configuration setting, provided by an external computing device that specifies the size of the cascading legions data structure by number of legions, buckets, bit positions, counter registers, or any other possible parameter described herein.

The data processing system can select the k-th data record (ACT 2006). To process and add each data record maintained in (ACT 2002) to the generated cascading legions data structure, the data processing system can iterate over each of the data records maintained by the data processing system. The data processing system can iteratively loop through each of the data records based on a counter register k. For example, each of the data records can be indexed in a data structure by an index value (e.g., index 0, index 1, index 2, etc.). To process a data record, the data processing system can select the data record which includes or is associated with the index value which is equal to, or approximately equal to, the counter register k. If it is the first iteration of the loop, the counter register k can be initialized to an initialization value (e.g., k=0, k=1, etc.) before selecting the k-th data record. Selecting the data record can include copying the data associated with the data record to a different region of computer memory in the data processing system, for example a working region of memory. Selecting the data record can include retrieving the data record from the database if the data record is located in the database, and copying the data associated with the sample into a different region of computer memory in the data processing system, for example a working region of memory.

The data processing system can hash the selected data record (ACT 2008). The data processing system can identify, and execute, a hash function for use in populating the cascading legions data structure. For example, each of the hashes identified in the list of hashes can provide a normal distribution or expectation of randomness based on input value. That is, for example, similar inputs to the hash function do not necessarily have similar outputs to the hash function. A hash function can be chosen as optimal hash function for cascading legions data structure. For example, the data processing system can choose an independent and uniformly distributed hash function. Such a hash function can include, for example, murmur hashes, Fowler-Noll-Vo series hashes, or Jenkins hashes. SHA-1 hashes, SHA-2 hashes, or any other type of hash function as known in the art that can produce a uniformly distributed or substantially uniformly distributed output distribution, among others. The data processing can select or identify a hash functions, and apply the hash function to the selected data record to generate a hashed data record.

The data processing system can select a legion of the generated cascading legions data structure (ACT 2010). The cascading legions data structure can be generated to include a number of legions, each indexed by a corresponding index value. As the index value increases, the probability of a value updating a position in the corresponding legion can decrease. For example, consider a cascading legions data structure with l legions. Each of the l legions can be numbered by an index value, for example, 1, 2, 3, . . . , l. In some implementations, the index values of each legion can start and end on different numbers (e.g., first legion has index value of 0, and the last legion has an index value of l−1, etc.). Each hashed data record can update a position in a legion in the cascading legions data structure. To determine which legion to select to be updated based on the hashed data record, the data processing system can determine a number of zeros in certain positions in the hashed data record. For example, for a hashed data record equal to the value '0110 1010 0100', the data processing system can determine that the hashed data record has two consecutive least significant zeros. Based on this determination, the data processing system can select the second (e.g., the cascading legion with an index value of two, etc.) to update. This follows for three consecutive zeros, which would be placed in the legion with an index value of three, and four consecutive zeros, which would be placed in the legion with an index value of four, and so on. Accordingly, because the outputs of the hash function are uniformly distributed, there is a 50% chance of any hashed data record with one least significant zeros, a 25% chance of any hashed data record having two consecutive least significant zeros, a 12.5% chance of any hashed data record having three consecutive least significant zeros, and so on, each legion has is less and less likely to be populated by any given hashed data record. In some implementations, another series of bits are used to select a legion in a similar manner (e.g., consecutive most significant bits, or a series of consecutive or nonconsecutive bits throughout each hashed data record, etc.), as long as the same bit positions and consecutive value scheme are used for each hashed data record that is used to populate the cascading legions data structure.

The data processing system can extract a position identifier from the hashed data record (ACT 2012). The hashed data record can correspond to a position of the legion selected in ACT 2010. To identify the corresponding position in the selected legion, the data processing system can extract a register identifier from the hashed data record. The data processing system can extract the register identifier, for example, by performing a modulus operation on each hashed data identifier with the number of positions in the selected legion. In some implementations, the data processing system can perform a modulus operation on the bits of the hashed data record not used to select the legion. For example, if the hashed data record was equal to '0110 1010 0100', and the legion was selected by the number of consecutive zeroes starting at the least significant bit, the data processing system can perform the modulus operation on the remainder of the hashed data record, which in this example would be '0110 1010 01'. If the number of consecutive zero least significant bits was four (e.g., the hashed data record was equal to 1001 0011 0000'), the data processing system could use the bits of the hashed data record not used to select the legion to select the position in the legion (e.g., '1001 0011'). If the number of bits remaining after the bits used to select the legion are removed is less than the number of bits required to select a position, the data processing system can generate random (e.g., pseudo-random, uniformly distributed) bits up to the number required to select the position in the legion. For example, if there are sixteen positions in a legion, but only 2 bits remaining after the rest are extracted, the data processing system can randomly (e.g., pseudo-randomly, etc.) generate two more bits and concatenate them onto the 2 remaining bits. In this example, that would generate a bit string of 4 uniformly distributed bits, which can be used to select from the sixteen positions in the legion.

The data processing system can updated the selected position in the selected legion (ACT 2014). Updating the selected position can include, for example, adding one to the counter register corresponding to the position identifier in the selected legion. In some implementations, the data processing system can set a bit that corresponds to the position identifier in the selected legion. In some implementations, the amount added to the counter register can be a value that is other than one. For example, the data processing system can add other values to each counter register that may correspond to any values determined, generated, or calculated herein. In some implementations, the data processing system can subtract from the counter register for various reasons discussed herein. In some implementations, as an alternative to subtraction, the data processing system can add an amount (e.g., one, or some other value, etc.) to each of the other counter register buckets that are not currently selected by the data processing system. For example, the data processing system can increment the value by a certain number of accesses associated with a particular data record. If a device associated with a device identifier accesses a particular item of content a certain number of times, the data processing system can increment the position in the cascading legions data structure (e.g., or any other of the probabilistic data structures described herein, including in any other section, etc.), by the number of times the device corresponding to the hashed data record accessed the particular item of content. In some implementations, the amount of times this particular item of content was accessed can be stored in the respective data record.

The data processing system can determine whether the counter register k is equal to the number of data records n (ACT 2016). To determine whether the data processing system has updated the cascading legions data structure using each data record, the data processing system can compare the counter register (e.g., k) used to select each data record to the total number of data records n. If the counter register k is not equal to (e.g., less than) the total number of data records n, the data processing system can execute (ACT 2018). If the counter register k is equal to (e.g., equal to or greater than) the total number of data records n, the data processing system can execute (ACT 2020).

The data processing system can increment the counter register k (ACT 2018). In some implementations, the data processing system can add one to the register k to indicate the next unprocessed data record in the set of maintained data records (e.g., the data records maintained by the data processing system in ACT 2002, etc.). In some implementations, the data processing system can set the counter register k to a memory address value (e.g., location in computer memory) of the next unprocessed data record. In some implementations, the memory address value of the next unprocessed data record can be included in the data structure at the location of the current (e.g., selected) data record. After incrementing the value of the counter register k, the data processing system can execute (ACT 2006).

The data processing system can obtain an aggregated encryption key (ACT 2020). For example, the data processing system can receive an aggregated public key that is generated by one or more worker computing devices (e.g., the worker computing devices 405A-N, the aggregator computing device 410, etc.). In some implementations, the data processing system can receive one or more public keys from other computing devices (e.g., other data processing systems, worker computing devices, etc.) and aggregate the public keys into an aggregated public encryption key. In some implementations, the worker computing devices can exchange and aggregate the public keys and generate the aggregated public key, and transmit it to each data processing system that has generated a cascading legions data structure. The aggregated key can, in some implementations, be used to partially or fully encrypt one or more positions, legions, or cascading legions data structures described herein. The aggregated key can, in some implementations, simply be a single public key that is distributed to the data processing system to encrypt the cascading legions data structure maintained by the data processing system. In some implementations, the aggregated encryption key can comprise one or more ElGamal encryption keys, or any other type of homomorphic encryption scheme. In some implementations, the aggregated encryption key can be any kind of public encryption key that supports a threshold decryption scheme.

The data processing system can encrypt the cascading legions data structure (ACT 2022). To ensure the differential privacy of the cascading legions data structure, the data processing system can employ one or more encryption techniques to encrypt the cascading legions data structure generated and maintained by the data processing system. For example, the data processing system can use the aggregated public key obtained in (ACT 2020) using an encryption scheme (e.g., ElGamal encryption, an encryption scheme that supports threshold decryption, homomorphic encryption, etc.). In some implementations the data processing system can encrypt each of the counter registers or bit values corresponding to a position of each legion individually using the aggregated encryption key to encrypt the cascading legions data structure. In such implementations, each of the encrypted counter registers or bit values can be aggregated to create an encrypted data structure representing the cascading legions data structure. In some implementations, the data processing system can encrypt the cascading legions data structure legions-wise, that is each legion can be independently encrypted and aggregated into an encrypted data structure representing the cascading legions data structure.

The data processing system can transmit the encrypted cascading legions data structure (ACT 2024). Transmitting the encrypted cascading legions data structure can include providing the encrypted cascading legions data structure to a worker computing device (e.g., any of the worker computing devices 405A-N, the aggregator computing device 410, etc.). The data processing system can select a worker computing device as a first of one or more worker computing device to process the encrypted cascading legions data structure. In some implementations, the data processing system can transmit the encrypted cascading legions data structure position-wise, that is where each position of each legion can be transmitted separately to the worker computing device. In some implementations, the data processing system transmits the encrypted cascading legions data structure in a bulk transaction, where a majority of, or the entirety of, the encrypted vector is transmitted in a single message. In some implementations, the data processing system can transmit the encrypted cascading legions data structure legions-wise, where each encrypted legion is transmitted to the worker computing device in its own message.

C. Alternate Cascading Legions Techniques for Frequency and Cardinality Estimation Identifier servers can be associated with sets of client devices, for example by maintaining a client identifier that is associated with the respective client device. Each client identifier can include attribute information that describes the association between each identifier server and client device. Attribute information can include information about the relationship between the client device and the identifier server (e.g., web-browsing history, interaction data, association time, network analysis data, etc.), and can include protected or otherwise private information received from the respective client device. Different identifier servers may maintain different attribute data and different client identifiers that correspond to the same respective client devices. Typically, to determine whether there is duplicate attribute data between each identifier server, the identifier servers may share the attribute data, which can include protected or private information, to a centralized server to de-duplicate any client attribute information.

However, the transmission of all client attribute data poses issues to scalability. As the number of client identifier servers increases, the amount of client device attribute data transmitted via the network typically increases as well. Because the attribute data can be detailed and relatively large for each client device, transmitting such information at scale can exhaust network bandwidth and computational resources. Further, it would be beneficial for a system to not only compute a total number of user identifiers, but also compute the number of client devices that satisfy a particular attribute data criteria, such as the frequency of a particular attribute, without transmitting protected or private attribute information over the network. In addition, implementations of encrypted probabilistic data structures used to solve these issues suffer from sketch sizes that are impractically large (e.g., on the order of gigabytes).

To address the foregoing issues, aspects of the systems and methods of this technical approach can combine de-noised cascading legions data structures, which are generated as described in U.S. Provisional Pat. App. No. 62/981,960. Recall that each publisher computing device can generate a probabilistic matrix data structure that represents the device identifiers that are associate with that publisher. To maintain differential privacy, each publisher can randomly flip the bits in each row of the matrix. A data processing system can receive the noised matrices, sometimes referred to herein as sketches, from all publisher computing devices and compute the union, or cardinality, of the multiset of identifiers across all of the publisher computing devices.

At least one implementation of computing the union of the multiset of identifiers using the sketches from each publisher includes first computing the cardinality (e.g., the estimated number of identifiers used to generate the sketch) of each noised sketch, and sorting the noised sketches by descending cardinality. The data processing system can group the noised sketches into a groups of a predetermined size, and can estimate the de-noised. The data processing system can estimate a de-noised union sketch for each group of sketches using Monte-Carlo sampling. Once the estimated de-noised sketches have been generated, the data processing system can combine the sketches and determine the cardinality, or union, that represents all device identifiers from across all publisher computing devices.

The techniques described herein allow publisher computing devices to find the total number of identifiers (e.g., device identifiers, attributes, etc.) of a set of publisher computing devices without revealing any information about the device identifiers or the attributes stored in association with the device identifiers in data records maintained by the publisher computing devices (e.g., the data processing systems 105A-N).

Mathematically this is an instance of a general problem: find cardinality of a union of sets $S_1, \ldots, S_k$, where each set $S_i$ is maintained by agent $A_i$ (e.g. data processing system 105I, etc.). A dataset is referred to as differentially private if it does not reveal certain information about any individual member of the dataset (e.g., a device identifier, attribute data, any individual or aggregate data record, etc.). It is desirable to create sketches of the sets of users such that they are differentially private and the cardinality of the union of the sets (e.g., the multiset) can be determined efficiently. Algorithms for efficient unions of differentially private and noised cascading legions (e.g., the cascading legions described herein above in Section B, etc.) are described in this section. Section B detailed implementations of the systems outlined in Section A to provide a cascading legions scheme to determine the cardinality and frequency of multisets of identifiers. This section details techniques of adding differentially private (DP) noise to each cascading legions data structure (e.g., sketch, etc.) at the data processing level (e.g., each data processing system 105A-N can add noise to its respective cascading legions sketch, etc.), and efficiently determining the cardinality and frequency of the multiset using techniques that can reduce or eliminate the impact of the DP noise on the accuracy of the final cardinality or frequency estimation.

Deduplication of k DP-noised cascading legions sketches can be achieved in linear time. The algorithm is computationally efficient. A heuristic is described that can be used to deduplicate an arbitrary number of sketches. The noise is small if certain assumptions hold. In particular, the noise is small if cardinality of the union sketches is dominated by the largest ones. The complexity of the deduplication algorithm for bloom filters (e.g., described herein in Section A) can be improved from exponential to linear time using the techniques described in this section.

Noise is added by randomly flipping each legion x position with probability p. This probability is taken to be in relationship with differential privacy epsilon:

$$p = \frac{1}{1+e^E}$$

The scheme can be made efficient, for example, by reducing the cascading legions data structures to bloom filters (e.g., or counting bloom filters if counter registers are used in place of bit values, as described in Section B, etc.). A cascading legions sketch can consist of l legions, each having n positions. An item (e.g., a data record comprising a device identifier and associated attribute data, etc.) can be hashed to one position of one legion. The probability of an item getting hashed into the k-th legion is $2^{-k}$. Given the legion, the probability of any one position being populated or updated by any given data record is the same for each position in the selected legion.

In secure multi-party computation, the estimate of cardinality is made from the total number of positions that are set to 1 (e.g., or not set to zero, etc.). In a differentially private case, the noise of the total number of positions will be dominated by empty and saturated legions. Therefore, the estimate can be done from the legion that is in the process of saturation. Selection of the legion that is in the process of saturation is described above in Section B, but includes determining the first legion of the cascading legions data structure that has less than half of the positions populated by values. Taken by itself, the legion that is in the process of saturation can be a uniform bloom filter (or counting bloom filter if counter registers are used, etc.). An algorithm for uniform bloom filter cardinality estimation can be applied to cascading legions as described by the following, purely example and non-limiting pseudo-code:

```
Input: CascadingLegion(l, n) sketches s[0], ..., s[k-1] noised
  with probability
Output: cardinality of the union
for legion in range(l):
    estimate C to be denoised number of bits set to 1 in the
        union of sketeches
    if C < (n/2):
        # we are at Reference Legion
        Return estimation C * 2^legion
```

The algorithm can work on die vector of volumes of bit combinations observed in the positions of the bloom filter. The algorithm can proceed as follows:
1. For any pair of bit combinations b1, b2, the probability of random flips leading form b1 to b2 is calculated.
2. Probabilities can be calculated in 1 are assembled into a transition matrix M.
3. Transition matrix M can be inverted to calculate a correction matrix C.
4. Given a collection of sketches:
   a. Vector of volumes of bit combinations is calculated.
   b. Correction matrix is applied to the vector to estimate pre-noised vector of volumes of bit combinations.

The pre-noised vector of volumes of bit combinations is describing the full multiset of the data records. To calculate union the system can sum up all combinations except (0, . . . , 0). Computing the correction matrix can be implemented, in at least one implementation, for example, as described by the following example and non-limiting pseudo-code:

```
def NoiseCorrection(s, p=0.1):
    """Noise correction matrix.
    Args:
        s: Number of bloom filters
        p: DP flip probability
    Returns:
        A matrix that is to be applied to combination count to
        recover estimated combination count before DP noise.
    """
    q = 1 - p
    size = 2 ** s
    result = [ ]
    for i in range(size):
        row = [ ]
        for j in range(size):
            match = ~(numpy.uint8(i) ^ numpy.uint8(j))
            match_count = bin(match & (size-1)).count('1')
            row.append(q**match_count*p**(log2(size)-match_count))
        result.append(row)
    m = numpy.matrix(result)
    return numpy.linalg.inv(m)
```

In another implementation, processing can occur on the number-of-ones vector, rather than combinations vector. Determining transition probabilities for a number-of-ones can be done using binomial coefficients. The first row of the vector is used to estimate the de-noised number of buckets that are all zeros. In at least one implementation, computing the transition probabilities in number-of-ones space can be achieved in linear time as described by the following example pseudo-code:

```
def TransitionProbability(l, s, t, p):
    result = 0
    q = 1 - p
    for i in range(l // 2 + 1):
        flip_zeros = max(0, t - s) + i
        flip_ones = max(0, s - t) + i
        flips = flip_ones + flip_zeros
        calms = l - flips
        if flip_ones > s or flip_zeros > l - s:
            continue
        choose_ones = special.comb(s, flip_ones)
        choose_zeros = special.comb(l - s, flip_zeros)
        choices = choose_ones * choose_zeros
        assert choices > 0
        result += choices * p ** flips * q ** calms
    return result
```

The techniques described in this section herein can include inverting a stochastic matrix. The result of such inversion may become noisy for large dimensionality. Given a small collection of sketches (e.g., 5 of them) a sample of a de-noised sketch of the union can be obtained. The embodiment shown below obtains the de-noised sketch of the union for 2 sketches, although the method shown below may be generalized to an arbitrary number of sketches, and to sketches that include positions that are integer values (e.g., counts, etc.), rather than single bits. The method is a Monte Carlo sampling heuristic, and is shown below in the following example pseudo-code:

```
def GetCombinationsVector(s1, s2):
    """Compute vector of combinations of bits in sketches."""
    v = [0, 0, 0, 0]
    for x, y in zip(s1, s2):
        v[x+2*y] += 1
    return v
def ProbabilityOfOr(bit_a, bit_b, priors_map):
    prob_map = { }
    for true_a in [0, 1]:
        for true_b in [0, 1]:
            flip_a_needed = 1 if bit_a != true_a else 0
            flip_b_needed = 1 if bit_b != true_b else 0
            prob_map[true_a,true_b] =
priors_map[true_a,true_b]*(
                    p ** flip_a_needed * q ** (1 - flip_a_needed)
*
                    p ** flip_b_needed * q ** (1 - flip_b_needed))
    prob_00 = prob_map[0, 0] / sum(prob_map.values( ))
    return 1 - prob00
def DenoisedUnion(s1, s2):
    v = GetCombinationsVector(s1, s2)
    assert p == 0.1, "For now only case p=0.1 is simulated"
    v =numpy.matrix([[ 1.265625,-0.140625,-0.140625,
0.015625],
                    [-0.140625, 1.265625, 0.015625,-
0.140625],
                    [-0.140625, 0.015625, 1.265625,-
0.140625],
                    [ 0.015625,-0.140625,-0.140625,
1.265625]])*
numpy.array(v).reshape(4, 1)
    priors_map = {(0,0):v[0], (1,0):v[1], (0,1):v[2],
(1,1):v[3]}
    probs = [ProbabilityOfOr(x, y, priors_map) for x, y in
zip(s1,s2)]
    result = [int(random.uniform(0,1) < x) for x in probs]
    return result
```

Using the techniques described above, the system can compute the union over large (e.g., more than 10, etc.) noised sketches without loss of accuracy. The algorithm can include a tuning parameter k, which can be set to around 5, in some implementations. However, the tuning parameter k may be set to other values as well.

1. Estimate the cardinality of each sketch alone, using the direct estimation technique described above that can estimate the cardinality of a single sketch (e.g., by determining the transition probabilities of a particular sketch, and removing that number from the positions, and determining the cardinality of the sketch).
2. Sort the sketches in descending order by their cardinality (e.g., the first sketch in the list of sketches has the greatest cardinality, the second sketch in the list has the second greatest, etc.).
3. Group the sketches into groups of k size, while maintaining their order of cardinality (e.g., first k sketches in the list are in the first group, the next k sketches in the list are in the second group, and so on, etc.). This generates g groups of sketches.
4. For each of the g groups of sketches, use the Monte Carlo method to sample a de-noised union for the respective group. This can return g Monte Carlo sample'd union sketches.
5. Take the union of the g sketches directly, as in step 1.

The accuracy of Monte-Carlo sampling can be further improved if a super-set of all sets being unioned is provided. In such an implementation, all registers that have no data mapped to them are zero-filled.

Figure 21:
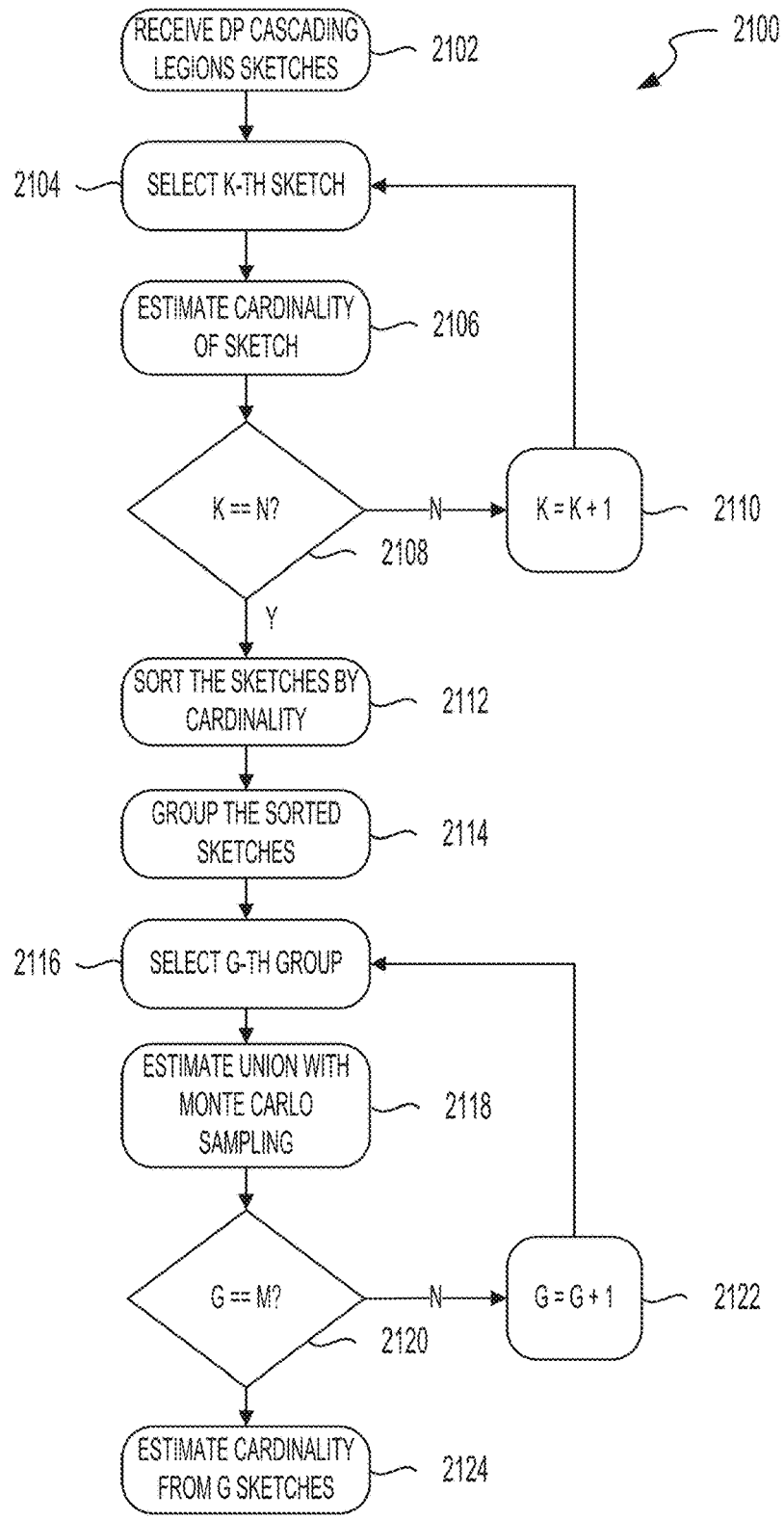
FIG. 21 depicts a flow chart illustrating an example method of estimating the cardinality of sets of differentially private noised cascading legions data structures.

Referring now to FIG. 21, depicted is an example flow diagram of a method 2100 of estimating the cardinality of differentially private noised cascading legions sketches. The method can be executed, performed, or otherwise carried out by any of the computing device described herein in Section A, or any other computing device (e.g., one or more of the data processing systems 105A-N, one or more of the client devices 120A-N, one or more of the worker computing devices 405A-N, the aggregator computing device 410, etc.) described herein, such as an aggregator computing device (e.g., the aggregator computing device 410, etc.). The aggregator computing device can receive one or more differentially private cascading legions sketches (ACT 2102). The aggregator computing device can select the k-th sketch (ACT 2104). The aggregator computing device can estimate cardinality of the selected sketch (ACT 2106). The aggregator computing device can determine whether the counter register k is equal to the number of sketches n (DECISION 2108). The aggregator computing device can increment the counter register k (ACT 2110). The aggregator computing device can sort the sketches by cardinality (ACT 2112). The aggregator computing device can group the sorted sketches (ACT 2114). The aggregator computing device can select the g-th group (ACT 2116). The aggregator computing device can estimate the union of the selected group using Monte Carlo sampling (ACT 2118). The aggregator computing device can determine whether the counter register g is equal to the number of groups m (DECISION 2120). The aggregator computing device can increment the counter register g. The aggregator computing device can estimate the cardinality from the union of the g group union values (ACT 2124).

The aggregator computing device can receive one or more differentially private cascading legions sketches (ACT 2102). In some implementations, the aggregator computing device can receive the differentially private (e.g., noised, etc.) cascading legions periodically or in a burst transaction. Each cascading legions sketch can be associated with a respective identifier that reflects the identifier server (e.g., data processing system 105A-N, etc.) from which the cascading legions sketch was generated and received. Each of the differentially private cascading legions sketches received from the identifier servers may be encrypted using an aggregated encryption key. In some implementations, the cascading legions sketches are not encrypted, and differential privacy is maintain through noise added to the cascading legions sketch by the respective identifier server.

The aggregator computing device can select the k-th sketch (ACT 2104). To process and determine the noised cardinality of each cascading legions sketch received in ACT 2102, the aggregator computing device can iterate over each of the sketches received by the aggregator computing device. The aggregator computing device can iteratively loop through each of the cascading legions sketches based on a counter register k. For example, each of the cascading legions sketches can be indexed in a data structure by an index value (e.g., index 0, index 1, index 2, etc.). To process a cascading legions sketch, the data processing system can select the cascading legions sketch that includes or is associated with the index value which is equal to, or approximately equal to, the counter register k. If it is the first iteration of the loop, the counter register k can be initialized to an initialization value (e.g., k=0, k=1, etc.) before selecting the k-th cascading legions sketch. Selecting the cascading legions sketch can include copying the data associated with the cascading legions sketch to a different region of computer memory in the aggregator computing device, for example a working region of memory.

The aggregator computing device can estimate cardinality of the selected sketch (ACT 2106). To rank the list of the cascading legions sketches received by the aggregator computing device, the aggregator computing device can rank estimate the cardinality (e.g., a noised cardinality) of the selected cascading legions sketch. To do so, the aggregator computing device can iterate through each of the l legions in the sketch, starting with the legion with the highest probability of population (e.g., i=1, where i is selected legion, etc.), and ending on the legion with the lowest probability of population (e.g., i=1, where i is selected legion, etc.). For each selected legion, the aggregator computing device can compare the number of populated positions (e.g., the number of bits equal to a population value, such as one, etc.) to the number of unpopulated positions in the legion. If the aggregator computing device determines, for the selected legion, that for the number of populated positions is greater or equal to the number of unpopulated positions, the aggregator computing device can move onto the next legion in the cascading legions data structure. If the aggregator computing device determines that the number of populated positions is less than the number of unpopulated positions, the aggregator computing device can store the selected legion as the reference legion in association with the current legion index (e.g., if the aggregator computing device has iterated to the third legion in the cascading legions data structure, and the first legion has an index of zero, the reference legion index can be equal to 2, etc.). The aggregator computing device can estimate the cardinality of the selected noised legion data structure by multiplying the number of populated positions in the reference legion by $2^{\wedge}(golden\_legion\_index)$. For example, if there are 10 populated positions in the reference legion, and the reference legion index is equal to 4, the aggregator computing device can estimate the noised cardinality of the noised cascading legions data structure as equal to $10*2^{\wedge}4$, or 160.

The aggregator computing device can determine whether the counter register k is equal to the number of sketches n (DECISION 2108). To determine whether the aggregator computing device has estimated the noised cardinality using each noised cascading legions sketch, the aggregator computing device can compare the counter register (e.g., k) used to select each noised cascading legions sketch to the total number of noised cascading legions sketches n. If the counter register k is not equal to (e.g., less than) the total number of noised cascading legions sketches n, the aggregator computing device can execute (ACT 2110). If the counter register k is equal to (e.g., equal to or greater than) the total number of noised cascading legions sketches n, the aggregator computing device can execute (ACT 2112).

The aggregator computing device can increment the counter register k (ACT 2110). In some implementations, the aggregator computing device can add one to the register k to indicate the next unprocessed noised cascading legions sketch in the set of received cascading legions sketch (e.g., the cascading legions sketches received by the aggregator computing device in ACT 2102, etc.). In some implementations, the aggregator computing device can set the counter register k to a memory address value (e.g., location in computer memory) of the next unprocessed cascading legions sketch. In some implementations, the memory address value of the next unprocessed cascading legions sketch can be included in the data structure at the location of the current (e.g., selected) cascading legions sketch. After incrementing the value of the counter register k, the aggregator computing device can execute (ACT 2104).

The aggregator computing device can sort the sketches by cardinality (ACT 2112). After estimating the noised cardinality of each of the differentially private cascading legions sketches, the aggregator computing device can generate a sorted list of the differentially private cascading legions sketches based on their estimated noised cardinality value. The noised cardinality value may not be an accurate representation of the cardinality of the set that contributed to the respective cascading legions sketch, but it is accurate enough for the purposes of sorting the sketches as described in this method 2100. Sorting the cascading legions sketches can include comparing each of the estimated noised cardinalities of the sketches using an efficient sorting algorithm, for example heapsort, or any other type of sorting algorithm. Using the sorting algorithm, the aggregator computing device can generate a sorted list of the cascading legions sketches in descending order. For example, the first entry in the list can be the cascading legions sketch associated with the largest noised cardinality calculated in ACT 2106, the second entry in the list can be the cascading legions sketch associated with the second largest noised cardinality, and so on.

The aggregator computing device can group the sorted sketches (ACT 2114). After sorting the cascading legions sketches, the aggregator computing device can assign group each of the sketches into m groups of size j, where j is a parameter is about equal to 5, but could be equal to other values. The parameter j can be retrieved from one or more data structures in the memory of the aggregator computing device. For example, the aggregator computing device can select the first j sketches in the list, and assign it to the first group. The aggregator computing device can select the next j ungrouped sketches in the list, and assign it to the next group, and so on until the aggregator computing device creates m groups of sketches of size j.

The aggregator computing device can select the g-th group (ACT 2116). To process and determine the Monte Carlo sampled cardinality of each group created in ACT 2114, the aggregator computing device can iterate over each of the groups created by the aggregator computing device. The aggregator computing device can iteratively loop through each of the groups based on a counter register g. For example, each of the groups can be indexed in a data structure by an index value (e.g., index 0, index 1, index 2, etc.). To process a group, the data processing system can select the group that includes or is associated with the index value which is equal to, or approximately equal to, the counter register g. If it is the first iteration of the loop, the counter register g can be initialized to an initialization value (e.g., g=0, g=1, etc.) before selecting the g-th group. Selecting the group can include copying the data associated with the group to a different region of computer memory in the aggregator computing device, for example a working region of memory.

The aggregator computing device can estimate the union of the selected group using Monte Carlo sampling (ACT 2118). Estimating the cardinality using Monte Carlo sampling can include determining a combinations vector of the vectors in the group, calculating the probability of bits to be flipped in any particular position, and generating a de-noised estimation sketch that estimates the de-noised union of each of the input sketches. The process is shown below for two sketches in the following pseudo-code, but it may be extended to more than two sketches with minor modification:

```
def GetCombinationsVector(s1, s2):
    """"Compute vector of combinations of bits in sketches."""
    v = [0, 0, 0, 0]
    for x, y in zip(s1, s2):
        v[x+2*y] += 1
    return v
def ProbabilityOfOr(bit_a, bit_b, priors_map):
    prob_map = { }
    p = 0.1
    q = 1 - p
    for true_a in [0, 1]:
        for true_b in [0, 1]:
            flip_a_needed = 1 if bit_a != true_a else 0
            flip_b_needed = 1 if bit_b != true_b else 0
            prob_map[true_a,true_b] =
priors_map[true_a,true_b]*(
                p ** flip_a_needed * q ** (1 - flip_a_needed)
*
                p ** flip_b_needed * q ** (1 - flip_b_needed))
    prob_00 = prob_map[0, 0] / sum(prob_map.values( ))
    return 1 - prob00
def DenoisedUnion(s1, s2):
    p = 0.1
    q = 1 - p
    v = GetCombinationsVector(s1, s2)
    assert p == 0.1, "For now only case p=0.1 is simulated"
    v =numpy.matrix([[ 1.265625,-0.140625,-0.140625,
0.015625],
                    [-0.140625, 1.265625, 0.015625,-
0.140625],
                    [-0.140625, 0.015625, 1.265625,-
0.140625],
                    [ 0.015625,-0.140625,-0.140625,
1.265625]])*
numpy.array(v).reshape(4, 1)
    priors_map = {(0,0):v[0], (1,0):v[1], (0,1):v[2],
(1,1):v[3]}
    probs = [ProbabilityOfOr(x, y, priors_map) for x, y in
zip(s1,s2)]
    result = [int(random.uniform(0,1) < x) for x in probs]
    return result
```

Although the above pseudo-code is shown to include a probability of 0.1, it should be understood that the value of p can be changed to any value, as long as the corresponding changes are made to the inverted matrix used to multiply the combinations vector v. Further, although only two sketches may be combined in the above pseudo-code, it should be understood that this number may be extended by changing the parameters of the combinations vector, the size of the inverted matrix, and the ProbabilityOfOr function to accommodate more than two vectors. In another implementation, the methods used to determine the de-noised union for groups of two may be used (e.g., the parameter j to determine group size could be set to two, etc.).

The aggregator computing device can determine whether the counter register g is equal to the number of groups m (DECISION 2120). To determine whether the aggregator computing device has estimated the union Monte Carlo sampling values using each group of cascading legions sketches, the aggregator computing device can compare the counter register (e.g., g) used to select each group to the total number of groups m. If the counter register g is not equal to (e.g., less than) the total number of groups m, the aggregator computing device can execute (ACT 2122). If the counter register g is equal to (e.g., equal to or greater than) the total number of groups m, the aggregator computing device can execute (ACT 2124).

The aggregator computing device can increment the counter register g. In some implementations, the aggregator computing device can add one to the register g to indicate the next unprocessed group of cascading legions sketch in the set of cascading legions sketch groups (e.g., the groups of cascading legions sketches created by the aggregator computing device in ACT 2114, etc.). In some implementations, the aggregator computing device can set the counter register g to a memory address value (e.g., location in computer memory) of the next unprocessed group. In some implementations, the memory address value of the next unprocessed group can be included in the data structure at the location of the current (e.g., selected) group. After incrementing the value of the counter register g, the aggregator computing device can execute (ACT 2116).

The aggregator computing device can estimate the cardinality from the union of the g group union values (ACT 2124). As describe above, the sketches generated by Monte Carlo sampling each of the m groups of cascading legions sketches represent the de-noised union of the members of each group. Accordingly, the union of each of the Monte Carlo sample sketches can be determined by basic aggregation (e.g., a bitwise OR operation across each group, etc.) to determine a combined union sketch that represents the de-noised aggregation of all cascading legions sketches received in step 2102. The aggregator computing device can aggregate (e.g., iteratively bitwise-ORing, adding, etc.) each of the generated Monte Carlo sample sketches to generate a combined cascading legions sketch. The aggregator computing device can use the combined sketch to determine the de-noised cardinality of the union of the sketches received in step 2102.

To do so, the aggregator computing device can iterate through each of the l legions in the combined sketch, starting with the legion with the highest probability of population (e.g., i=1, where i is selected legion, etc.), and ending on the legion with the lowest probability of population (e.g., i=l, where i is selected legion, etc.). For each selected legion, the aggregator computing device can compare the number of populated positions (e.g., the number of bits equal to a population value, such as one, etc.) to the number of unpopulated positions in the legion. If the aggregator computing device determines, for the selected legion, that the number of populated positions is greater or equal to the number of unpopulated positions, the aggregator computing device can move to next legion in the combined sketch. If the aggregator computing device determines that the number of populated positions is less than the number of unpopulated positions, the aggregator computing device can store the selected legion as the reference legion in association with the current legion index i (e.g., if the aggregator computing device has iterated to the third legion in the combined sketch, and the first legion has an index of zero, the reference legion index i can be equal to 2, etc.). The aggregator computing device can estimate the de-noised cardinality of the combined sketch by multiplying the number of populated positions in the reference legion by $2^{\wedge}(\text{golden\_legion\_index})$. For example, if there are 10 populated positions in the reference legion, and the reference legion index is equal to 4, the aggregator computing device can estimate the noised cardinality of the noised cascading legions data structure as equal to $10*2^{\wedge}4$, or 160.

The aggregator computing device can perform the steps of method 2100 in response to a request. For example, an external computing device may provide the aggregator computing device with a request for the de-noised cardinality of the sets of identifiers and attribute data resident on the identifier servers. The aggregator computing device can then request, from each identifier server (e.g., each data processing system 105A-N, etc.), a cascading legions sketch. Each of the data processing systems 105 can generate the cascading legions sketch as described in Section B, and apply probabilistic noise by flipping the bits in the sketch with a probability p, as described herein above. After generating the sketches, the data processing systems 105 can transit their sketch to the aggregator computing device for further processing. The aggregator computing device can then receive the sketches from the data processing systems 105 as in step 2102 of the method 2100, and then perform the steps of the method to determine the cardinality of the identifiers that contributed to the sketches. After determining the cardinality, the aggregator computing device can transmit the estimated cardinality of the multiset to the external computing device responsible for the request.

The techniques described herein provide a number of technical advantages. Instead of each data processing system 105 transmitting large amounts of data via the network, thereby exhausting network resources, each data processing system can use computational techniques to generate a small data structure that (1) represents their entire set of identifiers and attributes, and (2) is differentially private. Further, the computational techniques described herein to generate the cascading legions sketches scale linearly in computational complexity with the number of identifiers maintained by the identifier server. The differentially private distribution of the sketches in lieu of the data itself reduces the load on networking resources because the sketches can be orders of magnitude smaller than the data it represents. This is an improvement to networking technology. Further, because the sketches are differentially private, the data represented by the sketches does not need to be distributed to any other computing device, thereby improving the security of networking systems and cardinality estimator systems.

D. Continuous Liquid Legions Techniques for Frequency and Cardinality Estimation Techniques for cardinality and frequency estimation are introduced. These methods can combine aspects of HyperLogLog and Bloom filters to build a sketch that can be more compact than a bloom filter by geometrically distributing the allocation of items across buckets. The systems and methods described herein can combine sketches using a bucket-wise sum, which can enable the creation of a secure multi-party computation protocol that takes advantage of homomorphic encryption to combine sketches across multiple untrusted parties while ensuring that the parties to the protocol learn differentially private estimates of the agreed upon outputs.

The frequency of device identifiers can be the number of device identifiers (henceforth sometimes referred to interchangeably as device or identifier), that have accessed a particular item of content. As such, cardinality is a related value because it can be the number of unique device identifiers that have accessed an item of content, and frequency can be the number unique device identifiers that have accessed the item of content more than a predetermined number of times. For example, 1+ frequency (e.g., the number of unique device identifiers that have accessed content more than one time, etc.) can be the cardinality of the multiset of sets of identifiers across different publisher computing devices. Described herein are at least two methods of determining the frequency of content: the frequency histogram and k+ reach. Frequency histogram can show what fraction of devices have each frequency, while k+ reach can represent the cardinality of the set of devices that have frequency greater than k. Estimating the frequency for a range of values with only a single pass over a dataset represents an improvement to cardinality estimation computer systems because it reduces the amount of computational resources required to perform the estimation. The maximum value computed for frequency may be based on a predetermined maximum frequency value, as content providers can use this metric to help limit the exposure of content.

The systems and methods of this technical solution can determine the reach and frequency across content publishers, where a content publisher computing device (e.g., any of the data processing systems 105A-N, etc.) is defined as an entity that hosts and provides content. However, since content publishers may not trust each other, the sketches used to determine cardinality and frequency may not be shared directly. The systems and methods for cardinality and frequency measurement described herein can preserve the privacy of identifiers or devices that make up the sketches, and can prevent content publisher computing devices from learning information about each other, thereby improving the overall security of networking systems.

Various methods to determine cardinality and frequency of identifiers across one or more publisher computing devices in a secure and privacy preserving manner will be described: Cascading Legions (e.g., described herein above in Sections B and C, etc.), which can be a geometrically distributed array of Bloom filters for estimating cardinality and frequency; Liquid Legions (e.g., described in this section, etc.), which can be a continuous version of the Cascading Legions algorithm; two mechanisms for applying differential privacy to estimate multi-publisher reach; and a multi-party computation protocol for combining sketches of either type and producing frequency estimates that are differentially private.

One other such technique for estimating cardinality is HyperLogLog. HyperLogLog (HLL) can be a cardinality estimator that is characterized by low error rates, low variance, and low memory usage. Moreover, the union of two HLLs can be trivial to compute, which means that HLLs may be ideal for distributed counting applications. An extension of HLL that can estimate both cardinality and frequency is called FreqLogLog. To achieve this. FreqLogLogs (FLLs) can store two additional values per register, a count and a fingerprint. When the HLL register value is updated, the fingerprint of the item is stored and the counter is reset to one. Then, when another item assigned to that register has the same number of leading zeroes as the previous item, the fingerprints are compared. If they are the same the count is incremented. Otherwise if the new fingerprint is larger than the old fingerprint the new fingerprint is stored and the count is reset to 1. Otherwise, the old fingerprint is larger and nothing is modified.

Another such technique is based on bloom filters. Like HLLs, Bloom filters can be used to calculate cardinality and frequency, and may have comparatively higher memory requirements. The cardinality of a Bloom filter can be determined by evaluating:

$$\frac{m}{k} \ln 1 \frac{x}{k},$$

where k is the number of hashes used to generate the bloom filter, m is the number of bits in the bloom filter, x is the number of filled buckets in the bloom filter, and n is the number of the estimate of the cardinality of the bloom filter.

Allowing k go to ones and inverting the function, the number of active bits given the set size can be estimated using the following formula:

$$X \; m \; 1 \; \exp{^-m}.$$

To maintain the differential privacy of the sketches when transmitting to other computing devices, ElGamal encryption can be used (e.g., as described in Section A, etc.). ElGamal encryption can be a simple public-key encryption scheme that can be adapted to support threshold decryption. It can be viewed as an offline variant of the Diffie-Hellman key exchange protocol. The basic scheme, for a group with generator G, is as follows:

KeyGen: Choose a random integer X modulo q (the order of the group). This can be the private key used for decryption; the public key is $G^X$.

Encrypt(pk, m): Choose a random integer R modulo q. The ciphertext can be ($G^R$, m $pk^R$) which is ($G^R$, m $G^{(X R)}$).

Decrypt(sk, m): Compute $G^{(X R)}$ using the secret key, and then m=m $pk^R/G^{(X R)}$.

An N-of-N threshold version of this scheme can be constructed by multiplying all of the public keys together. An example of this threshold variant is as follows: two parties can generate keys $G^X$ and $G^Y$. These public keys, when multiplied, compute to $G^{(X+Y)}$, which can be used as a public key for encryption; the corresponding secret key is X+Y. For decryption, the original secret keys can be applied one-by-one (in any order), so no single party needs to know the joint private key.

ElGamal encryption can support a multiplication homomorphism. Given two ciphertexts ($G^{R1}$, M1 $G^X$ R1), ($G^{R2}$, M2 $G^X$ R2), the values ($G^{(R1+R2)}$, M1 M2 $G^{X(R1+R2)}$) can be computed to decrypt to the product of the two messages. This can be an additive homomorphism on the discrete logarithms of the messages: in other words, the values ($G^{(R1+R2)}$. $G^{(M1+M2)}$ $G^{X(R1+R2)}$), can be computed, which can be used for small message spaces (small enough to compute discrete logarithms efficiently).

Performing sums in the exponent may be sufficient. For example, two integers with values v1, v2 represented as $2^{v1}$ and 2^v2 can be combined multiplicatively yielding a combined ciphertext of 2^(v1+v2). Moreover, since the sketch described below may use a count of the elements less than the max desired frequency, it is possible to use a lookup table for decoding only these well-known values. There is also a small security benefit here: the aggregator can learn counts for values above the threshold without learning what those values are. To do so, the workers can use encryption (e.g., the Pohlig-Hellman cipher, etc.), which can involve each worker choosing a secret exponent that is applied to all of the partially decrypted buckets. This can be performed via the homomorphism and may be equivalent to changing the generator G to some random group element.

Another technique for estimating cardinality and frequency of multisets can be implemented using cascading legions sketches. The number of bits for Bloom filter accuracy may grow linearly with the cardinality of the set that needs to be measured. Arranging registers (i.e. bits that record the presence of the item) of CascadingLegions (CL) into a two dimensional array (or a matrix) can mitigate the linear growth of the number of bits. Columns of the array are called legions and rows are called positions. Each item is thus mapped into a (legion, position) tuple of a legion, which is the register. The probability distribution over the legions is geometric and over the positions it is uniform, therefore each legion can be a single hash bloom filter. This scheme can allow for the estimation of the cardinality with a fixed relative error, and the required sketch size can grow logarithmically with the cardinality of the set that needs to be measured. Moreover, as with bloom filters, CL sketch registers can be combined via a bitwise- or operation, or when the sketch contains counters, which is necessary for the frequency problem, the sketches can be combined by summing register-wise.

Algorithm 1, described herein below (and based on the disclosure provided in Section B, etc.), describes the initialization of a CL sketch. This can include the allocation of an array of registers (s) and the allocation of an array of same key aggregators (b). When an item is initially inserted into register (r), the same key aggregator can store a fingerprint of that item and s[r] is set to 1. Then the next time an item is allocated to that register, its fingerprint can be compared to the existing fingerprint. If the fingerprints are equal, s[r] can be incremented. If the new fingerprint is larger than the existing one, then the existing one can be replaced and s[r] can be reset to 1. Otherwise, the new fingerprint is smaller and no modifications are made. The process for updating the same key aggregator is described as a part of Algorithm 3 below, which describes how items can be inserted into a sketch.

Algorithm 1, sketch initialization:

settings: none
input: number of legions l, and number of positions m
output: CascadingLegions sketch and same key aggregator (s, b)
let s = integer array of size l * n
let b = array of SameKeyAggregator structures
initialize s with zeros Before proceeding with the insertion algorithm, the register allocation algorithm is introduced. To allocate an item to a register, it can first be hashed. Next, the legion can be assigned by determining the number of leading zeros (e.g., most significant, least significant, etc.) in the hash value. Next, the first non-zero bit is stripped and the remaining bits modulus the number of positions determine the position in the legion. See Algorithm 2, described herein below. Items can be allocated to legions using a binomial distribution by using the sum of active bits in the hash value as the way of determining the legion.

Algorithm 2, register allocation:

settings: number of legions l, number of positions m.
input: fingerprint (f) of item to allocate.
output: CascadingLegions register (i, j)
let i = 0
while f % 2 == 0 and i < l - 1:
    let i += 1
    let f /= 2
let f /= 2
let j = f % m
return (j, i)

Insertion can proceed by allocating the item to a register (i, j). The next step is to check the same key aggregator as described above and adjust the register values accordingly. The algorithm can assume the use of counters, but in implementations where frequency is not desired (e.g., cardinality is desired, etc.), each legion may be represented by a bit-array.

Algorithm 3, item insertion:

input: item
output: modified sketch (s,b)
f = fingerprint(item)
let (i, j) = allocateRegister(f)
let r = i * m + j
if b[r] == null or b[r] == f:
    s[r] += 1
    b[r] = f
elif b[r] < f:
    s[r] = 1
    br[r] = f To estimate cardinality of the set of items the expected number of registers activated by a certain cardinality can be derived. Each legion can be a uniform Bloom filter, thus if $t_j$ items fell into legion j then:

$$1 - \exp\frac{t_j}{m},$$

fraction of registers may be activated. And as legion (is expected to be hit with 2^(j+1) fraction of items, the total number of registers activated can be equal to:

$$= \sum_{i=o} 1 - \exp\frac{2^{-j+1}}{m} m$$

Since F(t) can be monotonic, binary search can be used to efficiently find cardinality I given the observed number of activated registers. See Algorithm 4, described herein below Algorithm 4, cardinality estimation from cascading legions sketch:

settings: number of legions l, number of positions m
input: CascadingLegions sketch s -continued ---
Algorithm 4, cardinality estimation from cascading legions sketch:
---

```
output: estimated cardinality of the set stored in s
define function F(t):
    return sum((1 − exp(−t * 2^(−t * 2 ^( −(j + 1)) / m )) * m for j in range(l) )
define function InverseF(c):
    return results of binary search of t such that F(t) = c
let c = count of non-zeros in s
let t = InverseF(c)
return t
```

For frequency estimation the distribution of counts can be extracted from the registers and the frequency distribution can be extrapolated from the sample.

These sketches can be extended to be made differentially private through the introduction of random noise. Random noise can be introduced by randomly flipping bits present in the cascading legions sketch. The sketch can be made differentially private with parameter f by flipping each bit of the sketch with probability p:

$$p = \frac{1}{1 + \exp E}$$

For example, for DP epsilon of ln(3), bits can be flipped with probability 0.25. In Algorithm 4, given a list of filters S, all of which had bits flipped with probability p the number of 0 registers in the union can be estimated by removing noise in aggregate. This strategy can be applied to the whole sketch, but since it is expected to have a lot of legions fully saturated, or fully zero the error of such estimation would be large. Instead, the de-noising can be applied to each legion separately, and the legion that is in the process of saturation (e.g., the first legion that has less than half of its values populated, etc.) can be used to do the estimate.

Another such technique, liquid legions, is an extension of the cascading legions techniques using a continuous distribution. The decision that legions have allocation probability decreasing with a step of ½ is arbitrary. It allows the formula F for the expected number of legions to use a summation with l terms. Instead, items can be allocated to registers using a geometric distribution with a varying decay factor. Consider a bounded geometric distribution:

$$P = \frac{q^i\ 1\ q}{1\ q^m}, i E \{1 \dots m\}$$

To perform this sampling efficiently and simplify the analysis, an exponential distribution can be used:

$$P X = \frac{a\ e^{-ax}}{1\ e^{-a}}$$

truncated to segment [0, 1], along with a resolution m.

To allocate an item to a register, the segment [0, 1] can be split into m segments of equal length, assuming that i-th segment corresponds to i-th register. A real valued number can be sampled from the exponential distribution, and the item can be allocated to the register corresponding to the interval in which the real number fell.

To sample a number from a real valued distribution, a number from segment [0, 1] can be sampled uniformly and an inverse cumulative distribution function (CDF) can be applied. Inverse CDF of the truncated exponential distribution above can be equal to:

$$^{-1}u = 1\ \frac{\log(e^a + u\ 1\ e^a)}{a}$$

Thus, we arrive at Algorithm 1L for sampling a legionary for the LiquidLegions sketch.

---
Algorithm 5, estimating the cardinality of the union, using reference legion of noised cascading legion sketches:
---

```
settings: number of legions l, number of positions m, flip probability p
input: a list of CascadingLegions sketches S which had bits flipped with probability p
output: estimated cardinality of the union of sets stored in S
let InverseF = InverseF function from Algorithm 3.
define function OneCountsVolumesVector(S, j):
    let v = [0] * len(S)
    for i in range(m):
        let c = number of sketches in S that have 1 in i-th position of j-th legion
        let v[c] += 1
    return v
define function TransitionProbability(a, b):
    # For brevity, this function is omitted from the description of high level algorithm.
    # An example Python implementation of this function is included in the Appendix.
    return probability of a vector with a ones to have b ones after bits flipping with probability p
define function CorrectionMatrix( ):
    let N be a matrix of transition probabilities, i.e. N(a, b) = TransitionProbability(a, b).
    return linear algebra inverse of N
for g in range(l):
    let v = OneCountsVolumesVector(S)
    let estimated_zero_count = first coordinate of CorrectionMatrix( ) * v
    if j < l − 1 and estimated_zero_count < 0.4 * m:
        # The legion j is oversaturated, move on.
        continue
    # Legion g is saturated just enough, it's the Reference Legion.
    return InverseF(m − estimated_zero_count)
```

---
Algorithm 1L: Liquid Legions register allocation:
---
settings: decay parameter a, number of positions m.
input: item to allocate.
output: CascadingLegions register (i, j)
let f = fingerprint64bit(item)
let u = f / 2 ^ 64
let x = 1 − log(exp(a) + u * (1 − exp(a) ) ) / a
return integer floor of x * (m + 1)
---

The algorithm for sketch creation for Liquid Legions may be identical to Cascading Legions with an appropriate register allocation function. For the cardinality estimation, a function can map the cardinality to the expected number of registers activated, r.

The function that maps t=c/m to r/m, can be obtained for an arbitrary distribution P via integration:

$$E = 1 \int_0^1 e^{-Pxt} dX$$

This formula can be obtained by writing the probability of i-th register being allocated by at least one item and going to the limit when m goes to infinity:

$$E = 1 \int_0^1 e^{-Pxt} dX = 1 \int_0^1 e^{\frac{ae^{-x}}{1-e^{-a}dX}} = 1 - \frac{eXpi\frac{a}{1+e^a} + eXpi\frac{ae^a}{1+e^a}}{a}$$

Below, the algorithm for cardinality estimation is described. It can be identical to Cascading Legions counterpart, except for the replacement of the cardinality function.

---
Algorithm 3L addendum. Inverse cardinality estimation function from LiquidLegions sketch:
---
define function F(t):
    return 1 − (−expi(− a * t / (exp(a) − 1))
        +expi(−a * exp(a) * t / (exp(a) − 1) ) ) / a
---

The differentially private version of Liquid Legions sketch can be identical to Cascading Legion, except for the Reference Legion can slide continuously, and its length can be optimized for least variance of the estimate. Optimal reference legion can be found via differentiating the inverse cardinality estimator and finding the point, where the derivative, multiplied by the probability of the incremental increase of the number of activated registers, is maximal. The data processing system can utilize any or all of the algorithms in conjunction with or as a substitute to any of the algorithms described herein above in Section C. For example, by replacing the algorithm to determine the cardinality of a sketch with the algorithm for this section, or the algorithm to populate the Liquid Legions sketch with the algorithm used by the cascading legions implementation, as well as any others described herein. It should be understood that any of the data processing systems 105A-N, the worker computing devices 405, or the aggregator computing device 410 can perform any or all of the functionalities described in this section.

Techniques used for the Liquid Legions sketch analysis can be applied to an arbitrary distribution of the items over registers. Moreover, an arbitrary distribution can be approximated with a Dirac Mixture in the activity space. Thus, the exponentiated probability function need not be integratable, and a close approximation by the Dirac Mixture can be used.

Using a cryptographic same key aggregator, the systems herein can utilize homomorphic encryption to filter out register to which more than on device identifier contributed, and determine a clean sample of device frequencies. The key aggregation structure can be a pair of encrypted counter and a key: (E(count), E(key)).

Addition over the structure can be defined as:

$(E(\text{count}1), E(\text{key}1)) + (E(\text{count}2), E(\text{key}2)) = (E(\text{count}1+\text{count}2+R*(\text{key}1-\text{key}2)), E(\text{key}1+R*(\text{key}1-\text{key}2)))$, Where R is a random number.

This addition operation can be computed homomorphically. The structure can then behave as follows:
If key1=key2=key then $(E(\text{count}1), E(\text{key})) + (E(\text{count}2), E(\text{key})) = (E(\text{count}1+\text{count}2), E(\text{key}))$.

otherwise the counter may be destroyed by randomness.

To maintain differential privacy between publisher computing devices responsible for generating these sketches (e.g., the data processing systems 105A-N, etc.), the systems can implement a secure multi-party computation protocol to aggregate the sketches across publishers and estimate the cardinality and frequency of the multiset. As shown above, sketches with the same parameterization can be unioned by summing them position-wise. A lightweight MPC protocol can be used for computing a joint sketch, using the homomorphic properties of ElGamal encryption as the core operation of our protocol. The high-level approach is to first set up an N-of-N threshold key, and then have each of the sketch providers encrypt their inputs using the public key. Each secret key shareholder can then partially decrypt the joint sketch, apply a deterministic cipher using the homomorphic properties, and forward the result to the next shareholder. Once all decryption key shares have been used, the result will be a deterministically encrypted sketch, from which the desired statistics can be computed. The protocol is described herein below, including how a differentially private output can be computed.

In some implementations, the number of sketch providers can be large. In some implementations, a small number of independently operated workers run the protocol and the majority of sketch providers can send encrypted inputs to at least one of the workers. Among the workers, the communication graph can follows a ring topology. For the rest of the example, exposition this disclosure operates under the assumption that there are three workers, such that worker 1 communicates with worker 2, worker 2 with worker 3, and worker 3 with worker 1. However, it should be understood that there may be any number of workers that can participate in the protocol.

To begin, each worker can generate an ElGamal key pair ($pk_i$, $sk_i$) as described above, or as described herein in Section A. Each worker can broadcast its key to each of the other workers. Each of the workers can form the combined public key and then the sketch providers can fetch the key from any of the workers. This combined public key can be used by sketch providers to encrypt their sketches.

Each of the sketch providers (e.g., the data processing systems 105A-N) can do the following (e.g., as described herein in conjunction with Sections A-C):

1. Retrieve the combined (e.g., aggregated) public key from the workers (e.g., the worker computing devices 405A-N, etc.);

2. Create a sketch that includes bucket fingerprints (e.g., as described herein, etc.).
3. Package the sketch into a sparse representation where each non-zero position is represented as a three-tuple of (position, value, fingerprint).
4. Apply ElGamal encryption to each three-tuple with the combined public key.
5. Send the encrypted sparse sketch to the first worker (e.g., the worker computing device 405A, etc.).

Note that it's possible to generalize to having sketch providers send their sketches to a random worker and then having each worker shuffle their received sketches before sending them on to a single worker that commences with the protocol. In this example explanation, it is assumed that all sketch providers send sketches to a single worker. However, it should be understood that any number of sketch providers can send sketches to any number of workers. Once the first worker has received the encrypted sparse sketches of each publisher, the protocol can begin.

1. For all three-tuples from all publishers, subsequently referred to as just "three-tuples", the first worker (e.g., worker 405A) can shuffle (e.g., permute) the three-tuples and transfers them to the next worker.
2. The next worker then performs the following steps:
    a. It uses its ElGamal key share (e.g., secret key, etc.) to partially decrypt each position id (e.g., of each three-tuple).
    b. It applies a layer of deterministic encryption to each position id (e.g., of each three-tuple) using the ElGamal homomorphism.
    c. It shuffles the three-tuples.
    d. It passes the three-tuples to the next worker.
3. This process can continue until the first worker once again receives the three-tuples (e.g., ring configuration, etc.).
4. Then the first worker can use its key share to decrypt the three-tuples and joins the tuples on the now deterministically encrypted position IDs, which for each position results in the following structure ($E_{non\_det}$(position), [(E(value$_1$), E(fingerprint$_1$)), (E(value$_2$), E(fingerprint$_2$)), . . . ]).
5. The first worker then combines the encrypted (value, fingerprint) tuples using the same-key aggregator method described herein above. This can result in a three-tuple of ($E_{non\_det}$(position_id), E(value), E(fingerprint)) for each non-zero position ID in the combined sketch.
6. The first worker initiates a second round of communication.
    a. It begins by dropping the encrypted key (e.g., E(key)) from the combined three-tuple, which results in a combined two-tuple of ($E_{non\_det}$(position_id), (E(count)) for each non-zero position ID.
    b. It then passes the combined two-tuples, henceforth referred to as "two-tuples", to the next worker.
7. The next worker then performs the following steps:
    a. It removes its non-deterministic encryption from each count
    b. It applies deterministic encryption to each count
    c. Note that shuffling is not necessary as the tuples were already shuffled in the first round.
8. This process continues until the first worker receives the set of non-deterministically encrypted two-tuples.
9. From here it's possible to obtain an estimate of cardinality.
10. Next, the workers can collaborate to determine the frequency distribution:
    a. First the workers can deterministically encrypt, using the same keys as in the previous round, the integer values [1, max_frequency), which can result in a lookup table of ciphertext to plaintext for the well-known values [1, max_frequency).
    b. Then the lookup table can be used to construct a frequency histogram from the deterministically encrypted sketch. This histogram can then be used to determine the frequency distribution of the sketch.
    c. All values present in the sketch that do not map to a value in the lookup table are considered to be equal to max_frequency.

Note that this is an extension of the MPC protocol described herein above in conjunction with FIGS. 4A-C, and FIGS. 5-7. That is, any of the computing devices described herein, for example the data processing systems 105A-N, the worker computing devices 405A-N, the aggregator computing device, among others, can perform one or more of the functionalities as described in this section. Further, it should be understood that any or all of the methods, systems, or techniques in Sections A-C can be applied to the functionality in this section.

Note that the same key aggregator can use a simple equality test to determine whether the keys for a given position are the same. Differential privacy can be added to the frequency histogram directly by generating a two-tailed geometric random variable for each histogram bin and adding it to that bin. The query sensitivity is one, which must be the case because any identifier can be represented in the frequency histogram at most once.

To add the noise the workers can begin by agreeing on an arbitrary baseline. B, to be added to each bucket. Steps 1 and 2 of the above protocol can be extended to have each worker draw max_frequency random variables ($X_1$, $X_i$, $X_{max\_freq}$). These can represent the number of noise values to add to the computation for values [1, max_frequency] for the particular worker. To achieve this each worker can add B–$X_i$ tuples with value i to the sketch. Then, in step 9, the first worker can subtract the value B*W from each histogram bucket, where W is the number of workers. This then provides the required noise distribution. It also means that cardinality can be estimated after the noise baseline has been subtracted. See Algorithm 5, described herein below, for a detailed look at how each worker can add noise to the computation. Similar techniques are described herein above in Section A, in conjunction with FIG. 7. For example, the following algorithm can be used by the worker computing devices 405A-N to generate and append distributed noise values during computation of the frequency.

---

Algorithm 5, worker generated distributed noise:

noise_tuples = [ ]
for v in [0, max_frequency]:
    x = drawPolyaRv( )
    for i in range(B-x):
        noise_tuples.append((random( ), v, random( )))

---

To prevent leaking the cardinalities of individual sketch contributors, each sketch provider can encrypt several three-tuples with value (sentinel_position, 0, 0) where sentinel value is a well-known register value. Then, the sentinel position can be deterministically encrypted by the workers at the end of step 4 and all tuples with that position can be discarded.

In some implementations, a dense version of the protocol can be used, in which all buckets can be encrypted by the sketch provider. However, the sparse method may be more resource efficient in the common case where the sketch is less than ½ full.

The same key aggregator techniques described herein above can be further generalized to collect distributional data. For example, the distribution of the identifiers can be selected based on one or more attributes (e.g., device information, device metadata, information on the device, etc.). Instead of creating a sketch per attribute, the attributes can be stored in the same key aggregator, which can save computational resources and is an improvement to cardinality and frequency determining computer systems. A tradeoff is that the approximate distribution over the attribute buckets are known rather than approximate counts. So, if a certain attribute is a small part of the multiset, them may be no guarantee of the relative error of reach into the category or attribute. To store the distributional demo the aggregator can be adjusted as follows. It can assume that categories (e.g., attributes) can be assigned to objects consistently.

(E(category1),E(key1))+(E(category2),E(key2))=(E
(category1+R*(key1−key2)),E(key1+R*(key1−
key2)).

The system can store an arbitrary number of sketches and category classes in a same key aggregator applying the operation elementwise. For example:

(E(count1_a),E(count1_b),E(category1_c),E(E
(key1))+(E(count2_a),E(count2_b),E
(category2_c),E(E(key2))=(E(count1_a+
count2_a+R*(key1−key2)),E(count1_b+
count2_b+R*(key1−key2)),E(category1_c+R*
(key1−key2)),E(key1+R*(key1−key2)).

For the purposes of description, this algorithm can be referred to as Same Key Aggregator, and it can be assumed that it aggregates arbitrary counts and categorical distributions. The operation of structure merge is denoted via the '+' sign, implying that addition of counts and merge of categories as described above. Clear-text version of an algorithm In some implementations, the Same Key Aggregator aggregator can include a float-valued hash that can be used instead of an encrypted key. For a single counter is looks as follows:

(hash_1,count_1)+(hash_2,count_2)=((hash_1,
count_1+count_2)

if (hash_1==hash_2)else min((hash_1,count_1),
(hash_2,count_2)))

It should be understood that the systems and methods described herein can implement the techniques described in this section to modify or extend the implementations provided in Sections A-C, as well as implement other implementations not described in those previous sections.

E. Exponential Generalized Bloom Filters for Frequency and Cardinality Estimation This section of this technical solution describes exponential and generalized bloom filter data structures for use in computing overall frequency and cardinality as described herein. As described in other sections (e.g. Sections A-D) of this technical solution, each publisher computing device (e.g., data processing systems 105A-N) can generate its own privacy-safe sketch that can represents one or more device identifiers or attributes. The device identifiers or attributes can be associated with one or more actions taken by the device identifiers, for example accessing a particular item of content or web address. Each of the publisher computing devices can transmit its sketch to a deduplication service (e.g., any of the worker computing devices 405, the aggregator computing device 410, etc.) that estimates the de-duplicated number of unique device identifiers across the received sketches. The sketches can be differentially privacy safe. As a result, the differential privacy of the sketches can be maintained even when transmitting the sketches to a non-trusted entity, which is an improvement to the security of networking systems.

The techniques described in this technical solution can use exponential generalized bloom filter (exp-GBF) as a sketch. The techniques described herein can allow generation of a exp-GBF as a differential privacy safe sketch that an aggregator computing device can use to estimate the cardinality of the multiset represented by the exp-GBF sketches. Techniques described herein provide systems and methods to combine, or union, exp-GBF across multiple publishers.

The techniques described herein can use a geometric generalized bloom filter (exp-GBF). GBF generalizes the classic bloom filter to allow a bit in the bit vector to cover different fractions of the hashed identifier space. In particular, the i-th bit covers $p_i$ of the hashed identifier space, $p_i$ can be any fraction. The publisher computing devices (e.g., the data processing systems 105A-N), can exp-GBF can use an exponential function for $p_i$, $p_i$=kappa*exp(−kappa*i/m), m is the length of the bit vector, kappa is a parameter that can determine the shape of the exp-GBF sketch.

The computing devices described herein (e.g., the aggregator computing device 410, or the worker computing devices 405, the data processing systems 105A-N, any other computing device, etc.) can compute the de-duplicated cardinality of a given exp-GBF using the following formula:

$$C = \frac{X}{1 - \frac{X}{m}}$$

where C is the cardinality of the set of identifiers that contributed to the exp-GBF, x are the number of bits set in the exp-GBF sketch, and m is the total number of bit positions in the sketch.

To maintain differential privacy, the publisher computing devices (e.g., the data processing system 105A-N) can flip each bit in exp-GBF sketch with a probability p. For example, the publisher computing device can flip a '1' bit to a '0' with a probability p, and can flip a '0' bit to a '1' bit with probability q. This differentially private exp-GBF sketch can be referred to as a dp-exp-GBF. After flipping each bit in the exp GBF sketch to make it differentially private, the publisher computing devices can transmit the dp-exp-GBF sketch to an aggregator computing device to compute the de-duplicated cardinality across other publisher computing devices.

To compute the unique count for a given dp-exp-GBF sketch, the aggregator computing device can compute a corrected one bits value of the dp-exp-GBF sketch using the following formula:

$$CB = \frac{1 - q - X - q - Z}{1 - p - q}$$

where CB is the corrected number of one-bits to be used in cardinality estimation, q is the probability of a zero-bit being flipped to a one bit, p is the probability of a one-bit being flipped to a zero bit, x is the number of bits in the sketch set to '1', and z is the number of bits in the sketch set to '0' a. Then, the aggregator computing device can compute the de-duplicated reach of the dp-exp-GBF with the corrected number of one-bits using the following formula:

$$DC = \frac{CB}{1 - \frac{CB}{m}}$$

where DC is the cardinality of the dp-exp-GBF, CB is the corrected number of one bits calculated using the above formula, and m is the number of bit positions in the dp-exp-GBF.

The sketches described in this section may also be referred to generally as an 'Any Distribution Bloom Filter' (ADBF). The sketches described in this section can include allow for bit distributions that can accommodate alternate distribution functions, other than uniform or exponential. For example, the techniques described herein can implement a linearly decaying bloom filter (BF), hyperbolic BF, or a mixture of uniform and exponential BF. Noise correction can be applied efficiently by one or more aggregator or worker computing devices (e.g., the aggregator computing device 410, the worker computing devices 405A-N, etc.).

Further, the estimation techniques implemented by the aggregator computing device (e.g., the worker computing devices 405, the aggregator computing device 410, etc.) can be implemented such that all bits of the sketch can contribute to the cardinality estimation, unlike in a reference legion based implementation, where only the bits of the reference legion are used. Instead of selecting a reference legion, the aggregator computing device can tune the weights of each bit in the sketch, where the weight value indicates the contribution of a bit in the sketch to the final cardinality estimate. Based on the parameters of the sketch, the aggregator computing device can derive the optimal weights for each bit in the sketch to improve the overall accuracy of the cardinality estimation.

For the purposes of describing the ADBF implementations, this technical solution will start by describing some alternative approaches. First, sketches implementing probabilistic counting and stochastic averaging (PSCA) are described.

PSCA based techniques can utilize a bit map data structure. The following illustrates a PSCA 3×2 bit map. Each cell value can be a bit equal to either 1 or 0. Here, the generic designators 'row' and 'column' are used to describe the location of a particular cell. Rows may also be referred to as registers. In a PSCA sketch, an identifier can be assigned to a cell based on its bit sequence. For example, each row can capture 1/nrows (½ in our example) fraction of the total universe identifiers. The column can have exponentially decayed fractions of the total universe identifiers. For example, column 1 can have ½, column 2 can have ¼, and so on. The cell thus captures 1/nrows*(½)^column_id fraction of the universe. An example representation of a 3×2 PSCA sketch is included below.

| 3 × 2 PSCA Sketch Representation | | | |
|---|---|---|---|
| | Column 1 | Column 2 | Row Marginal |
| Row 1 | v11 | v12 | 1/3 |
| Row 2 | v21 | v22 | 1/3 |

| 3 × 2 PSCA Sketch Representation | | | |
|---|---|---|---|
| | Column 1 | Column 2 | Row Marginal |
| Row 3 | v31 | v32 | 1/3 |
| Row Marginal | ½ | ¼ | |

The PSCA bit map can be flattened into a bit vector as illustrated below. The vector arranges the cells in the order of columns. The first segment of 3 cells from the first column. They each captures ¼ of universe ids. The second segment of 3 cells from the second column. They each capture 1/12 of the universe. It is clear that the bit map and the bit vector are equivalent and can be 1-1 mapped to each other.

| Flattened Representation of 3 × 2 PSCA Sketch | |
|---|---|
| Column 1: ½ | Column 2: ¼ |
| v11 (1/6)  v21 (1/6)  v31 (1/6) | v21 (1/12) v22 (1/12) v32 (1/12) |

The ADBF sketch can be a generalized form of such a sketch. The ADBF sketch can take any probability of the universe, as illustrated below.

| Flattened Representation of ADBF Sketch | |
|---|---|
| Column 1: ½ | Column 2: ¼ |
| v11 (p1)  v21 (p2)  v31 (p3) | v21 (p4)  v22 (p5)  v32 (p6) |

Because the distribution of probabilities for each position in the sketch can be generalized to any value, other structures described herein can emerge as a result. For example, a classic bloom filter implementation emerges if all probabilities values are equally weighted to 1/m, where m is the number of positions in the sketch. Likewise, when 'waterfall' like probability is assigned to each segment, a PSCA-like sketch emerges. Further, when exponential p values are used, such that:

$$pi = c \frac{\ln i + 1}{m}$$

where i is the index of the position in the sketch, c is a normalization factor, and m is the number of positions in the sketch, a liquid legions type sketch emerges.

The exponential bloom filter case, described herein below, has closed form maximum likelihood solution with an elegant statistical model and interpretation. Next, ADBF and some theoretical formulation are described, including constructing ADBF from identifiers, adding noise, computing unique count of one ADBF, and computing unique count of many combined ADBFs. Simulation results to compare bloom filter, PSCA/CL, and ADBF are provided.

A generalized bloom filter (ADBF) can be constructed by the publisher computing devices (e.g., the data processing system 105A-N) as follows. The kappa parameter is a tunable parameter that may be set to a value of one, but may be less than one. The data processing system can access one or more data records (e.g., identifiers and attributes, or identifiers that meet certain criteria, etc.) to utilize to construct the ADBF data structure. For example, the data processing system may access a database (e.g., the database 115, etc.) to access one or more data records to use to insert into a constructed ADBF sketch. The ADBF sketch can be maintained in the memory of the data processing system, and can me initialized to an initialization values as described herein in proceeding sections with respect to different sketch implementations. For example, the procedure to construct an ADBF sketch can be substantially similar to a cascading legions sketch or a liquid legions sketch, and may be based on parameters stored in the memory of the data processing system or received from a worker computing device 405, an aggregator computing device 410, or a client device 120.

After construction, data records can be mapped to positions in the ADBF using the following techniques. An ADBF sketch can be constructed to include a number of buckets k and any probability vector $(p_1, p_2, \ldots, p_k)$ where the sum of all p, where i ranges from 1 to k, is equal to kappa. The value for kappa can be equal to 1, but need not be equal to one. The probability vector is such that each coordinate in the probability vector can be assigned to a single bucket, or register, in the ADBF sketch. Each identifier of a data record (e.g., the data records maintained in the database 115, etc.) can be inserted into a bucket i of the ADBF sketch with probability $p_i$. In practice, let h be a hash identified by the data processing system 105 that maps the identifier space (e.g. the data record space, etc.) uniformly into $(0, 2^{64})$. Then, a data record x can be inserted into the bucket i if the expression $I^{i-1}_{t=1} p_t \times 2^{64} ::: h \; X < I^i_{t=1} p_t \times 2^{64}$ is satisfied. For a set of data records (data records may be used interchangeably with the term "identifiers"), its corresponding NBF has element i=1 if at least one data record in the set is inserted into bucket i, and is equal to zero otherwise. Note that the liquid legions techniques described herein in Section D can be a case of ADBF such that the $p_i$'s are determined based on the exponential distribution.

The Bloom and Flip (BLIP) techniques described in this section can be differential privacy safe. In particular, ADBF+BLIP is obtained by flipping each bucket of the raw NBF. Binary 0 can be flipped to binary 1 and binary 1 can be flipped to binary 0 with a same probability p. In some implementations, binary 0 values can be flipped to binary 1 with probability p and binary 1 values can be flipped t binary 0 with probability q.

The cardinality of the union of ADBF sketches can be estimated by finding the root of equation (1) or (3) described herein below in this section. This estimator can be performed, for example, by one or more aggregator computing devices 410 or one or more worker computing devices 405. The estimator techniques described in this section can have close form solutions (with approximations) for special distributions as uniform and exponential, and covers the existing estimators of uniform and exponential bloom filters described in previous sections. For an arbitrary probability distribution of bits, this estimator may not have a closed form solution, but can be solved numerically by the computing devices described herein. The estimator can include, or retrieve, a series of tuning parameters from the memory of the computing device executing the estimator (e.g., the worker computing device 405, the aggregator computing device 410, etc.). The optimal parameters for minimizing the variance of the cardinality estimator are derived and described herein below.

The estimator, as executed, performed, or otherwise carried out by one or more computing devices described herein, can de-duplicate un-noised ADBF sketches (e.g., ADBF sketches that do not have noise incorporated, etc.). When merging un-noised ADBF sketches, observe that the ADBF of the union set, denoted as $b=[b_1, b_2, \ldots, b_k]$. For 1:S i:S k, $b_i=1$ if at least one data record from the union is mapped to that bucket, and is equal to zero otherwise. The method of moments can be used to estimate the union from $b_1, b_2, \ldots, b_k$. Recall that $p_i$ is used to denote the probability of any data record being mapped to into bucket i. Considering the union cardinality of u, the probability that none of the u data records falls in bucket i equals $(1-p_i)^u$. That is, $P(b_i=0)=(1-p_i)^u$, and thus $E(b_i=1|u)=1-(1-p_i)^u$. Therefore, the total number of ones has an expectation $E \; I^k_{i=1} b_i | u = I^k_{i=1} [1 \; 1 \; p_i^u]$. Hence, by plugging in the observed $b_i$'s, and back-solving the following equation, we can obtain an estimate of u.

$$_{i=1}^{k}[1 1 p_i^u] =_{i=1}^{k} b_i \qquad \text{Equation 1:}$$

Using statistical terminology, this can be called the "moment estimator of u under the bit probability distribution $p_i$ (1 S i:S m), based on the statistic: $I_{i=1}^{k} b_i$." For the general distribution $p_i$ (1:S i: S m), the estimator may not have a closed form solution. However, for certain distributions, such as uniform and exponential distributions, the estimator can have approximate solutions that precisely match the estimators described herein above in previous sections.

As known in the art, the expression $$1 \frac{1}{x} x$$

goes to $e^{-1}$ as x approaches infinity. Thus, when each $p_i$ is small enough (e.g., very small, but not zero, etc.), $(1-p_i)^{1/p_i}$ is approximately $e^{-1}$, and then $(1-p_i)^u$ is approximately $\exp(-p_i u)$. With this approximation, equation (1) can be reduced to Equation (2):

$$_{i=1}^{k} \exp p_i u = y$$

where $y = I_{i=1}^{k} b_i$ is the number of ones in the bloom filter.

For uniform bloom filter, each $p_i = 1/k$, and then the solution of Equation (2) is $$u = -\frac{1}{-} \ln \frac{y}{-} = -\frac{1}{-} \ln 1 \frac{y}{-}$$

That equation can be the estimator of the union for the uniform bloom filter.

For the exponential generalized bloom filter, each $p_i = -c \ln(i/k)$, where c is a normalizing constant. When k is large enough, $$c \frac{1}{[\int_0^1 \ln X \; dX]} = \frac{1}{-}$$

where the integral can be solved via integration by partus. Thus $\exp(-p_i u) = \exp[(1/k) \ln(i/k) u] = (i/k)^{u/k}$, and then $$_{i=1}^{k} \exp p_i u =_{i=1}^{k} i^{u/k} \int_0^1 x^{u/k} dX = x 1/\underline{u} + 1$$

In this case, Equation (2) is reduced to $k/(u/k+1) = k-y$, that is, $u/k+1 = k/(k-y)$, which gives $u = ky/(k-y) = y/(1-y/k)$. This can be the solution given in Equation (3).

For hyperbolic generalized bloom filter, each $$p_i = c \exp\, ax_k^i,$$

where a is a pre-specified rate and c is a normalizing constant. When k is large enough:

$$c \frac{1}{[\int_0^1 \exp\, aX\, dX]} = \frac{[1\, \exp\, a]}{a}$$

Denote b=cu=[1 exp a]u/a, then $$\exp p_i u = \exp[\, b\exp\, ax_k^i\,],$$

and then $$I_{i=1}^k p_i u = I_{i=1}^k \exp[\, b\exp\, ax_k^i\,] =$$

$$\int_0^1 \exp[\, b\exp\, aX\,]dX = \int_1^{e^{-a}} \exp bud\left[\frac{\ln u}{a}\right] = \frac{k}{a}\int_{e^{-a}}^1 \exp bu/u\, du =$$

$$\frac{k}{a}\int_{be^{-a}}^b \frac{\exp - b}{v}dv = \frac{k}{a}\left[\int_{be^{-a}}^{+00} \frac{\exp - v}{v}dv \cdot \frac{\int_b^{+00}\exp - v}{v}dv\right] = \frac{k}{a}[\,E_i b\, E_i be^{-a}\,],$$

where $$E_i X = \int_x^{+00} \frac{\exp - t}{t} d = \int_{-00}^x \frac{\exp td}{t}$$

is the exponential integral function. Thus Equation (2) is reduced to $_a^k [E_i b\, E_i\, be^{-a}]=y$, and using an implementation of the $E_i$ function, the root of b can be solved. The value of u can then be estimated as u=abk/[1−exp(−a)].

Summarizing the above derivations, Equation (1) provides an overview of the estimation of a union under a bit distribution $p_i$ (1:S i:S m). The estimator can be obtained or derived based on the method of moments based on the expectation of the statistic $I_{i=1}^k b_i$. The estimator has at least an approximate form solution for uniform and exponential ADFs, and the approximate forms thus obtained or derived can be the estimators described herein above in Sections A-D.

The ADBF under another distribution of bits, $p_i$=c(i/k) with c being a normalizing constant. In this distribution, the bit probability can be decaying as a linear function of the bit index i. There also exists a closed form estimator for this ADBF. First, when k is large enough, the normalizing constant $$c\frac{1}{[kf_o xdx]} = k$$

Following that, $$I_{i=1}^k \exp p_i u = I_{i=1}^k \left[\frac{a^i}{k}\right]$$

with a=2u/k. Thus, Equation (2) can hold if $$\frac{1 - e^{\frac{-2U}{k}}}{u} = \frac{k - u}{k^2}.$$

This can be a transcendental function of u, and may not have a closed form solution. Yet, this can be solvable numerically as it can be given by a monotone function of u. In general, Equation (2) can be given by a monotone function of u, and hence can be solved using the bisection method.

The estimator for un-noised ADBFs executed by the worker computing devices 405 or the aggregator computing device 410, among others, can be further extended by adding weights to each of the $b_i$'s. Consider the estimation of the union if the raw bloom filter of the union set is represented as b=[$b_1$, b, •, $b_k$]. The estimator described above leverages the relationship between the expected value of the total bits $I_{i=1}$ $b_i$. In such implementations, every bit can be weighted equally, from the bit with the most probability to the bit with the least probability. This may not be efficient for non-uniform bloom filters. In techniques implementing non-uniform bloom filters, the probabilities ($p_i$) for the first several bits can be much higher than the average of all bits (1/), while the probabilities for the last several bits are can be much lower than average. Thus, when the bloom filter sketch is half full, then the first several bits are likely equal to 1 and the last several bits are likely equal to 0. In such implementations, the bits on either end of the sketch may carry little information, while the patterns in the middle of the sketch should can be the focus for cardinality estimation (e.g., selection of the reference legion, etc.). Thus, an estimator based on the moment of the weighted sum $I_{i=1} w_i b_i$, instead of the direct sum $I_{i=1} b_i$ can improve the accuracy and flexibility of cardinality estimation schemes, which is an improvement over other cardinality estimation systems.

As $E\, b_i$=1 1 $p_i^u$, the moment of method based on $I=_{i=1}\, w_i b_i$ can provide an estimate of u as the root of Equation (3), below:

$$_{i=1}w_i = [1\ \ 1\ \ p_i^u] = _{i=1}w_i b_i$$

In some implementations, the weights $w_i$ can be constants. Considering the weights to be constant values, let $f_w u = I_{i=1} w_i[1\ 1\ p_i^u]$ and $B_w = I_{i=1}\, w_i b$. Equation (3) above can therefore be rewritten as $f_w u = B_w$. Note that $B_w$ can be a random variable. In fact, under certain assumptions, $B_w$ can be a variable with 0 1/variance. In this case, the Delta method indicates that the distribution of $B_w$ can determine the distribution of the root of $f_w u = B_w$ (e.g., $u = f_w^{-1}\, B_w$, etc.).

Note that $B_w$ can be a random variable, with 0: =E $B_w = I_{i=1}^k w_i[1\ 1\ p_i^u]$ and $a^2/:=\text{Var}\, B_w\, I_{i=1}\, w_i^2 \text{Var}\, b_i = I_{i=1}\, w_i^2$ 1 $p_i^u[1\ 1\ p_i^u]$. Considering a large enough, note that ⎯$B_w$ 0→N 0, $a^2$. Here u can denote the true union. Denote g=$f_w^{-1}$ for simplicity, then by the Delta method, $$\overline{\,}[u\ g0] = \overline{\,}[gB_w g0] \to N0, [g'0]^2 a^2.$$

In this distribution, the values of 0 and $a^2$ are described above, and g'0=1/f'g 0.

Considering the above, $$\text{Var}\, U\ w^T Sw/a^T w$$

where the matrix S can have
$S_{ii} = 1 \ p_i^u \ 1 \ p_i^{2u}$, for any 1:::i:::
$S_{ij} = 1 \ p_i \ p_j^u \ 1 \ p_i^u \ 1 \ p_j^u$ for any i−:tj
and the vector a can have each element $a_i = I \ 1 \ p_i \ 1 \ p_i^u$.
The optimal weight vector can be:

$$w = S^{-1}a,$$

and under this weight, $\text{Var } U = a^T S^{-1} a^{-1}$.

Further. $\text{Var } U = a^T S^{-1} a^{-1}$ can be minimized as a function of $p = p_1, \bullet, p_k$.

To maintain the differentia privacy of their sketches, each of the publisher computing devices (e.g., the data processing systems 105A-N, etc.) can flip certain bits with a predetermined probability. The process of flipping the bits to add noise can be referred to herein as 'blipping', and a sketch that has had noise introduced through probabilistic bit flipping is sometimes referred to as being 'blipped'. The estimator implemented by the aggregator computing device (e.g., the worker computing devices 405, the aggregator computing device 410, etc.) can be further extended to accurately compute the cardinality of the union of the noised (e.g. blipped) ADBF sketches generated by the data processing systems 105.

The ADBFs generated by the data processing systems 105 can be blipped. Hence, the estimator based on raw ADBFs, as discussed above, may not be directly applied. In such implementations, the aggregator computing device can estimate the raw ADBF of the union set (e.g., the b vector in the last two subsections, etc.). Assuming the noised bloom filters are represented as $c_1, c_2, -, c_s$ and the blip probability (e.g., the probability of any given '0' bit in the ADBF sketch being flipped to a '1', and the probability of any given '1' bit in the ADBF sketch being flipped to a '0', etc.) being p, the b vector can be estimated by the aggregator computing device (e.g., the worker computing device 405, the aggregator computing device 410, etc.) as:

$$b = 1 \stackrel{s}{\underset{v=1}{n}} [pc_v + q1 \ c_v]/qp^s$$

The estimated b vector can be used in conjunction with Equation (1) or Equation (3) described herein above to estimate of the union size u of the noised (e.g., blipped) sketch.

The noise may further add variance to the estimator. With noise, the variance of estimator can be represented as $w^T Sw/a^T w^2$, where the vector a can be represented as $a_i = I \ 1 \ p_i \ 1 \ p_i^u$, and the matrix S can be represented as $S_{ij} = \text{Cov } \hat{b}_i, \hat{b}_j$, $\hat{b}$ being the vector above.

To obtain the variance and then the optimal weights that minimize the variance, it suffices to obtain each $\text{Cov } \hat{b}_i, \hat{b}_j$. Such covariance, however, can no longer be determined just by the union reach. It relies on the correlation between different ADBFs—and such correlation depends on the whole Venn diagram.

The variance analysis of the noise across the union of the multiset of identifiers (e.g., data records) across each of the publisher computing devices (e.g., the data processing systems 105, etc.) can vary based on the overlaps of each set of data records between each data processing system 105. To aid in the analysis of the variance between data records of different data processing systems, the consider the following notation:
- $_v$ is the cardinality of the data records of the ADBF sketch obtained from the vth data processing system 105 (e.g., data processing system 105V, etc.)
- $b_{v,i}$ is the ith bit of the un-noised ADBF obtained from the vth data processing system.
- $c_{v,i}$ is the ith bit of the noised ADBF from the vth data processing system. (e.g., $c_{v,i}$ is obtained by flipping $b_{v,i}$ with a fixed probability p, etc.).

The following equations and derivations can aid in understanding of how variance impacts the estimation of the multiset cardinality. The estimated ADBF of union, $\hat{b}$, can have its ith element defined as:

$$\hat{b}_i = 1[I_{v=1}^S [p \ c_{v,i} + q1 c_{v,i}]/qp^s.$$

Thus, under the independent cardinality scenario, $$E\hat{b}_i = 1 n E_{v=1}^s \left[ pc_{v,i} + q1 \ c_{v,i} \right]/qp^s = 1 \stackrel{s}{\underset{v=1}{n}} [q \ Ec_{v,i}]/qp^s$$

where $$Ec_{v,i} = Pc_{v,i} = 1 = q \times Pb_{v,i} = 1 + p \times Pb_{v,i} = 0$$
$$= qqpPb_{v,i} = 0 = qqp1p_i^v$$

Thus, $E \ \hat{b}_i = 1 \ [I_{v=1}^S [q \ p \ 1 \ p_i^v]/q \ p^s = 1 \ [I_{v=}^S \ 1 \ p_i^v$
Consider: $E \ \hat{b} = E[1+]1+2 \ E \ \hat{b}$
Where, $$E[1^i \ \hat{b}_i] = \left[ I_{v=1}^i \ E\left\{ \left[ pc_{v,i} + \stackrel{i}{q}1 \ c_{v,i} \right]^2 \right\}/qp^{2s} = \right.$$
$$\stackrel{s}{\underset{v=1}{n}} E \ [q \ c_{v,i}^2]/qp^{2s} = \stackrel{s}{\underset{v=1}{n}} Eq^2 2qc_{v,i} + c_{v,i}^2/qp^{2s} = \stackrel{s}{\underset{v=1}{n}} Eq^2 2qc_{v,i} + c_{v,i}/qp^{2s} =$$
$$\stackrel{s}{\underset{v=1}{n}} E[q^2 \ 2q \ 1 \ c_{v,i}]/qp^{2s} = \stackrel{s}{\underset{v=1}{n}} E[q^2 \ q \ p \ c_{v,i}]/qp^{2s} =$$
$$\stackrel{s}{\underset{v=1}{n}} [q \ qq \ p + q \ p^2 1 \ p_i^v]/qp^s = \stackrel{s}{\underset{v=1}{n}} [pq + q \ p^2 \ 1 \ p_i^v]/qp^s$$

Thus:

$$E\hat{b}_j = 12 \stackrel{s}{\underset{v=1}{n}} 1p_i^v + \stackrel{s}{\underset{v=1}{n}} [pq + q \ 1 \ p_i^v]/qp^{2s}$$

Now consider: $E(\hat{b}_i \hat{b}_j) = E[(1-\hat{b}_i)(1-\hat{b}_j)] - 1 + E(\hat{b}_i) + E(\hat{b}_j)$ $$E[(1-\hat{b}_i)(1-\hat{b}_j)] =$$
$$\prod_{v=1}^s E\{[-p \ c_{v,i} + q(1-c_{v,i})][-p \ c_{v,j} + q(1-c_{v,j})]\} / (q-p)^{2s}$$
$$E\{[-p \ c_{v,i} + q(1-c_{v,i})][-p \ c_{v,j} + q(1-c_{v,j})]\} =$$
$$E[(q-c_{v,i})(q-c_{v,j})] = q^2 - qP(c_{v,i} = 1) - qP(c_{v,j} = 1) + P(c_{v,i} = c_{v,j} = 1) =$$
$$-q^2 + q(q-p)(1-p_i)^{n_v} + q(q-p)(1-p_j)^{n_v} + P(c_{v,i} = c_{v,j} = 1)$$
$$P(c_{v,i} = c_{v,j} = 1) = q^2 P(b_{v,i} = b_{v,j} = 1) +$$
$$qpP(b_{v,i} = 0, b_{v,j} = 1) + qpP(b_{v,i} = 1, b_{v,j} = 0) + p^2 P(b_{v,i} = 0, b_{v,j} = 0)$$

where for any data processing system v:

$$P(b_{v,i}=0, b_{v,j}=0) = (1-p_i-p_j)^{n_v}$$

Because $$P(b_{v,i}=0) = (1-p_i)^{n_v}$$

consider:

$$P(b_{v,i} = 0, b_{v,j} = 1) =$$
$$(P(b_{v,i} = 0) - P(b_{v,i} = 0, b_{v,j} = 0) = (1 - p_i)^{n_v} - (1 - p_i - p_j)^{n_v}$$

Consider also:

$$P(b_{v,i}=1, b_{v,j}=0)=(1-p_j)^{n_v}-(1-p_i-p_j)^{n_v}$$

Hence:

$$P(b_{v,i} = 1, b_{v,j} = 1) = P(b_{v,i} = 1) - P(b_{v,i} = 1, b_{v,j} = 0) =$$
$$1 - (1 - p_i)^{n_v} - (1 - p_j)^{n_v} + (1 - p_i - p_j)^{n_v}.$$

Put together:

$$P(c_{v,i} = 1, c_{v,j} = 1) = q^2 [1 - (1 - p_i)^{n_v} - (1 - p_j)^{n_v} + (1 - p_i - p_j)^{n_v}] +$$
$$qp[(1 - p_i)^{n_v} + (1 - p_j)^{n_v} - 2(1 - p_i - p_j)^{n_v}] + p^2(1 - p_i - p_j)^{n_v} =$$
$$q^2 - q(q - p)(1 - p_i)^{n_v} - q(q - p)(1 - p_j)^{n_v} + (q - p)^2(1 - p_i - p_j)^{n_v}.$$

Put together:

$$E\{[-p\,c_{v,i} + q(1 - c_{v,i})][-p\,c_{v,j} + q(1 - c_{v,j})]\} =$$
$$-q^2 + q(q - p)(1 - p_i)^{n_v} + q(q - p)(1 - p_j)^{n_v} + q^2 - q(q - p)(1 - p_i)^{n_v} -$$
$$q(q - p)(1 - p_j)^{n_v} + (q - p)^2(1 - p_i - p_j)^{n_v} = (q - p)^2(1 - p_i - p_j)^{n_v}.$$

Put together:

$$E[(1 - \hat{b}_i)(1 - \hat{b}_j)] = \prod_{v=1}^{s}(1 - p_i - p_j)^{n_v}$$

which can equal $$\prod_{v=1}^{s} p(b_{v,i} = 0, b_{v,j} = 0)$$

This is consistent with the unbiasedness of the estimator. Put together:

$$E(\hat{b}_i \hat{b}_j) = 1 - \prod_{v=1}^{s}(1 - p_i)^{n_v} - \prod_{v=1}^{s}(1 - p_j)^{n_v} + \prod_{v=1}^{s}(1 - p_i - p_j)^{n_v}$$

In summary, we have:

$$E(\hat{b}_i)=1-\Pi_{v=1}^{s}(1-p_i)^{n_v}$$

$$E(\hat{b}_i^2)=1-2\,\Pi_{v=1}^{s}(1-p_i)^{n_v}+\Pi_{v=1}^{s}[pq+(q-p)^2(1-p_i)^{n_v}]/(q-p)^{2s}$$

$$E(\hat{b}_i\hat{b}_j)=1-\Pi_{v=1}^{s}(1-p_i)^{n_v}-\Pi_{v=1}^{s}(1-p_j)^{n_v}+\Pi_{v=1}^{s}(1-p_i-p_j)^{n_v}$$

Following the analysis from these formulas:

$$S_{ii} = \mathrm{Var}(\hat{b}_i) = E(\hat{b}_i^2) - [E(\hat{b}_i)]^2 =$$
$$1 - 2\prod_{v=1}^{s}(1 - p_i)^{n_v} + \prod_{v=1}^{s}[pq + (q - p)^2(1 - p_i)^{n_v}]/(q - p)^{2s} -$$
$$1 + 2\prod_{v=1}^{s}(1 - p_i)^{n_v} - \left[\prod_{v=1}^{s}(1 - p_i)^{n_v}\right]^2 =$$
$$\prod_{v=1}^{s}[pq + (q - p)^2(1 - p_i)^{n_v}]/(q - p)^{2s} - \left[\prod_{v=1}^{s}(1 - p_i)^{n_v}\right]^2$$

Considering the universe is large:

$$S_{ii} = \prod_{v=1}^{s}[pq + (q - p)^2(1 - p_i)^{n_v}]/(q - p)^{2s} - (1 - p_i)^{2u^*}$$

Where u* is the true union of cardinality. Considering further:

$$S_{ij} = \mathrm{Cov}(\hat{b}_i, \hat{b}_j) =$$
$$E(\hat{b}_i \hat{b}_j) - E(\hat{b}_i)E(\hat{b}_j) = \prod_{v=1}^{s}(1 - p_i - p_j)^{n_v} - \prod_{v=1}^{s}(1 - p_i)^{n_v}\prod_{v=1}^{s}(1 - p_j)^{n_v}$$

Consider the universe is large:
$$S_{ij} \approx (1-p_i-p_j)^{u^*}-(1-p_i)^{u^*}(1-p_j)^{u^*}$$

which can be the same as the covariance for the un-noised case.

The following includes algorithmic implementations and pseudo-code that can be implemented on any of the data processing system 105A-N, the worker computing devices 405A-N, the aggregator computing devices 410, the client devices 120A-N, or any other computing device described herein. Further, any of the components of the data processing system 105A-N, the system 100, the systems 400A-C, and any components thereof can perform any of the functionalities detailed in this section.

Assume an ADBF sketch is generated to have m bits. The probability value $p_i$ for i from 0, 1, . . . , m−1 for uniform (e.g., normal bloom filter) and exponential bloom filter (e.g. liquid legions, etc.) can be a predetermined value generated by the data processing system 105 or provided by an external computing device (e.g., any computing device described herein, etc.) via the network 110 and stored in the memory of the data processing system 105, or any other computing device performing the functionalities described in this section. For exponential bloom filter implementations, the value of kappa=1 can be used simplicity, but in some implementations other values can be used.

At least one example implementation of generating the respective $p_i$ values is provided below in the following pseudo-code:

```
if method == 'exponential':
    p = -np.log((np.arange(bit_size) + 1) / bit_size)
if method == 'uniform':
    p = np.ones(bit_size)
p = p/sum(p)
```

For any a set of data records, normalized values can be computed and added into a ADBF bit position, as described by the following example pseudo-code:

```
# Map ids into normalized values.
    values = hash64(ids) / 2^64
    # Value bounds for bits.
    bit_bounds = np.cumsum(p)
    # Identify the bit index for values.
    bit_indices = np.searchsorted(bit_bounds, values)
    # Set the respective bit for each id.
    ADBF = np.zeros(bit_size)
    for i in bit_indices:
        ADBF[i] = 1
```

For a given ADBF sketch, the number of unique data records that were added to the sketch can be estimated based on the number of one-bits in the sketch. This is described by the following example pseudo-code:

```
def _UniqueCountFromOnes(ones, bit_size, method):
    if method == 'exponential':
        return ones / (1 - ones/bit_size)
    elif method == 'uniform':
        return np.log(1 - ones / bit_size) / np.log(1- 1 / bit_size)
```

Noise can be added to each sketch by flipping bits with probability p. Note that the probability p with which bits are flipped is different from the probability assignments $p_i$ described previously. Randomly flipped bits to the ADBF sketch can make it differential privacy safe. The bit flipping process can be described by the following example pseudo-code:

```
# blip: the probability to flip: 1 -> 0; and 0-> 1
def Flip(ADBF, flip):
    for i in np.arange(len(ADBF)):
        if np.random.uniform( ) < flip:
            if ADBF[i] == 1:
                ADBF[i] = 0
```

-continued

```
            else:
                ADBF[i] = 1
```

In some implementations, the above implementation can be extended to allow separate probabilities to flip a '0' bit to a '1' bit and to flip a '1' bit to a '0' bit. Such an implementation is shown below in the following example pseudo-code:

```
def Flip(ADBF, flip0to1_prob, flip1to0_prob):
    """Can be more efficient than for-loop.
    """
    num_bits = len(ADBF)
    flip0to1 = np.random.choice([True, False], size=num_bits,
        p=[flip0to1_prob, 1 - flip0to1_prob])
    flip1to0 = np.random.choice([True, False], size=num_bits,
        p=[flip1to0_prob, 1 - flip1to0_prob])
    return ADBF * (1 - flip1to0) + (1 - ADBF) * flip0to1
```

For a given ADBF sketch with noise introduced through bits flipped with probability p, the number of unique data records that were added to the sketch can be estimated based on the corrected number of one-bits in the sketch. This is shown by the following example pseudo-code:

```
def _UniqueCount(ADBF, blip=None, method='exponential':
    one_bits = sum(ADBF)
    zero_bits = len(ADBF) - one_bits
    bit_size = len(ADBF)
    if blip:
        q = 1-blip
        corrected_one_bits = (q*one_bits - blip*zero_bits) /
            (q - blip)
    return _UniqueCountFromOnes(corrected_one_bits, bit_size,
        method)
```

The following technique can compute the number of all zeros in the slices to de-duplicate the sets of data records across an arbitrary number (e.g., m) data processing systems 105. A slice can be an m-bit vector for a bit position over m publishers. If a slice has all zero bits of m data processing systems, no data records have contributed to this slice. The goal is to estimate the number of all-zero-bits-slices given the noisy observations. An example method of doing so is demonstrated below in the following pseudo-code:

```
def _ComputeOnesFromPubs(ADBFs, blip, verbose=False):
    """Correct number of ones."""
    m = len(ADBFs)
    # Compute counts of bit positions for slices of 1 one, 2 ones, 3 ones, etc.
    sum_ADBF = functools.reduce(lambda a, b: a + b, ADBFs.values( ) )
    unique_values, freq_count = np.unique(sum_ADBF, return_counts=True)
    freqs = np.zeros(m+1)
    freqs[[int(v) for v in unique_values]] = freq_count
    q = 1 - blip
    s = 0
    for k in np.arange(m+1):
        s += np.power(q, m-k) * np.power(-blip, k) * freqs[k]
    n0 = s/np.power(q-blip, m)
    return len(ADBFs[0]) - n0
```

The union of data records used to generate the ADBF sketches across many data processing systems can then be computed. The example pseudo-code included below implements at least one method of determining generating a sketch that represents the union of data records across 'blipped' ADBF sketches from many data processing systems.

```
def EstimateUnionADBFFromPubs(ADBFs, blip0to1_probs_arr,
    blip1to0_probs_arr):
```

-continued

```
"""Each ADBF can be a numpy array.
"""
num_pubs = len(ADBFs)
num_bits = len(ADBFs[0])
d_vector = np.ones(num_bits)
for j in range(num_pubs):
    d_vector *= (- blip1to0_probs_arr[j] * ADBFs[j] +
        (1 - blip1to0_probs_arr[j]) * (1 - ADBFs[j]))
    return d_vector / np.prod(1 - blip1to0_probs_arr -
        blip0to1_probs_arr)
```

The following includes a description of various implementations and processes usable by the worker computing devices or the aggregator computing devices described herein (e.g., the worker computing devices 405, the aggregator computing device 410, etc.) to compute the de-duplicated frequency of the various probabilistic data structures described herein in the instant and preceding sections. As described above, an aggregator computing device, such as the aggregator computing device 410 or the worker computing device 405, can receive one or more data structures from various identifier servers (e.g., the data processing systems 105A-N, etc.). Each of these data structures can represent identifiers that include one or more attributes. Those attributes can describe, for example, online activities or interactions by devices that are assigned or associated with those interactions. The data records (e.g., the data records 122, etc.) can be maintained by a respective data processing system 105. The aggregator computing device 410 or the worker computing device 405 can compute the frequency of the attributes of the identifiers based on the information represented by the construction of those data structures received from the identifier servers (e.g., the data processing systems 105). One metric that can be computed, as described herein, is the frequency attribute of identifiers maintained across many identifier servers. The frequency can be computed, for example, for a particular group of identifiers that performed a certain type of online activity (e.g., interaction) with a specified item of content. Various methods or orders of aggregating the sketches, such as those methods described herein above, are included below.

At least one method assumes that the reach of the identifiers that contribute to each data structure transmitted by the data processing systems 105 to the aggregator computing device 410 (or the worker computing devices 405, as the case may be) are substantially independent. Such a method can implement sequential deduplication of the data structures received from the data processing systems 105, and may be explained through the convolution process below, where $f_i$ is the frequency distribution of the i-th data processing system. In such an implementation, the frequency can be determined iteratively, such as $f_{1\_2}=(f_1*f_2)(k)$, where k is the desired frequency attribute value (e.g., the number of unique identifiers that interacted with a particular item of content k or more times, etc.). The computing device responsible for aggregating the frequency distribution data structures can perform, for example, the process such that $f_{1\_2\_3}=(f_{1\_2}*f_3)(k)$, and so on until the frequency distributions from each identifier server (e.g., the data processing systems 105), has been determined.

In such an implementation, the sketches transmitted by each of the data processing systems 105 can be combined sequentially by the aggregator computing device 410 or the worker computing devices 405 as described herein above. To aid in the concise description of this method, the following operations are utilized in conjunction with the sketches to indicate various set operations on the sets of data records represented by the sketches. Such operations may include their intersection (n), union (u), or set difference (\).

Consider two identifier servers (e.g., two data processing systems 105). The first data processing system 105 sends sketches $\{X_k, \ldots, X_{k-1}, X_{k+}\}$, and the second data processing system 105 sends $(y_1, \ldots, y_{k-1}, y_{k+})$. Given that all sketches of each publisher are from disjoint sets, it is easy to get sketches of 1+ reach, e.g., $X_{1+}=I^{k-1}_{j=1}X_j+X_{k+}$ and $y_{1+}=I^{k-1}_{j=1}y_j+y_{k+}$.

Next, the aggregator computing device 410 or the worker computing device 405 can estimate the reach frequency of the union of the two sketches received from the first data processing system 105 and the second data processing system 105.

For example, for 1:::j<, the union reach of frequency=j comes from the following intersection estimates (and they are disjoint): i ersec $X_0, y_j$ and i ersec $X_1, y_{j-1}, \ldots$, i ersec $X_i, y_{j-i}, \ldots$, i ersec $X_{j-1}, y_1$, and i ersec $X_j, y_0$.

For i ersec $X_0, y_j$ and i ersec $X_j, y_0$, $X_0$ or $y_0$ may need to be further decomposed. For example:

i er sec $X_0, y_j$=differe ce $y_j$,i er sec $X_{1+}, y_j$.

i er sec $X_j, y_0$=differe ce $X_j$,i er sec $X_j, y_{1+}$.

So the cardinality of frequency=j is $I_{i=1}^{j-1}C$ i er sec $X_i, y_{j-1}+C X_j+C y_jC$ i er sec $X_{1+}, y_jC$
i er sec $X_j, y_{1+}$.

For frequency >=k, the union reach of frequency comes from the following intersections:

i er sec $X_0, y_{k+}$, i er sec $X_1, y_{k-1}$, i er sec $X_1, y_{k+}$,

. . . , i er sec $X_{k-}, y, \ldots,$ i er sec $X_{k-}, y_{k-1}$, i er sec $X_{k-}, y_{k+}$,
=i er sec $X_{k-1}, y_{1+}\backslash y_1$.

i er sec $X_{k-1}, y_1, \ldots,$ i er sec $X_{k-1}, y_{k-1}$, i er sec $X_{k-1}$,
$y_{k+}$=i er sec $X_{k-1}, y_{1+}$.

For i ersec $X_0, y_{k+}$, it further be decomposed into:

i er sec $X_0, y_{k+}$=differe ce $y_{k+}$,i er sec $X_{1+}, y_{k+}$.

Given all the piecewise cardinality estimates the k+ reach may then be summed, combined, or otherwise calculated. Extending to more than two publishers can include merging the sketches and then performing the deduplication with a third identifier server (e.g., data processing system 105) as described herein above. The merge operation can be, for example:

$Z_j=u_{i=1}^{j-1}X_in y_{j-1}uX_j u y_j\backslash X_{1+} n y_j\backslash X_j n y_{1+}$,for $j=1:k-1$.

At least one other method for merging two or more sketches can be based on the Chow-Liu model. This method can be implemented, for example, by any of the computing devices described herein, including the aggregator computing devices 410 or the worker computing device 405. As used herein, the function R indicates the reach and $f_1, \ldots, f_s$ indicate the frequency of each identifier at each data processing system 105. As such, we have:

$$R(f_1+f_2+\ldots+f_s=k) = \sum_{j_1+j_2+\ldots+j_s=k, j_1,\ldots,j_s \geq 0} R(f_1=j_1, f_2=j_2, \ldots, f_s=j_s).$$

For example:

$$R(f_1 + f_2 + f_3 = 3) = R(f_1 = 0, f_2 = 0, f_3 = 3) + R(f_1 = 0, f_2 = 3, f_3 = 0) +$$
$$R(f_1 = 3, f_2 = 0, f_3 = 0) + R(f_1 = 0, f_2 = 1, f_3 = 2) +$$
$$R(f_1 = 0, f_2 = 2, f_3 = 1) + R(f_1 = 1, f_2 = 0, f_3 = 2) +$$
$$R(f_1 = 2, f_2 = 0, f_3 = 1) + R(f_1 = 1, f_2 = 2, f_3 = 0) +$$
$$R(f_1 = 2, f_2 = 1, f_3 = 0) + R(f_1 = 1, f_2 = 1, f_3 = 1).$$

Each term in the form of R (f1=j1, f2=j2, . . . , fs=js) can be estimated using the Chow-Liu model: Chow-Liu model:

$$P(f_1 = j_1, f_2 = j_2, \ldots, f_s = j_s) =$$
$$P(f_1 = j_1)P(f_2 = j_2 | f_1 = j_1) \ldots P(f_s = j_s | f_{s-1} = j_{s-1}) =$$
$$P(f_1 = j_1)[P(f_1 = j_1, f_2 = j_2)/P(f_1 = j_1)]$$
$$\ldots [P(f_{s-1} = j_{s-1}, f_s = j_s)/P(f_{s-1} = j_{s-1})],$$

which implies that $$R(f_1 = j_1, f_2 = j_2, \ldots, f_s = j_s) =$$
$$R(f_1 = j_1)R(f_2 = j_2 | f_1 = j_1) \ldots R(f_s = j_s | f_{s-1} = j_{s-1}) =$$
$$R(f_1 = j_1)[R(f_1 = j_1, f_2 = j_2)/R(f_1 = j_1)]$$
$$\ldots [R(f_{s-1} = j_{s-1}, f_s = j_s)/R(f_{s-1} = j_{s-1})]$$

This can be the Chow-Liu model under the linear tree of identifier servers s 1→2→ . . . →s. The marginal reaches and two-way intersections are involved in the above equation. Thus, once each identifier server I knows all the identifiers and attributes (sometimes referred to herein as "ids") with $f_l=j_l$, they can transmit the encrypted or processed data structure representing those of these ids, and then all the terms of equation (1) can be obtained using the estimators described herein above and herein below. For any $j_l$⊛ 1, the ids with $f_l=j_l$ can be identified from the data records 122. However, each data processing system 105 may not know all the ids with frequency=0. The data processing systems 105 may not share a common list of data records. Those records which are not even the data records 122 maintained by data processing system 105A should also be assigned as frequency=0 at data processing system 105A, but data processing system 105A may not maintain or have data representing those ids.

This issue can be addressed by noting that $f_1=0$, $f=j=f=j$ $f_1$⊛ 1, $f=j$. The data structure representing $f_1$⊛ 1 can be obtained and hence $f_1$⊛ 1,$f=j$ can be estimated whenever $j=:t0$.

In the case where there are multiple zeros among $j_1$, j, •, $j_s$, the zero and non-zero j's can be separated. Suppose that $j_1$, j, •, $j_r=0$ while $j_{r+1}$, $j_{r+}$, •, $j_s>0$. The Chow-Liu model of the linear tree 1→2→•→s says that $$Pf_1=j_1,f=j,•f_s=j_s=Pf_1=•=f_r=0Pf_{r+1}=j_{r+1}|f_r=0Pf_{r+}=j_{r+}$$
$$|f_{r+1}=j_{r+1}\cdot P f_s=j_s|f_{s-1}=j_{s-1}=P f_1=•=f_r=0,f_{r+1}=j_{r+1}$$
$$Pf_{r+}=j_{r+}|f_{r+1}=j_{r+1}\cdot P f_s=j_s|f_{s-1}=j_{s-1}=[P f_{r+1}=j_{r+1}$$
$$Pf_1+•+f_r⊛ 1,f_{r+1}=j_{r+1}]Pf_{r+}=j_{r+}|f_{r+1}=j_{r+1}\cdot P$$
$$f_s=j_s|f_{s-1}=j_{s-1},$$

and then $$f_1=j_1,f=j,•f_s=j_s=[f_{r+1}=j_{r+1},f_l+•+f_r⊛ 1,f_{r+1}=j_{r+1}]\times[f_{r+}$$
$$=j_{r+},f_{r+1}=j_{r+1}/f_{r+1}=j_{r+1}]\times\cdot\times[f_s=j_s,f_{s-1}=j_{s-1}/f_{s-1}=$$
$$j_{s-1}]$$

As such, the terms involving $j_{r+1}$, $j_{r+}$, •, $j_s>0$ can be computed using the data structures representing $f_{r+1}=j_{r+1}$, • up to $f_s=j_s$—these are all the terms except the first. The first term, $f_{r+1}=j_{r+1}$ $f_1+•+f_r$⊛ 1,$f_{r+1}=j_{r+1}$], is the dedup of two sets A={$f_{r+1}=j_{r+1}$} and B={$f_1+•+f_r$⊛ 1}. For deduping these two sets, the data structure transmitted by data processing system 105A is directly from data processing system 105r+1. The data structure representing of set B on the other hand, can be estimated by merging the data structures representing $f_1$⊛ 1, f⊛ 1, up to $f_r$⊛ 1. As such, $f_1=j_1$, $f=j$, •, $f_s=j_s$ can be estimated. An example and non-limiting implementation of this method is described below in the following example pseudo-code.

```
freq_combinations = FindCombinations(frequency_target, num_servers)
# Using our notations, this is to find all combinations of j1, j2, ..., js
target_freq_reach = 0
for freq_combination in freq_combinations:
    zero_servers, nonzeros_servers = FindZeros(freq_combination)
    # zero_servers and non_zeros_servers are indices lists of the servers with j=0
and j>0 respectively
    data_structure_to_dedup_with = np.zeros(num_buckets)
    for server_index in zero_servers:
        data_structure_to_dedup_with = Merge(data_structure_to_dedup_with,
GetOnePlusData_structure(server_index))
        # Then dedup with the first pub with non-zero frequency
    first_nonzero_server_index = nonzeros_servers[0]
    data_structure_firstnon_zero_server = GetData_structureAtCertainFreq(
            first_nonzero_server_index, freq_combination)
    intersection = sum(Data_structure_first_nonzero_server) −
EstimateOverlap(data_structure_to_dedup_with,
data_structure_first_non_zero_server)
    # Then multiply R(fr+2=jr+2, fr+1=jr+1) / R(fr+1=jr+1) up to R(fs=js, fs−
1=js−1) / R( fs−1=js−1) in equation (2)
    for server_index in remaining_nonzero_servers:
        overlap_rate = EstimateOverlap(previous_data_structure,
current_data_structure)
        intersection *= overlap_rate
    target_freq_reach += intersection
return target_freq_reach
# Final estimate of R(f1+f2++fs=k)
```

Differential privacy can be introduced, for example, using any of the differential privacy-based methods described herein above. For example, each of the data processing systems 105 can add differentially private noise to the k+1 sketches transmitted by the respective data processing system 105, as described herein above.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more components of computer program instructions, encoded on computer storage medium for execution by, or to control the operation of, data processing apparatus. The program instructions can be encoded on an artificially-generated propagated signal. e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or any combination thereof. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, flash memory, solid-state memory, or other storage devices).

The features disclosed herein may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus". "data processing system", "user device", "client device", "worker device", "worker", "worker computing device", "publisher", or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or any combination thereof. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, functional, or procedural languages, and can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, flash memory, solid-state drives, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices. e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component. e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the data processing system 105 can include clients and servers. For example, the data processing system 105 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., a HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementations or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 105 could be a single module, a logic device having one or more processing modules, one or mom servers, or part of a cloud computing environment.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

It should be understood that the systems and methods described above may be provided as instructions in one or more computer programs recorded on or in one or more articles of manufacture, e.g., computer-readable media. The article of manufacture may be a floppy disk, a hard disk, a CD-ROM, a flash memory card, a PROM, a RAM, a ROM, or a magnetic tape. In general, the computer programs may be implemented in any programming language, such as LISP, Perl, Python. C, C++, C #, PROLOG, or in any byte code language such as JAVA. The software programs may be stored on or in one or more articles of manufacture as object code.

Having described certain embodiments of methods and systems, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method of generating an encrypted data structure representative of a set of identifiers having attributes that satisfy target criteria for secure and computationally efficient transmission, comprising:
    maintaining, by a data processing system comprising one or more processors and a memory, in a database, a set of identifiers, each of the set of identifiers comprising an attribute;
    generating, by the data processing system, a vector data structure comprising a plurality of coordinates each corresponding to a respective one of a plurality of counter registers;
    accessing, by the data processing system, each of the plurality of counter registers that correspond to a plurality of register identifiers to identify a set of counter registers that satisfy a minimum value threshold, wherein identifying the set of counter registers that satisfy the minimum value threshold comprises:
        determining a value for each respective counter register of the plurality of counter registers to determine a minimum value;
        comparing the value for each respective counter register of the plurality of counter registers;
        identifying one or more counter registers of the plurality of counter registers as satisfying the minimum value threshold if the value of the respective counter register is equal to the minimum value; and
        identifying one or more counter registers of the plurality of counter registers as not satisfying the minimum value threshold if the value of the respective counter register is not equal to the minimum value;
    incrementing, by the data processing system, each of the set of counter registers that satisfy the minimum value threshold;
    not incrementing, by the data processing system, each of the set of counter registers that do not satisfy the minimum value threshold;
    encrypting, by the data processing system, the vector data structure to create an encrypted data structure, such that the encrypted data structure can be combined with a second encrypted data structure; and
    transmitting, by the data processing system, the encrypted data structure to a worker computing device.

2. The method of claim 1, further comprising:
    receiving, by the data processing system, a first identifier comprising a first device attribute; and
    storing, by the data processing system, the first identifier comprising the first device attribute as a member of the set of identifiers.

3. The method of claim 1, further comprising:
    hashing, by the data processing system, a identifier of the set of identifiers using each of a plurality of hash functions to generate a plurality of hashed data record values;
    extracting, by the data processing system, a plurality of register identifiers from the plurality of hashed data record values, each of the plurality of register identifiers corresponding to a respective counter register of the plurality of counter registers; and
    identifying, by the data processing system, a uniformly distributed hash function as one of the plurality of hash functions, wherein the uniformly distributed hash function outputs uniformly distributed values.

4. The method of claim 3, wherein hashing the identifier of the set of identifiers further comprises storing, by the data processing system, in the database, each of the plurality of hashed data record values in association with the identifier.

5. The method of claim 4, wherein extracting the plurality of register identifiers further comprises performing a modulus operation on each of the plurality of hashed data record values using a number of the plurality of counter registers.

6. The method of claim 3, wherein the vector data structure is first vector in a matrix data structure comprising the first vector and a second vector, and wherein generating the vector data structure further comprises:
    selecting, by the data processing system, a selected vector using a hash function of the plurality of hash functions and the identifier of the set of identifiers, wherein the selected vector is one of the first vector or the second vector; and
    updating, by the data processing system, a coordinate of the selected vector of the matrix data structure using the hash function and the identifier of the set of identifiers.

7. The method of claim 6, wherein selecting the selected vector further comprises:
    hashing, by the data processing system, the identifier of the set of identifiers to generate a hashed identifier;
    determining, by the data processing system, a number of least significant bits of the hashed identifier that satisfy a predetermined bit value; and
    selecting, by the data processing system, the first vector as the selected vector or the second vector as the selected vector, based on the number of least significant bits of the hashed identifier that satisfy the predetermined bit value.

8. The method of claim 7, wherein updating the coordinate of the selected vector of the matrix data structure further comprises:
    performing, by the data processing system, a modulus operation on the hashed identifier to calculate a counter register index value;
    selecting, by the data processing system, the coordinate using the counter register index value; and
    incrementing, by the data processing system, the coordinate selected using the counter register index value.

9. The method of claim 1, comprising:
    hashing, by the data processing system, a identifier of the set of identifiers using each of a plurality of hash functions to generate a plurality of hashed data record values; and extracting, by the data processing system, a plurality of register identifiers from the plurality of hashed data record values, each of the plurality of register identifiers corresponding to a respective counter register of the plurality of counter registers.

10. A system for generating an encrypted data structure representative of a set of identifiers having attributes that satisfy target criteria for secure and computationally efficient transmission, comprising:

a data processing system comprising one or more processors and a memory, the data processing system configured to:

maintain, by a data processing system comprising one or more processors and a memory, in a database, a set of identifiers, each of the set of identifiers comprising an attribute;

generate, by the data processing system, a vector data structure comprising a plurality of coordinates each corresponding to a respective one of a plurality of counter registers;

access, by the data processing system, each of the plurality of counter registers that correspond to a plurality of register identifiers to identify a set of counter registers that satisfy a minimum value threshold, wherein identifying the set of counter registers that satisfy the minimum value threshold comprises:

determine a value for each respective counter register of the plurality of counter registers to determine a minimum value;

compare the value for each respective counter register of the plurality of counter registers;

identify one or more counter registers of the plurality of counter registers as satisfying the minimum value threshold if the value of the respective counter register is equal to the minimum value; and identifying one or more counter registers of the plurality of counter registers as not satisfying the minimum value threshold if the value of the respective counter register is not equal to the minimum value;

increment, by the data processing system, each of the set of counter registers that satisfy the minimum value threshold;

not increment, by the data processing system, each of the set of counter registers that do not satisfy the minimum value threshold;

encrypt, by the data processing system, the vector data structure to create an encrypted data structure, such that the encrypted data structure can be combined with a second encrypted data structure; and transmit, by the data processing system, the encrypted data structure to a worker computing device.

11. The system of claim 10, wherein the data processing system is further configured to:

receive a first identifier comprising a first device attribute; and store the first identifier comprising the first device attribute as a member of the set of identifiers.

12. The system of claim 10, wherein the data processing system is further configured to:

hash, by the data processing system, a identifier of the set of identifiers using each of a plurality of hash functions to generate a plurality of hashed data record values;

extract, by the data processing system, a plurality of register identifiers from the plurality of hashed data record values, each of the plurality of register identifiers corresponding to a respective counter register of the plurality of counter registers; and identify, by the data processing system, a uniformly distributed hash function as one of the plurality of hash functions, wherein the uniformly distributed hash function outputs uniformly distributed values.

13. The system of claim 12, wherein the data processing system is further configured to store, in the database, each of the plurality of hashed data record values in association with the identifier.

14. The system of claim 12, wherein the data processing system is further configured to perform a modulus operation on each of the plurality of hashed data record values using a number of the plurality of counter registers.

15. The system of claim 12, wherein the vector data structure is a first vector in a matrix data structure comprising the first vector and a second vector, and wherein the data processing system is further configured to:

select a selected vector using a hash function of the plurality of hash functions and the identifier of the set of identifiers, wherein the selected vector is one of the first vector or the second vector; and update a coordinate of the selected vector of the matrix data structure using the hash function and the identifier of the set of identifiers.

16. The system of claim 15, wherein the data processing system is further configured to:

hash the identifier of the set of identifiers to generate a hashed identifier; determine a number of least significant bits of the hashed identifier that satisfy a predetermined bit value; and select the first vector as the selected vector or the second vector as the selected vector, based on the number of least significant bits of the hashed identifier that satisfy the predetermined bit value.

17. The system of claim 16, wherein the data processing system is further configured to:

perform a modulus operation on the hashed identifier to calculate a counter register index value;

select the coordinate using the counter register index value; and increment the coordinate selected using the counter register index value.

18. The system of claim 10, wherein the data processing system is further configured to:

hash, by the data processing system, a identifier of the set of identifiers using each of a plurality of hash functions to generate a plurality of hashed data record values; and extract, by the data processing system, a plurality of register identifiers from the plurality of hashed data record values, each of the plurality of register identifiers corresponding to a respective counter register of the plurality of counter registers.

* * * * *